US012607742B2

(12) United States Patent (10) Patent No.: US 12,607,742 B2
Proctor et al. (45) Date of Patent: Apr. 21, 2026

(54) BEAMFORMING SONAR SYSTEMS FOR SIDE LIVE SONAR, AND ASSOCIATED METHODS

(71) Applicant: Navico, Inc., Tulsa, OK (US)

(72) Inventors: Alan Lee Proctor, Owasso, OK (US); Jeremiah D. Clark, Tulsa, OK (US); Dustyn P. Pendergraft, Claremore, OK (US)

(73) Assignee: Navico, Inc., Tulsa, OK (US)

( * ) Notice: Subject to any disclaimer, the term of this patent is extended or adjusted under 35 U.S.C. 154(b) by 254 days.

(21) Appl. No.: 18/065,774

(22) Filed: Dec. 14, 2022

(65) Prior Publication Data

US 2023/0111196 A1 Apr. 13, 2023

Related U.S. Application Data

(63) Continuation-in-part of application No. 16/944,186, filed on Jul. 31, 2020, now abandoned.

(51) Int. Cl.
G01S 15/96 (2006.01)
G01S 7/521 (2006.01)
(Continued)

(52) U.S. Cl.
CPC ............ G01S 15/96 (2013.01); G01S 7/521 (2013.01); G01S 15/8902 (2013.01); G10K 11/006 (2013.01); G10K 11/34 (2013.01)

(58) Field of Classification Search
None
See application file for complete search history.

(56) References Cited

U.S. PATENT DOCUMENTS

D278,690 S 5/1985 Steensland et al.
4,970,700 A * 11/1990 Gilmour .............. G10K 11/352
367/88
(Continued)

FOREIGN PATENT DOCUMENTS

CA 2530290 C 11/2005
CA 3032163 A1 8/2019
(Continued)

OTHER PUBLICATIONS

Thompson et al; "Two Dimensional and Three Dimensional Imaging Results Using Blazed Arrays;" MTS/IEEE Oceans 2001. An Ocean Odyssey. Conference Proceedings (IEEE Cat. No. 01CH37295); Nov. 5-8, 2001; pp. 985-987.
(Continued)

*Primary Examiner* — Isam A Alsomiri
*Assistant Examiner* — Vikas Atmakuri
(74) *Attorney, Agent, or Firm* — Nelson Mullins Riley & Scarborough LLP

(57) ABSTRACT

A system is provided for imaging an underwater environment. The system includes two or more arrays of transducer elements. Each array is operated at a fixed phase shift and varies in frequency so as to beamform multiple sonar return beams of a first range of angles and a second range of angles. The arrays can be oriented to create arcs of sonar coverage extending forward from a watercraft, from each side of the watercraft, and downward of the watercraft. Accordingly, multiple 2D live sonar images can be formed. One or more of the multiple sonar return beams can be selected and used to form sonar images that anglers are used to, without requiring separate transducer elements.

23 Claims, 42 Drawing Sheets

(51) Int. Cl.

| | | |
|---|---|---|
| G01S 15/89 | (2006.01) | |
| G10K 11/00 | (2006.01) | |
| G10K 11/34 | (2006.01) | |

(56) References Cited

U.S. PATENT DOCUMENTS

| | | | |
|---|---|---|---|
| D341,093 S | 11/1993 | Smith et al. | |
| 5,923,617 A | 7/1999 | Thompson et al. | |
| 6,678,210 B2 | 1/2004 | Rowe | |
| 7,035,166 B2 | 4/2006 | Zimmerman et al. | |
| 7,106,656 B2 | 9/2006 | Lerro et al. | |
| 7,123,546 B2 | 10/2006 | Zimmerman et al. | |
| 7,173,879 B2 | 2/2007 | Zimmerman et al. | |
| 7,330,399 B2 | 2/2008 | Lerro et al. | |
| D565,977 S | 4/2008 | Ross et al. | |
| 7,355,924 B2 | 4/2008 | Zimmerman et al. | |
| D581,299 S | 11/2008 | Oeth et al. | |
| 7,453,769 B2 | 11/2008 | Kirschner et al. | |
| 7,542,376 B1 | 6/2009 | Thompson et al. | |
| 7,542,377 B2 | 6/2009 | Kirschner et al. | |
| 7,606,114 B2 | 10/2009 | Bachelor et al. | |
| D613,686 S | 4/2010 | Mueller et al. | |
| 7,847,925 B2 | 12/2010 | Vogt | |
| 7,852,709 B1 | 12/2010 | Lerro et al. | |
| 7,889,600 B2 | 2/2011 | Thompson et al. | |
| 7,957,609 B2 | 6/2011 | Lu et al. | |
| 8,254,208 B2 | 8/2012 | Vogt | |
| 8,300,499 B2 | 10/2012 | Coleman et al. | |
| 8,345,511 B1 | 1/2013 | Rikoski | |
| 8,514,659 B2 | 8/2013 | Vogt | |
| 8,638,362 B1 | 1/2014 | Thompson et al. | |
| 8,811,120 B2 | 8/2014 | Bachelor et al. | |
| 8,814,795 B2 | 8/2014 | Derode et al. | |
| RE45,379 E | 2/2015 | Rowe | |
| 8,964,507 B2 | 2/2015 | Bachelor et al. | |
| 9,182,486 B2 | 11/2015 | Brown et al. | |
| RE45,823 E | 12/2015 | Vogt | |
| D751,034 S | 3/2016 | Ye | |
| 9,541,643 B2 * | 1/2017 | Maguire | G01S 15/8902 |
| D778,906 S | 2/2017 | Grübel et al. | |
| 9,664,783 B2 | 5/2017 | Brown et al. | |
| 9,739,884 B2 | 8/2017 | Proctor et al. | |
| 9,766,328 B2 | 9/2017 | Black et al. | |
| 9,784,825 B2 | 10/2017 | Brown et al. | |
| 9,784,826 B2 | 10/2017 | Matson et al. | |
| D803,154 S | 11/2017 | Delmaere | |
| 9,812,118 B2 | 11/2017 | Matson et al. | |
| 9,846,232 B1 | 12/2017 | Thompson et al. | |
| 10,019,002 B2 | 7/2018 | Harnett et al. | |
| 10,067,228 B1 | 9/2018 | Steenstrup et al. | |
| 10,114,119 B2 | 10/2018 | Horner et al. | |
| 10,197,674 B2 | 2/2019 | Thompson et al. | |
| 10,310,062 B2 | 6/2019 | Coleman et al. | |
| D852,655 S | 7/2019 | Gan | |
| D855,021 S | 7/2019 | Ye | |
| 10,408,933 B1 * | 9/2019 | DeHart | G10K 11/006 |
| 10,514,451 B2 | 12/2019 | Brown | |
| 10,545,226 B2 | 1/2020 | Wigh et al. | |
| 10,605,913 B2 | 3/2020 | Coleman et al. | |
| D895,459 S | 9/2020 | Kang | |
| D897,326 S | 9/2020 | Araki | |
| 10,890,660 B2 | 1/2021 | Wigh et al. | |

| | | | |
|---|---|---|---|
| D913,983 S | 3/2021 | Tong et al. | |
| D920,247 S | 5/2021 | Liu | |
| 11,585,921 B2 * | 2/2023 | Proctor | G01S 7/524 |
| 2003/0235112 A1 | 12/2003 | Zimmerman et al. | |
| 2005/0007882 A1 * | 1/2005 | Bachelor | G10K 11/343 367/103 |
| 2007/0159922 A1 * | 7/2007 | Zimmerman | G01S 15/86 367/103 |
| 2010/0067330 A1 | 3/2010 | Collier et al. | |
| 2010/0074057 A1 | 3/2010 | Bachelor et al. | |
| 2010/0284248 A1 | 11/2010 | Wang et al. | |
| 2011/0013485 A1 * | 1/2011 | Maguire | G01S 15/89 367/88 |
| 2014/0050051 A1 | 2/2014 | Vogt | |
| 2017/0212230 A1 | 7/2017 | Wigh et al. | |
| 2017/0371039 A1 | 12/2017 | Clark et al. | |
| 2018/0100922 A1 | 4/2018 | Wigh et al. | |
| 2018/0275649 A1 | 9/2018 | Harnett et al. | |
| 2019/0079185 A1 | 3/2019 | Steenstrup et al. | |
| 2019/0113619 A1 | 4/2019 | Laster | |
| 2019/0235075 A1 | 8/2019 | Thompson et al. | |
| 2019/0242994 A1 | 8/2019 | Wanis et al. | |
| 2019/0265354 A1 | 8/2019 | Antao et al. | |
| 2019/0341732 A1 | 11/2019 | Aaron et al. | |
| 2020/0011965 A1 | 1/2020 | Stokes et al. | |
| 2020/0072953 A1 | 3/2020 | Wigh et al. | |
| 2020/0103512 A1 | 4/2020 | Brown et al. | |
| 2020/0103524 A1 * | 4/2020 | Caspall | G01S 15/8902 |
| 2020/0158842 A1 | 5/2020 | Wigh et al. | |
| 2020/0256967 A1 * | 8/2020 | Wigh | G01S 7/521 |
| 2020/0300994 A1 | 9/2020 | Matson et al. | |
| 2021/0165068 A1 | 6/2021 | Clark | |
| 2022/0035026 A1 | 2/2022 | Proctor | |
| 2022/0035027 A1 | 2/2022 | Proctor et al. | |
| 2024/0061105 A1 * | 2/2024 | Clark | G01S 7/6281 |

FOREIGN PATENT DOCUMENTS

| | | | |
|---|---|---|---|
| EP | 2294452 B1 | 5/2008 | |
| EP | 3084467 A2 | 12/2011 | |
| EP | 3479138 A1 | 10/2016 | |
| EP | 3144700 A1 | 3/2017 | |
| EP | 1925949 A1 | 8/2019 | |
| EP | 1656568 B1 | 12/2019 | |
| JP | 2007-535195 A | 3/2008 | |
| JP | 2008-508539 A | 3/2008 | |
| JP | 2010-261883 A | 11/2010 | |
| JP | 2016-510106 A | 4/2016 | |
| WO | WO 2005/008272 A2 | 2/2006 | |
| WO | WO 2006/017511 A2 | 2/2006 | |
| WO | WO 2014/126847 A2 | 8/2014 | |
| WO | WO 2019/050552 A1 | 5/2019 | |
| WO | WO 2020/114107 A1 | 6/2020 | |

OTHER PUBLICATIONS

Jul. 16, 2014 Video (mentioning SmartFlight); retrieved Jul. 29, 2020 from https://www.youtube.com/watch?v=hkqJh5j6eQA.

SmartFlight 2.0 video; retrieved Jul. 29, 2020 from: http://www.teledynemarine.com/smartflight2-0?ProductLineID=112.

"Garmin Marine Webinars: Panoptix LiveScope Installation and Setup;" YouTube; Apr. 6, 2020; retrieved Jan. 12, 2021 from https://www.youtube.com/watch?v=Z2AiSOmX5PA.

* cited by examiner

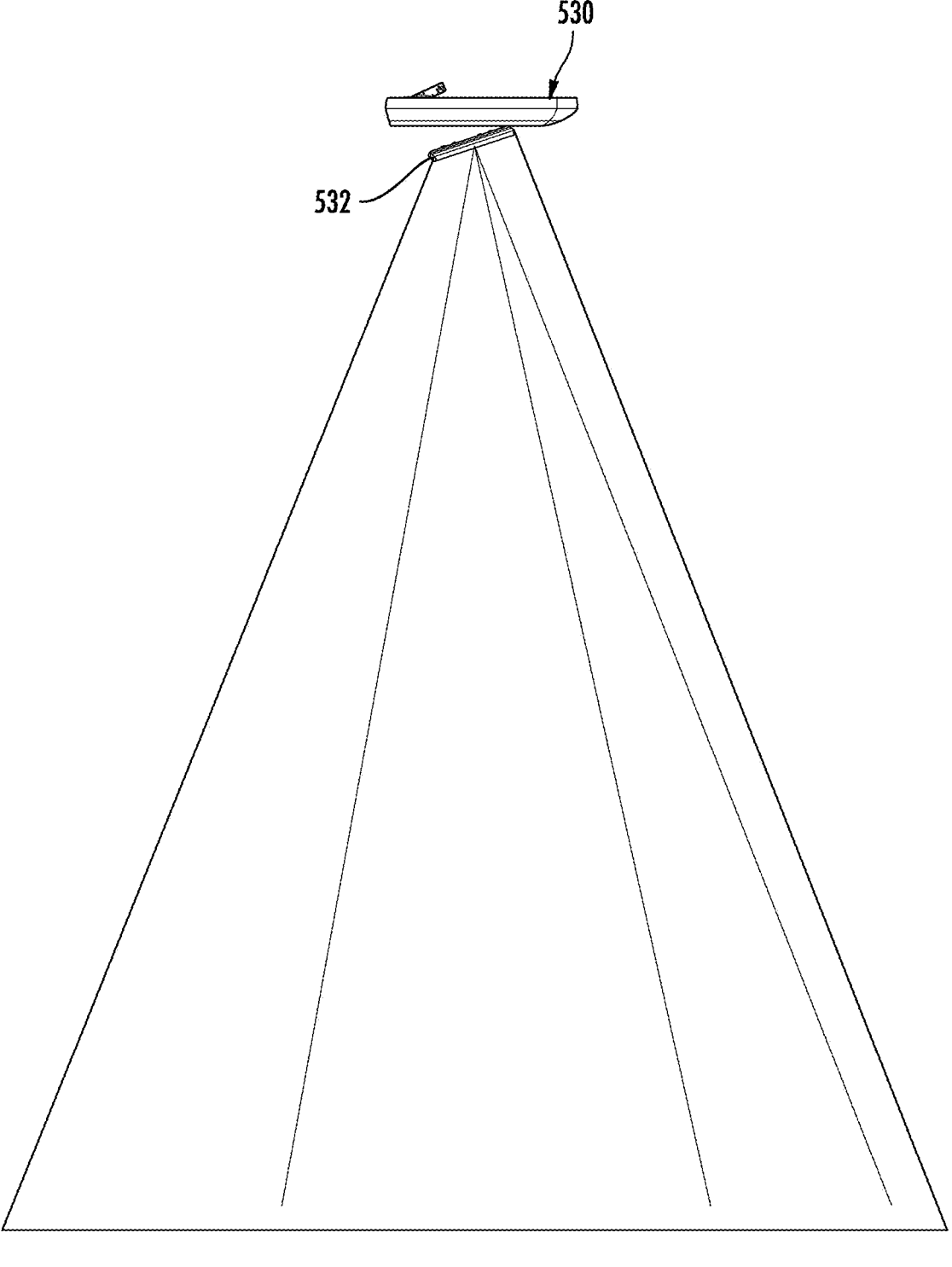
FIG. *13*

BEAMFORMING SONAR SYSTEMS FOR SIDE LIVE SONAR, AND ASSOCIATED METHODS

CROSS-REFERENCE TO RELATED APPLICATION[S]

This application claims priority to and is a continuation-in-part of U.S. application Ser. No. 16/944,186, entitled "Beamforming Sonar System with Improved Sonar Image Functionality, and Associated Methods", filed Jul. 31, 2020, the contents of which is hereby incorporated by reference in its entirety.

FIELD OF THE INVENTION

Embodiments of the present invention relate generally to sonar systems, and more particularly, to beamforming sonar systems that provide "live" sonar imagery.

BACKGROUND OF THE INVENTION

Sonar (SOund Navigation And Ranging) has been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater and provide an understanding of the underwater environment. Sonar transducer elements convert electrical energy into sound or vibrations. Sonar signals are transmitted into and through the water and reflected from encountered objects (e.g., fish, bottom surface, underwater structure, etc.). The transducer elements receive the reflected sound as sonar returns and convert the sound energy into electrical energy (e.g., sonar return data). Based on the known speed of sound, it is possible to determine the distance to and/or location of the waterborne or underwater objects. The sonar return data can also be processed to be displayed on a display device, giving the user a "picture" (or image) of the underwater environment.

Different types of sonar systems provide different sonar functionality, many with differing benefits. As such, there is need for sonar systems with improved sonar image functionality while still providing a reasonable cost to the user (e.g., an angler).

BRIEF SUMMARY OF THE INVENTION

Example embodiments of the present invention provide various sonar systems for imaging an underwater environment. Some example sonar systems include one or more arrays of transducer elements. The array(s) are operated to transmit sonar signals into the underwater environment. The array(s) are also operated at a fixed phase shift but vary in frequency so as to beamform multiple sonar return beams. The multiple sonar return beams can be filtered based on frequency between a first range of angles and between a second range of angles. A gap is formed between the first range of angles and the second range of angles. One or more array(s) can be oriented such that ranges of angles cover, for example, volumes of water to the sides of a watercraft, forward of the watercraft, and downward from the watercraft. Further, with the ability to beamform multiple sonar return beams (e.g., sonar beams with widths of 0.25°-2° each) by varying frequency—precise sonar return data specific to a small slice of the underwater environment can be used, and simultaneous display of multiples of the slices can provide a two-dimensional (2D) near-real time (or "live") sonar image.

As an example, one or more sonar transducer arrays can be oriented to provide for "live" side sonar imagery. In this regard, relative positioning of the array(s) according to various example embodiments provide a left live sonar image and a right live sonar image. In some embodiments, specific orientation and processing can be used to maximize the size and/or quality of the live sonar imagery while minimizing cost and overall footprint of the transducer assembly. Additionally, subsets of the beamformed sonar beams from the one or more arrays can be used to create traditional sidescan sonar imagery. In some such embodiments, desirable attributes of some sidescan sonar imagery can be combined, such as by putting fish arches in a high-definition sidescan sonar image. This can be all accomplished with a single array on each side. Notably, in some embodiments, such features can be accomplished only utilizing a back range of angles of each array, leaving the front range of angles for, for example, additional imagery use, such as forward live sonar imagery.

Further, in some embodiments, one or more additional array(s) may be positioned to provide additional sonar imagery options. For example, a forward facing array may be oriented to provide for live forward sonar imagery (e.g., using a first range of angles) and/or live down sonar imagery (e.g., using a second range of angles). Further, subsets of the beamformed sonar beams can be used to create traditional downscan sonar imagery (e.g., mimicking conical downscan and/or linear downscan sonar imagery). In some such embodiments, desirable attributes of some downscan sonar imagery can be combined, such as by putting fish arches in a high-definition downscan sonar image.

In some embodiments, the above described different types of sonar images (and others described herein) may be achieved with a minimum number of arrays of transducer elements (e.g., two or three arrays as opposed to more arrays). This provides improved sonar functionality at even less of a cost to the user.

In an example embodiment, a system is provided for generating and presenting sonar imagery of an underwater environment. The system includes a sonar transducer assembly mountable to a watercraft, and the sonar transducer assembly includes one or more first sonar transducer arrays positioned and aimed outwardly and downwardly from a first side of the watercraft. Each of the one or more first sonar transducer arrays includes a plurality of first transducer elements. The sonar transducer assembly also includes one or more second sonar transducer arrays positioned and aimed outwardly and downwardly from a second side of the watercraft. Each of the one or more second sonar transducer arrays includes a plurality of second transducer elements, and the second side of the watercraft is opposite the first side of the watercraft. The sonar transducer assembly also includes a display, a processor, and a memory including computer executable instructions. The computer executable instructions are configured to, when executed by the processor, cause the processor to receive first sonar return data from the one or more first sonar transducer arrays, receive second sonar return data from the one or more second sonar transducer arrays, filter the first sonar return data based on frequency to form multiple first sonar return beams corresponding to the first side of the watercraft, filter the second sonar return data based on frequency to form multiple second sonar return beams corresponding to the second side of the watercraft, and generate a first sonar image of the underwater environment that is off to the first side of the watercraft. The first sonar image is a first two-dimensional live sonar image that is formed of the first sonar return data from the multiple first sonar return beams from the one or more first sonar transducer arrays, and the first sonar return data used to form the first two-dimensional live sonar image was received at substantially a same time by the plurality of first transducer elements. The computer executable instructions are also configured to, when executed by the processor, cause the processor to generate a second sonar image of the underwater environment that is off to the second side of the watercraft. The second sonar image is a second two-dimensional live sonar image that is formed of second sonar return data from the multiple second sonar return beams from the one or more second sonar transducer arrays, and the second sonar return data used to form the second two-dimensional live sonar image was received at substantially a same time by the plurality of second transducer elements. The computer executable instructions are also configured to, when executed by the processor, cause the processor to cause presentation of the first sonar image and the second sonar image on the display. The first sonar image is presented on the display to the right of the second sonar image from a viewer's perspective.

In some embodiments, the processor may be further configured to generate a third sonar image of the underwater environment that is a current and historical view of the underwater environment off to both the first side and the second side of the watercraft. The third sonar image may be formed of a first current image slice of sonar image data corresponding to a first subset of the multiple first sonar return beams and a second current image slice of sonar image data corresponding to a second subset of the multiple second sonar return beams. The first subset may be at least one of multiple first sonar return beams and less than or equal to ten of the multiple first sonar return beams, and the second subset may be at least one of multiple second sonar return beams and less than or equal to ten of the multiple second sonar return beams. The first current image slice may be positioned at a top of the third sonar image on a right side of the third sonar image, the second current image slice may be positioned at the top of the third sonar image on a left side of the third sonar image, and the remainder of the third sonar image may be formed of historical slices of sonar image data from prior captured sonar return data from the one or more first sonar transducer arrays and the one or more second sonar transducer arrays. The processor may also be further configured to cause presentation of the third sonar image on the display.

In some embodiments, each of the first subset and the second subset may cover a beam-shaped area of a horizontal plane that is less than five degrees in width.

In some embodiments, the third sonar image may be presented on the display below the first sonar image and the second sonar image.

In some embodiments, the first sonar image may include a first emphasis feature overlaying and indicating the first subset of the multiple first sonar return beams that corresponds to the first current image slice of sonar image data for the third sonar image, and the second sonar image may include a second emphasis feature overlaying and indicating the second subset of the multiple second sonar return beams that corresponds to the second current image slice of sonar image data for the third sonar image.

In some embodiments, the first emphasis feature may be movable on the display, and the second emphasis feature may be movable on the display. The first current image slice of sonar image data for the third sonar image may change according to the placement of the first emphasis feature on the first subset of the multiple first sonar return beams, and the second current image slice of sonar image data for the third sonar image may change according to the placement of the second emphasis feature on the second subset of the multiple second sonar return beams.

In some embodiments, the third sonar image may include a third emphasis feature overlaying and indicating the first current image slice that is positioned at the top of the third sonar image on the right side of the third sonar image, and the third sonar image may include a fourth emphasis feature overlaying and indicating the second current image slice that is positioned at the top of the third sonar image on the left side of the third sonar image.

In some embodiments, the system may further include one or more third sonar transducer arrays positioned and aimed forwardly and downwardly from a front of the watercraft. Each of the one or more third sonar transducer arrays may include a plurality of third transducer elements, and the front of the watercraft may be generally perpendicular to the first side and the second side. The processor may be further configured to receive third sonar return data from the one or more third sonar transducer arrays, filter the third sonar return data based on frequency to form multiple third sonar return beams corresponding to the front of the watercraft, and generate a fourth sonar image of the underwater environment that is either off of the front the watercraft or below the watercraft. The fourth sonar image may be a third two-dimensional live sonar image that is formed of at least third sonar return data from at least some of the multiple third sonar return beams from the one or more third sonar transducer arrays, and the third sonar return data used to form the two-dimensional live sonar image may have been received at substantially a same time by the plurality of third transducer elements.

In some embodiments, the third sonar image may be presented on the display below the first sonar image and the second sonar image, and the fourth sonar image may be presented on the display above the first sonar image and the second sonar image.

In some embodiments, a representation of the watercraft may be presented on the display. The first sonar image may be presented on the display to a right side of the representation corresponding to the first side of the watercraft, the second sonar image may be presented on the display to a left side of the representation corresponding to the second side of the watercraft, and the fourth sonar image may be presented on the display to a top of the representation corresponding to the front of the watercraft.

In some embodiments, the processor may be further configured to generate the third sonar image of the underwater environment as a combined sidescan sonar image that includes sonar imagery based on the first subset of the multiple first sonar return beams, a second subset of the multiple first sonar return beams, the second subset of the multiple second sonar return beams, and a second subset of the multiple second sonar return beams. The right side of the third sonar image may include sonar imagery from the first subset of the multiple first sonar return beams and the second subset of the multiple first sonar return beams, and the left side of the third sonar image may include sonar imagery from the second subset of the multiple second sonar return beams and the second subset of the multiple second sonar return beams. The first subset of the multiple first sonar return beams may include less sonar return beams than the second subset of the multiple first sonar return beams, and the first subset of the multiple second sonar return beams may include less sonar return beams than the second subset of the multiple second sonar return beams.

In some embodiments, the one or more first sonar transducer arrays may be configured to operate at a fixed phase shift and vary in frequency so as to beamform the multiple first sonar return beams between a first range of angles and a second range of angles relative to a first emitting face, and a gap of a third range of angles may separate the first range of angles and the second range of angles. The one or more second sonar transducer arrays may be configured to operate at a fixed phase shift and vary in frequency so as to beamform the multiple second sonar return beams between a fourth range of angles and a fifth range of angles relative to a second emitting face, and a gap of a sixth range of angles may separate the fourth range of angles and the fifth range of angles. The first sonar image may be formed of first sonar return data from the first range of angles of the multiple first sonar return beams from the one or more first sonar transducer arrays, and the second sonar image may be formed of second sonar return data from the fourth range of angles of the multiple second sonar return beams from the one or more second sonar transducer arrays.

In some embodiments, a third sonar image may be formed by combining first sonar return data from the second range of angles of the multiple first sonar return beams from the one or more first sonar transducer arrays and second sonar return data from the fifth range of angles of the multiple second sonar return beams from the one or more second sonar transducer arrays.

In some embodiments, each of the first, second, fourth, and fifth ranges of angles may cover a volume of water in a horizontal plane outside of the watercraft that is between 20 and 40 degrees in width.

In some embodiments, the one or more first sonar transducer array may be a single first sonar transducer array, and the one or more second sonar transducer array may be a single second sonar transducer array.

In another example embodiment, a marine electronic device is provided for generating and presenting sonar imagery of an underwater environment. The marine electronic device includes a display, a processor, and a memory including computer executable instructions. The computer executable instructions are configured to, when executed by the processor, cause the processor to receive first sonar return data from one or more first sonar transducer arrays. The one or more first sonar transducer arrays are positioned and aimed outwardly and downwardly from a first side of the watercraft, and each of the one or more first sonar transducer arrays includes a plurality of first transducer elements. The computer executable instructions are also configured to, when executed by the processor, cause the processor to receive second sonar return data from one or more second sonar transducer arrays. The one or more second sonar transducer arrays are positioned and aimed outwardly and downwardly from a second side of the watercraft, and each of the one or more second sonar transducer arrays includes a plurality of second transducer elements. The second side of the watercraft is opposite the first side of the watercraft. The computer executable instructions are also configured to, when executed by the processor, cause the processor to filter the first sonar return data based on frequency to form multiple first sonar return beams corresponding to the first side of the watercraft, filter the second sonar return data based on frequency to form multiple second sonar return beams corresponding to the second side of the watercraft, and generate a first sonar image of the underwater environment that is off to the first side of the watercraft. The first sonar image is a two-dimensional live sonar image that is formed of the first sonar return data from the multiple first sonar return beams from the one or more first sonar transducer arrays, and the first sonar return data used to form the two-dimensional live sonar image was received at substantially a same time by the plurality of first transducer elements. The computer executable instructions are also configured to, when executed by the processor, cause the processor to generate a second sonar image of the underwater environment that is off to the second side of the watercraft. The second sonar image is a two-dimensional live sonar image that is formed of second sonar return data from the multiple second sonar return beams from the one or more second sonar transducer arrays, and the second sonar return data used to form the two-dimensional live sonar image was received at substantially a same time by the plurality of second transducer elements. The computer executable instructions are also configured to, when executed by the processor, cause the processor to cause presentation of the first sonar image and the second sonar image on the display. The first sonar image is presented on the display to the right of the second sonar image from a viewer's perspective.

In some embodiments, the processor may be further configured to generate a third sonar image of the underwater environment that is a current and historical view of the underwater environment off to both the first side and the second side of the watercraft. The third sonar image may be formed of a first current image slice of sonar image data corresponding to a first subset of the multiple first sonar return beams and a second current image slice of sonar image data corresponding to a second subset of the multiple second sonar return beams. The first subset may be at least one of multiple first sonar return beams and less than or equal to ten of the multiple first sonar return beams, and the second subset may be at least one of multiple second sonar return beams and less than or equal to ten of the multiple second sonar return beams. The first current image slice may be positioned at a top of the third sonar image on a right side of the third sonar image, the second current image slice may be positioned at the top of the third sonar image on a left side of the third sonar image, and the remainder of the third sonar image may be formed of historical slices of sonar image data from prior captured sonar return data from the one or more first sonar transducer arrays and the one or more second sonar transducer arrays. The processor may be further configured to cause presentation of the third sonar image on the display.

In some embodiments, the processor may be further configured to receive third sonar return data from one or more third sonar transducer arrays. The one or more third sonar transducer arrays may be positioned and aimed forwardly and downwardly from a front of the watercraft, and each of the one or more third sonar transducer arrays may include a plurality of third transducer elements. The front of the watercraft may be generally perpendicular to the first side and the second side. The processor may be further configured to filter the third sonar return data based on frequency to form multiple third sonar return beams corresponding to the front of the watercraft and generate a fourth sonar image of the underwater environment that is either off of the front of the watercraft or below the watercraft. The fourth sonar image may be a two-dimensional live sonar image that is formed of at least third sonar return data from at least some of the multiple third sonar return beams from the one or more third sonar transducer arrays, and the third sonar return data used to form the two-dimensional live sonar image may have been received at substantially a same time by the plurality of third transducer elements.

In some embodiments, the one or more first sonar transducer arrays may be configured to operate at a fixed phase shift and vary in frequency so as to beamform the multiple first sonar return beams between a first range of angles and a second range of angles relative to a first emitting face, and a gap of a third range of angles may separate the first range of angles and the second range of angles. The one or more second sonar transducer arrays may be configured to operate at a fixed phase shift and vary in frequency so as to beamform the multiple second sonar return beams between a fourth range of angles and a fifth range of angles relative to a second emitting face, and a gap of a sixth range of angles may separate the fourth range of angles and the fifth range of angles. The first sonar image may be formed of first sonar return data from the first range of angles of the multiple first sonar return beams from the one or more first sonar transducer arrays, and the second sonar image may be formed of second sonar return data from the fourth range of angles of the multiple second sonar return beams from the one or more second sonar transducer arrays.

In some embodiments, a third sonar image may be formed by combining first sonar return data from the second range of angles of the multiple first sonar return beams from the one or more first sonar transducer arrays and second sonar return data from the fifth range of angles of the multiple second sonar return beams from the one or more second sonar transducer arrays.

In another example embodiment, a method is provided for generating and presenting sonar imagery of an underwater environment. The method includes receiving first sonar return data from one or more first sonar transducer arrays. The one or more first sonar transducer arrays are positioned and aimed outwardly and downwardly from a first side of a watercraft, and each of the one or more first sonar transducer arrays includes a plurality of first transducer elements. The method also includes receiving second sonar return data from one or more second sonar transducer arrays. The one or more second sonar transducer arrays are positioned and aimed outwardly and downwardly from a second side of the watercraft, and each of the one or more second sonar transducer arrays comprises a plurality of second transducer elements. The second side of the watercraft is opposite the first side of the watercraft. The method also includes filtering the first sonar return data based on frequency to form multiple first sonar return beams corresponding to the first side of the watercraft, filtering the second sonar return data based on frequency to form multiple second sonar return beams corresponding to the second side of the watercraft, and generating a first sonar image of the underwater environment that is off to the first side of the watercraft. The first sonar image is a two-dimensional live sonar image that is formed of the first sonar return data from the multiple first sonar return beams from the one or more first sonar transducer arrays, and the first sonar return data used to form the two-dimensional live sonar image was received at substantially a same time by the plurality of first transducer elements. The method also includes generating a second sonar image of the underwater environment that is off to the second side of the watercraft. The second sonar image is a two-dimensional live sonar image that is formed of second sonar return data from the multiple second sonar return beams from the one or more second sonar transducer arrays, and the second sonar return data used to form the two-dimensional live sonar image was received at substantially a same time by the plurality of second transducer elements. The method also includes causing presentation of the first sonar image and the second sonar image on a display. The first sonar image is presented on the display to the right of the second sonar image from a viewer's perspective.

In another example embodiment, a sonar transducer assembly mountable to a watercraft is provided. The assembly includes a housing and at least one first sonar transducer array positioned within the housing and aimed outwardly and downwardly from a first side of the watercraft. Each of the at least one first sonar transducer array includes a plurality of first transducer elements. The assembly also includes at least one second sonar transducer array positioned within the housing and aimed outwardly and downwardly from a second side of the watercraft. Each of the at least one second sonar transducer array includes a plurality of second transducer elements, and the first side is opposite the second side. The plurality of first transducer elements of the at least one first sonar transducer array are configured to operate at a fixed phase shift and vary in frequency so as to beamform multiple first sonar return beams for receiving sonar return data from a first portion of an underwater environment off the first side of the watercraft, and the plurality of second transducer elements of the at least one second transducer array are configured to operate at a fixed phase shift and vary in frequency so as to beamform multiple second sonar return beams for receiving sonar return data from a second portion of the underwater environment off the second side of the watercraft.

In some embodiments, the plurality of first transducer elements of the at least one first sonar transducer array may be configured to beamform the multiple first sonar return beams between a first range of angles and a second range of angles relative to a first emitting face, and a gap of a third range of angles may separate the first range of angles and the second range of angles. The plurality of second transducer elements of the at least one second sonar transducer array may be configured to beamform the multiple second sonar return beams between a fourth range of angles and a fifth range of angles relative to a second emitting face, and a gap of a sixth range of angles may separate the fourth range of angles and the fifth range of angles.

In some embodiments, the assembly may define a mounting plane corresponding to a surface of a body of water. A first longitudinal axis of the at least one first sonar transducer array may extend at a first angle with respect to the mounting plane, and a second longitudinal axis of the at least one second sonar transducer array may extend at a second angle with respect to the mounting plane.

In some embodiments, the first angle may be a first acute angle extending downward from the mounting plane, and a first front end of the first longitudinal axis may be positioned higher than a first back end of the first longitudinal axis relative to the mounting plane. The second angle may be a second acute angle extending downward from the mounting plane, and a second front end of the second longitudinal axis may be positioned higher than a second back end of the second longitudinal axis relative to the mounting plane.

In some embodiments, the assembly may define a vertical centerline plane that is perpendicular to a surface of a body of water. A first longitudinal axis of the at least one first sonar transducer array may extend at a first angle with respect to the vertical centerline plane, and a second longitudinal axis of the at least one second sonar transducer array may extend at a second angle with respect to the vertical centerline plane.

In some embodiments, the first angle may be a first acute angle extending outward from the vertical centerline plane, and a first front end of the first longitudinal axis may be positioned inward from a first back end of the first longitudinal axis relative to the vertical centerline plane. The second angle may be a second acute angle extending outward from the vertical centerline plane, and a second front end of the second longitudinal axis may be positioned inward from a second back end of the second longitudinal axis relative to the vertical centerline plane.

In some embodiments, the assembly may further include at least one third sonar transducer array positioned within the housing and aimed outwardly and downwardly from a front of the watercraft. Each of the at least one third transducer array may include a plurality of third transducer elements, and each of the plurality of third transducer elements of the at least one third sonar transducer array may be configured to operate at a fixed phase shift and vary in frequency so as to beamform multiple third sonar return beams for receiving sonar return data from a third portion of the underwater environment off the front of the watercraft.

In some embodiments, the assembly may define a vertical centerline plane that is perpendicular to a surface of a body of water, and a longitudinal axis of the at least one third sonar transducer array may be parallel to the vertical centerline plane.

In some embodiments, each of the plurality of first transducer elements and the plurality of second transducer elements may define a length and a width, and the length of each of the plurality of first and second transducer elements may be greater than the width of each of the plurality of first and second transducer elements.

In some embodiments, the at least one first sonar transducer array and the at least one second sonar transducer array may be collectively capable of producing at least four different sonar images of an underwater environment, and the at least three different sonar images may include a two-dimensional live left-side sonar image, a two-dimensional live right-side sonar image, and a current and historical sidescan sonar image.

In some embodiments, the at least one first sonar transducer array may be a single first sonar transducer array, and the at least one second sonar transducer array may be a single second sonar transducer array.

In another example embodiment, a system is provided for imaging an underwater environment. The system includes a housing, and the housing includes at least one first sonar transducer array positioned within the housing and aimed outwardly and downwardly from a first side of the watercraft. Each of the at least one first sonar transducer array includes a plurality of first transducer elements. The housing also includes at least one second sonar transducer array positioned within the housing and aimed outwardly and downwardly from a second side of the watercraft. Each of the at least one second sonar transducer array includes a plurality of second transducer elements. The plurality of first transducer elements of the at least one first sonar transducer array are configured to operate at a fixed phase shift and vary in frequency so as to beamform multiple first sonar return beams for receiving sonar return data from a first portion of an underwater environment, and the plurality of second transducer elements of the at least one second sonar transducer array are configured to operate at a fixed phase shift and vary in frequency so as to beamform multiple second sonar return beams for receiving sonar return data from a second portion of the underwater environment off the second side of the watercraft. The system also includes a display, a processor, and a memory including computer executable instructions. The computer executable instructions are configured to, when executed by the processor, cause the processor to receive first sonar return data from the at least one first sonar transducer arrays, receive second sonar return data from the at least one second sonar transducer arrays, filter the first sonar return data based on frequency to form multiple first sonar return beams corresponding to the first side of the watercraft, filter the second sonar return data based on frequency to form multiple second sonar return beams corresponding to the second side of the watercraft, and generate a first sonar image of the underwater environment that is off to the first side of the watercraft. The first sonar image is a first two-dimensional live sonar image that is formed of the first sonar return data from the multiple first sonar return beams from the at least one first sonar transducer arrays, and the first sonar return data used to form the first two-dimensional live sonar image was received at substantially a same time by the plurality of first transducer elements. The computer executable instructions are also configured to, when executed by the processor, cause the processor to generate a second sonar image of the underwater environment that is off to the second side of the watercraft. The second sonar image is a second two-dimensional live sonar image that is formed of second sonar return data from the multiple second sonar return beams from the at least one second sonar transducer arrays, and the second sonar return data used to form the second two-dimensional live sonar image was received at substantially a same time by the plurality of second transducer elements. The computer executable instructions are also configured to, when executed by the processor, cause the processor to cause presentation of the first sonar image and the second sonar image on the display. The first sonar image is presented on the display to the right of the second sonar image from a viewer's perspective.

In some embodiments, the housing may further include at least one third sonar transducer array positioned within the housing and aimed outwardly and downwardly from a front of the watercraft. Each of the at least one third transducer arrays may include a plurality of third transducer elements, and the plurality of third transducer elements of the at least one third sonar transducer array may be configured to operate at a fixed phase shift and vary in frequency so as to beamform multiple third sonar return beams for receiving sonar return data from a third portion of the underwater environment off the front of the watercraft. The processor may be further configured to receive third sonar return data from the at least one third sonar transducer array, filter the third sonar return data based on frequency to form multiple third sonar return beams corresponding to the front of the watercraft, and generate a third sonar image of the underwater environment that is off of the front the watercraft. The third sonar image may be a two-dimensional live sonar image that is formed of at least third sonar return data from at least some of the multiple third sonar return beams from the at least one third sonar transducer array, and the third sonar return data used to form the two-dimensional live sonar image may have been received at substantially a same time by the plurality of third transducer elements.

In some embodiments, the third sonar image may be presented on the display below the first sonar image and the second sonar image.

In some embodiments, a representation of the watercraft may be presented on the display. The first sonar image may be presented on the display to a right side of the representation corresponding to the first side of the watercraft, the second sonar image may be presented on the display to a left side of the representation corresponding to the second side of the watercraft, and the fourth sonar image may be presented on the display to a top of the representation corresponding to the front of the watercraft.

In some embodiments, the system may define a mounting plane corresponding to a surface of a body of water. A first longitudinal axis of the at least one first sonar transducer array may extend at a first angle with respect to the mounting plane, and a second longitudinal axis of the at least one second sonar transducer array may extend at a second angle with respect to the mounting plane.

In some embodiments, the system may define a vertical centerline plane that is perpendicular to a surface of a body of water. A first longitudinal axis of the at least one first sonar transducer array may extend at a third angle with respect to the vertical centerline plane, and a second longitudinal axis of the at least one second sonar transducer array may extend at a fourth angle with respect to the vertical centerline plane.

In some embodiments, the plurality of first transducer elements of the at least one first sonar transducer array may be configured to beamform the multiple first sonar return beams between a first range of angles and a second range of angles relative to a first emitting face, and a gap of a third range of angles may separate the first range of angles and the second range of angles. The plurality of second transducer elements of the at least one second sonar transducer array may be configured to beamform the multiple second sonar return beams between a fourth range of angles and a fifth range of angles relative to a second emitting face, and a gap of a sixth range of angles may separate the fourth range of angles and the fifth range of angles.

In some embodiments, a third sonar image may be formed by combining first sonar return data from the second range of angles of the multiple first sonar return beams from the at least one first sonar transducer arrays and second sonar return data from the fifth range of angles of the multiple second sonar return beams from the at least one second sonar transducer arrays.

In some embodiments, each of the first, second, fourth, and fifth ranges of angles may cover a volume of water in a horizontal plane outside of the watercraft that is between 20 and 40 degrees in width.

In another example embodiment, a sonar transducer assembly mountable to a watercraft is provided. The assembly includes a housing and at least one first sonar transducer array positioned within the housing and aimed outwardly and downwardly from a first side of the watercraft. Each of the at least one first sonar transducer array includes a plurality of first transducer elements. The assembly also includes at least one second sonar transducer array positioned within the housing and aimed outwardly and downwardly from a second side of the watercraft. Each of the at least one second sonar transducer array includes a plurality of second transducer elements. The plurality of first transducer elements of the at least one first sonar transducer array are configured to operate at a fixed phase shift and vary in frequency so as to beamform multiple first sonar return beams for receiving sonar return data from a first portion of an underwater environment off the first side of the watercraft, and the plurality of second transducer elements of the at least one second transducer array are configured to operate at a fixed phase shift and vary in frequency so as to beamform multiple second sonar return beams for receiving sonar return data from a second portion of the underwater environment off the second side of the watercraft. A first longitudinal axis of the at least one first sonar transducer array extends at a first angle with respect to a vertical centerline plane that is perpendicular to a surface of a body of water, and a second longitudinal axis of the at least one second sonar transducer array extends at a second angle with respect to the vertical centerline plane.

In another example embodiment, a sonar transducer assembly mountable to a watercraft is provided for producing sonar imagery of an underwater environment relative to the watercraft. The assembly includes a housing and a first sonar transducer array positioned within the housing. The first sonar transducer array includes a plurality of first transducer elements, and the plurality of first transducer elements of the first sonar transducer array are configured to operate at a fixed phase shift and vary in frequency so as to beamform multiple first sonar return beams from among a first range of angles and a second range of angles within the underwater environment. The first range of angles is separated from the second range of angles with a first gap range of angles therebetween. The assembly also includes a second sonar transducer array positioned within the housing. The second sonar transducer array includes a plurality of second transducer elements, and the plurality of second transducer elements of the second sonar transducer array are configured to operate at a fixed phase shift and vary in frequency so as to beamform multiple second sonar return beams from among a third range of angles and a fourth range of angles within the underwater environment. The third range of angles is separated from the fourth range of angles with a second gap range of angles therebetween. The first sonar transducer array is positioned within the housing and aimed relative to the second sonar transducer array so as to enable, from sonar return data from the first sonar transducer array and the second sonar transducer array, simultaneous formation of at least a two-dimensional live left-side sonar image, a two-dimensional live right-side sonar image, and a current and historical sidescan sonar image.

In some embodiments, the two-dimensional live right-side sonar image may be formed of sonar return data from the first range of angles of the multiple first sonar return beams from the first sonar transducer array, and the two-dimensional live left-side sonar image may be formed of sonar return data from the fourth range of angles of the multiple second sonar return beams from the second sonar transducer array.

In some embodiments, the current and historical sidescan sonar image may be formed of a first current image slice of sonar image data corresponding to a first subset of the first range of angles of the multiple first sonar return beams and a second current image slice of sonar image data corresponding to a second subset of the fourth range of angles of the multiple second sonar return beams. The first subset may be at least one of the multiple first sonar return beams and less than or equal to ten of the multiple first sonar return beams, and the second subset may be at least one of the multiple second sonar return beams and less than or equal to ten of the multiple second sonar return beams. The first current image slice may be positioned at a top of the current and historical sidescan sonar image on a right side of the current and historical sidescan sonar image, the second current image slice may be positioned at the top of the current and historical sidescan sonar image on a left side of the current and historical sidescan sonar image, and the remainder of the current and historical sidescan sonar image may be formed of historical slices of sonar image data from prior captured sonar return data from the first sonar transducer array and the second sonar transducer array.

In some embodiments, the first and second sonar transducer arrays may be further configured to enable simultaneous formation of at least a two-dimensional live left-side sonar image, a two-dimensional live right-side sonar image, a current and historical sidescan sonar image, and a two-dimensional live forward or forward-wide sonar image.

In some embodiments, the first sonar transducer array may be a single first sonar transducer array, and the second sonar transducer array may be a single second sonar transducer array.

In some embodiments, the two-dimensional live forward or forward-wide sonar image may be formed of sonar return data from the second range of angles of the multiple first sonar return beams from the first sonar transducer array and sonar return data from the third range of angles of the multiple second sonar return beams from the second sonar transducer array.

In some embodiments, the assembly may further include a third sonar transducer array positioned within the housing. The third sonar transducer array may include a plurality of third transducer elements, and the plurality of third transducer elements of the third sonar transducer array may be configured to operate at a fixed phase shift and vary in frequency so as to beamform multiple third sonar return beams from among a fifth range of angles and a sixth range of angles within the underwater environment. The fifth range of angles may be separated from the sixth range of angles with a third gap range of angles therebetween.

In some embodiments, each of the first, second, third, fourth, fifth, and sixth ranges of angles may cover a beam-shaped volume of the underwater environment that is between twenty and forty-five degrees in width.

In some embodiments, the first sonar transducer array may be positioned within the housing and aimed relative to the second sonar transducer array, and the third sonar transducer array may be positioned within the housing and aimed relative to the first and second sonar transducer arrays, so as to enable, from sonar return data from the first, second, and third sonar transducer arrays, simultaneous formation of at least a two-dimensional live left-side sonar image, a two-dimensional live right-side sonar image, a current and historical sidescan sonar image, a current and historical linear downscan sonar image, a current and historical conical downscan sonar image, a two-dimensional live downscan sonar image, and a two-dimensional live forward sonar image.

In some embodiments, the first sonar transducer array may be a single first sonar transducer array, the second sonar transducer array may be a single second sonar transducer array, and the third sonar transducer array may be a single third sonar transducer array.

In some embodiments, the current and historical linear downscan sonar image may be formed of a third current image slice of sonar image data corresponding to a third subset of the sixth range of angles of the multiple third sonar return beams. The third subset may be at least one of the multiple third sonar return beams and less than or equal to ten of the multiple third sonar return beams. The third current image slice may be positioned on a right side of the current and historical linear downscan sonar image, and the remainder of the current and historical linear downscan sonar image may be formed of historical slices of sonar image data from prior captured sonar return data from the third sonar transducer array.

In some embodiments, the third subset may be at least one of the multiple third sonar return beams and less than or equal to four of the multiple third sonar return beams.

In some embodiments, the current and historical conical downscan sonar image may be formed of a third current image slice of sonar image data corresponding to a third subset of the sixth range of angles of the multiple third sonar return beams. The third subset may be at least four of the multiple third sonar return beams and less than or equal to thirty of the multiple third sonar return beams. The third current image slice may be positioned on a right side of the current and historical conical downscan sonar image, and the remainder of the current and historical conical downscan sonar image may be formed of historical slices of sonar image data from prior captured sonar return data from the third sonar transducer array.

In some embodiments, the third subset may be at least ten of the multiple third sonar return beams and less than or equal to twenty of the multiple third sonar return beams.

In some embodiments, the two-dimensional live downscan sonar image may be formed of sonar return data from the sixth range of angles of the multiple third sonar return beams from the third sonar transducer array.

In some embodiments, the two-dimensional live forward sonar image may be formed of sonar return data from the fifth range of angles of the multiple third sonar return beams from the third sonar transducer array.

In another example embodiment, a system is provided for generating and presenting sonar imagery of an underwater environment. The system includes a housing and a first sonar transducer array positioned within the housing. The first sonar transducer array includes a plurality of first transducer elements, and the plurality of first transducer elements of the first sonar transducer array are configured to operate at a fixed phase shift and vary in frequency so as to beamform multiple first sonar return beams from among a first range of angles and a second range of angles within the underwater environment. The first range of angles is separated from the second range of angles with a first gap range of angles therebetween. The system also includes a second sonar transducer array positioned within the housing, and the second sonar transducer array comprises a plurality of second transducer elements, wherein the plurality of second transducer elements of the second sonar transducer array are configured to operate at a fixed phase shift and vary in frequency so as to beamform multiple second sonar return beams from among a third range of angles and a fourth range of angles within the underwater environment. The third range of angles is separated from the fourth range of angles with a second gap range of angles therebetween. The system also includes a display, a processor, and a memory including computer executable instructions. The first sonar transducer array is positioned within the housing and aimed relative to the second sonar transducer array so as to enable the computer executable instructions to cause the processor to, from sonar return data from the first sonar transducer array and the second sonar transducer array, simultaneously form at least a two-dimensional live left-side sonar image, a two-dimensional live right-side sonar image, and a current and historical sidescan sonar image.

In some embodiments, the first and second sonar transducers may be further configured to enable simultaneous formation of at least a two-dimensional live left-side sonar image, a two-dimensional live right-side sonar image, a current and historical sidescan sonar image, and a two-dimensional live forward or forward-wide sonar image.

In some embodiments, the two-dimensional live forward or forward-wide sonar image may be formed of sonar return data from the second range of angles of the multiple first sonar return beams from the first sonar transducer array and sonar return data from the third range of angles of the multiple second sonar return beams from the second sonar transducer array.

In some embodiments, the system may be further comprised of a third sonar transducer array positioned within the housing. The third sonar transducer array may include a plurality of third transducer elements, and the plurality of third transducer elements of the third sonar transducer array may be configured to operate at a fixed phase shift and vary in frequency so as to beamform multiple third sonar return beams from among a fifth range of angles and a sixth range of angles within the underwater environment. The fifth range of angles may be separated from the sixth range of angles with a third gap range of angles therebetween.

In some embodiments, each of the first, second, third, fourth, fifth, and sixth ranges of angles may cover a beam-shaped volume of the underwater environment that is between twenty and forty-five degrees in width.

In some embodiments, the first sonar transducer array may be positioned within the housing and aimed relative to the second sonar transducer array, and the third sonar transducer array may be positioned within the housing and aimed relative to the first and second sonar transducer arrays, so as to enable, from sonar return data from the first, second, and third sonar transducer arrays, simultaneous formation of at least a two-dimensional live left-side sonar image, a two-dimensional live right-side sonar image, a current and historical sidescan sonar image, a current and historical linear downscan sonar image, a current and historical conical downscan sonar image, a two-dimensional live downscan sonar image, and a two-dimensional live forward sonar image.

In another example embodiment, a sonar transducer assembly mountable to a watercraft is provided for producing sonar imagery of an underwater environment relative to the watercraft. The assembly includes a housing and a first sonar transducer array positioned within the housing. The first sonar transducer array includes a plurality of first transducer elements, and the plurality of first transducer elements of the first sonar transducer array are configured to operate at a fixed phase shift and vary in frequency so as to beamform multiple first sonar return beams from among a first range of angles and a second range of angles within the underwater environment. The first range of angles is separated from the second range of angles with a first gap range of angles therebetween. The assembly also includes a second sonar transducer array positioned within the housing, and the second sonar transducer array comprises a plurality of second transducer elements, wherein the plurality of second transducer elements of the second sonar transducer array are configured to operate at a fixed phase shift and vary in frequency so as to beamform multiple second sonar return beams from among a third range of angles and a fourth range of angles within the underwater environment. The third range of angles is separated from the fourth range of angles with a second gap range of angles therebetween. The first sonar transducer array is positioned within the housing and aimed relative to the second sonar transducer array so as to enable, from sonar return data from the first sonar transducer array and the second sonar transducer array, simultaneous formation of at least three sonar images.

In some embodiments, the first and second sonar transducers may be further configured to enable simultaneous formation of at least four sonar images.

Associated methods of operating and manufacturing various example systems and transducer assemblies described herein are also contemplated.

BRIEF DESCRIPTION OF THE DRAWINGS

Figure 1:
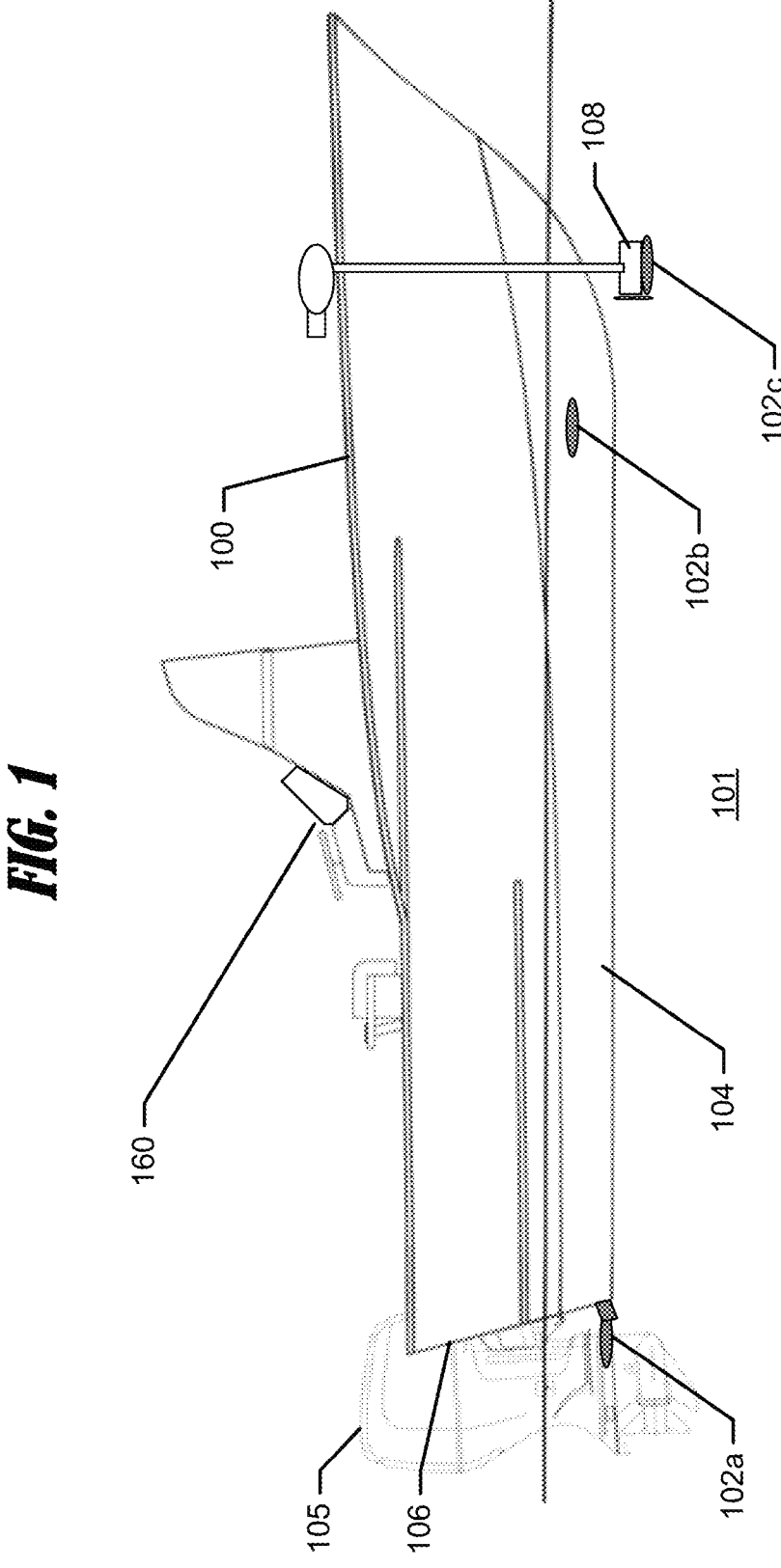
Figures 2A, 2B:
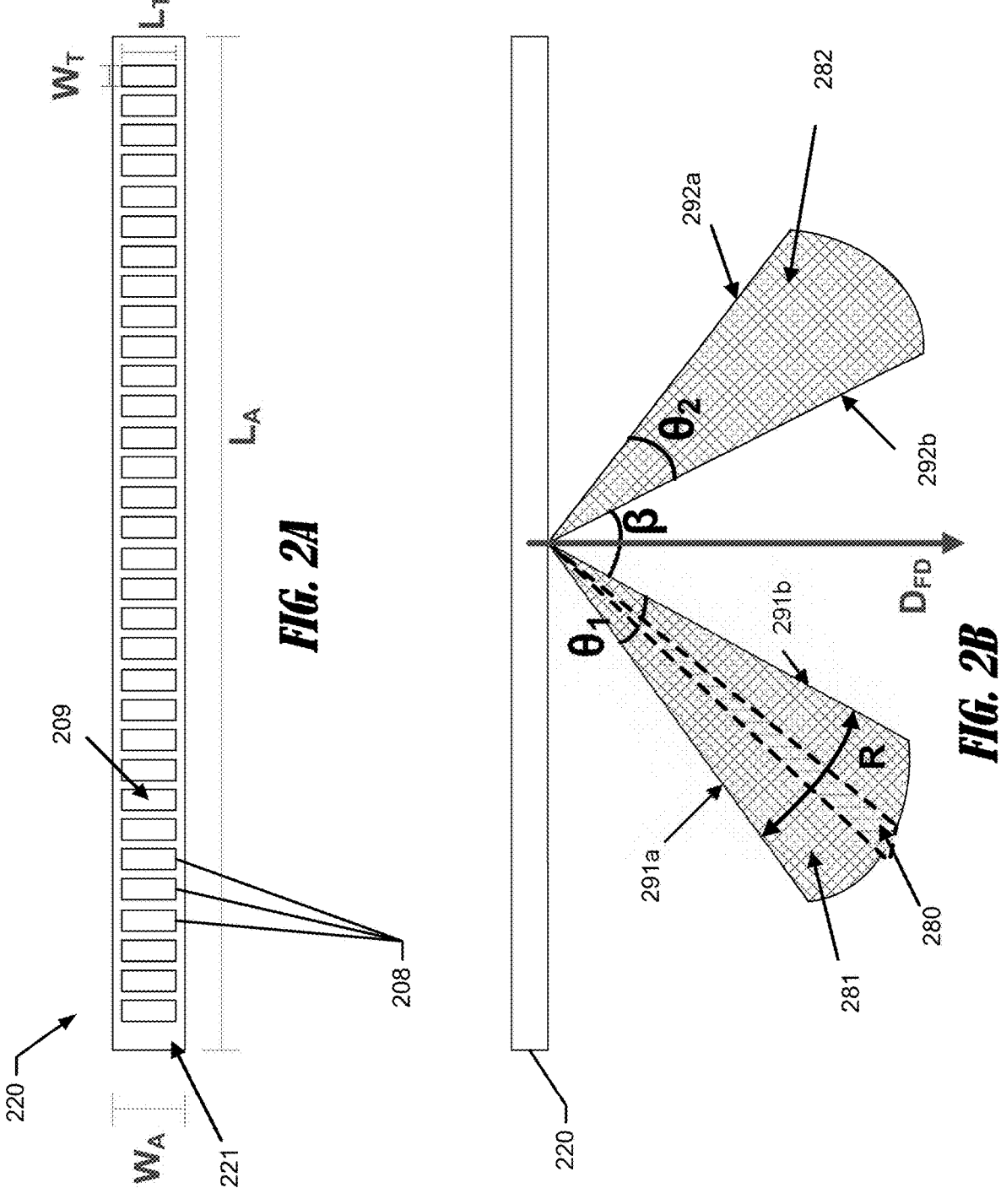
Figure 2C:
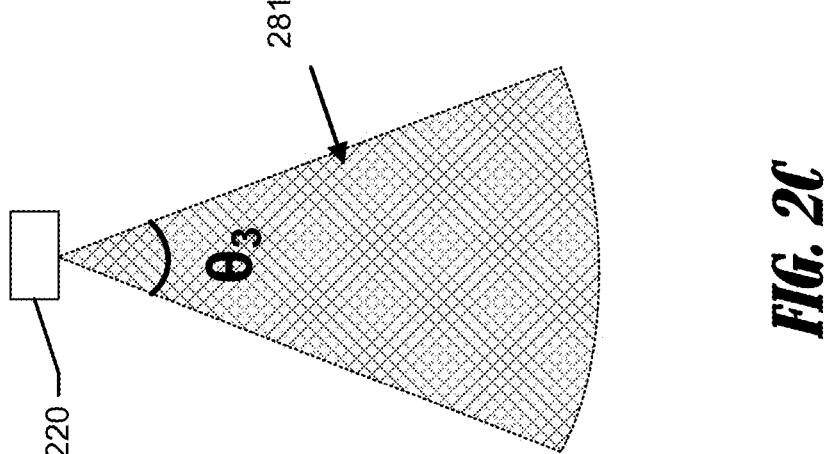
Figure 3:
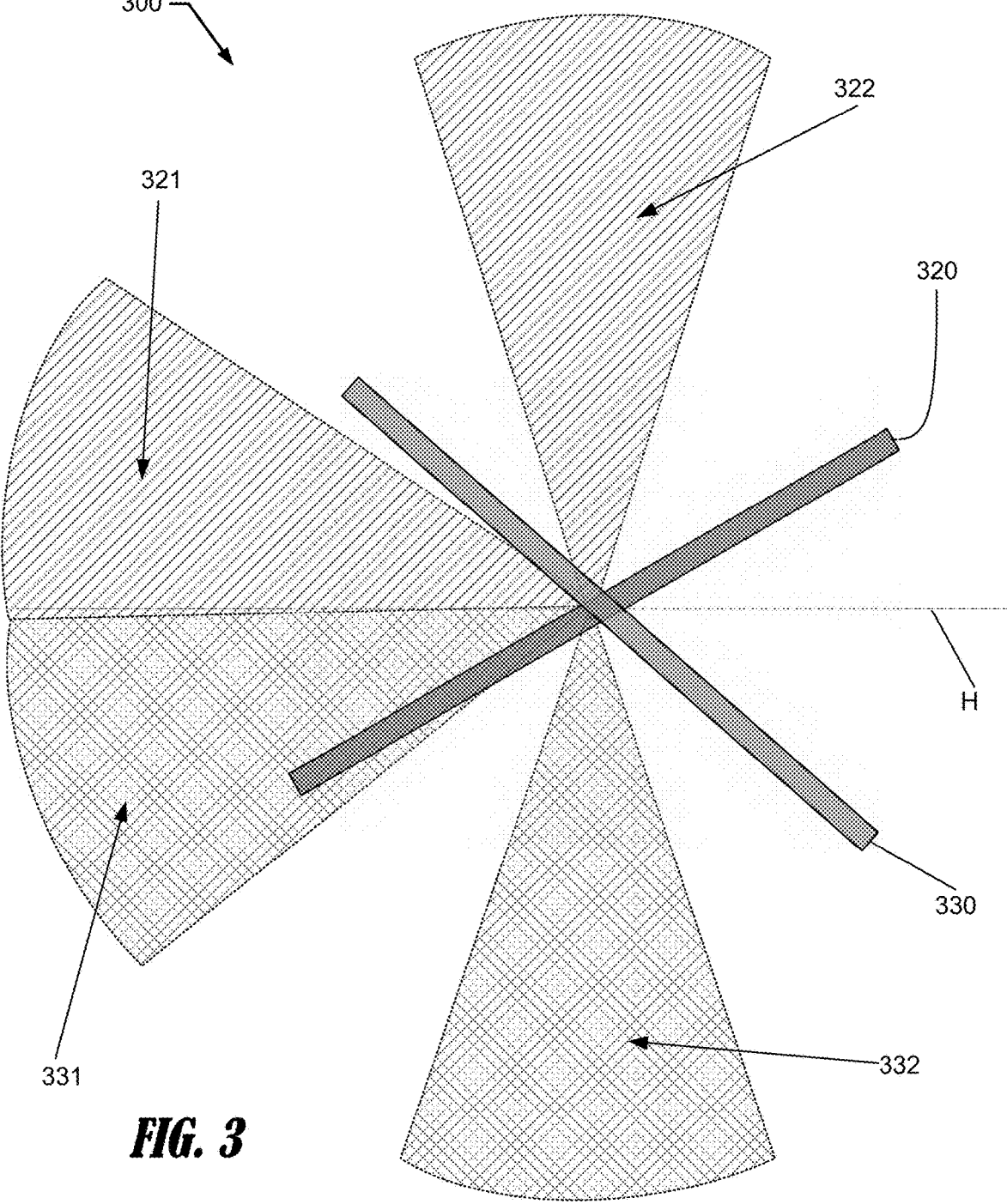
Figure 3A:
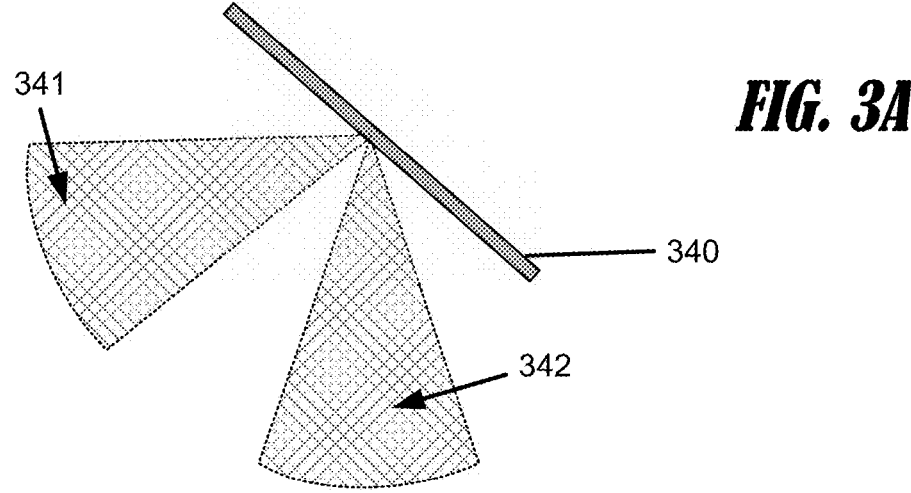
Figure 3B:
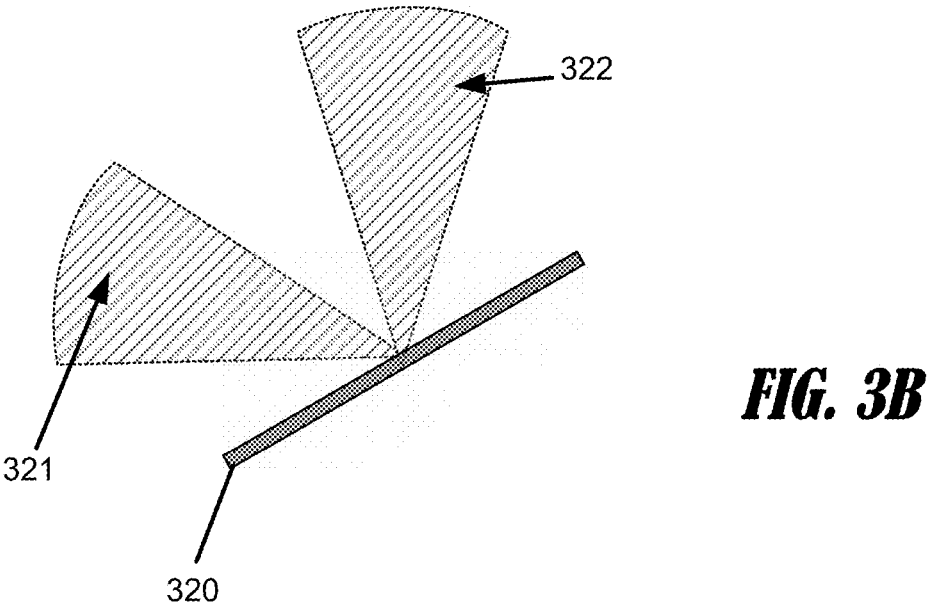
Figure 4A:
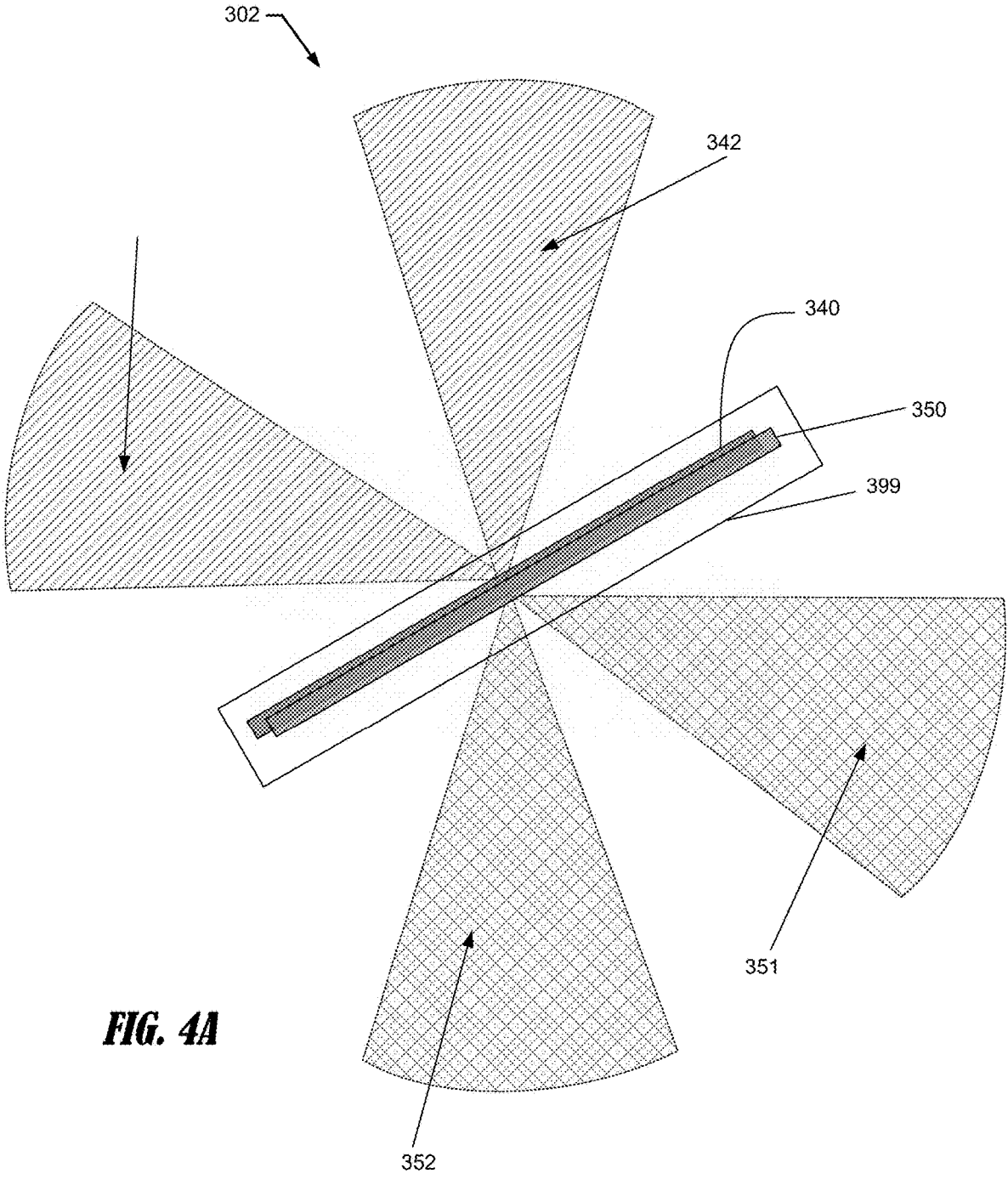
Figure 4B:
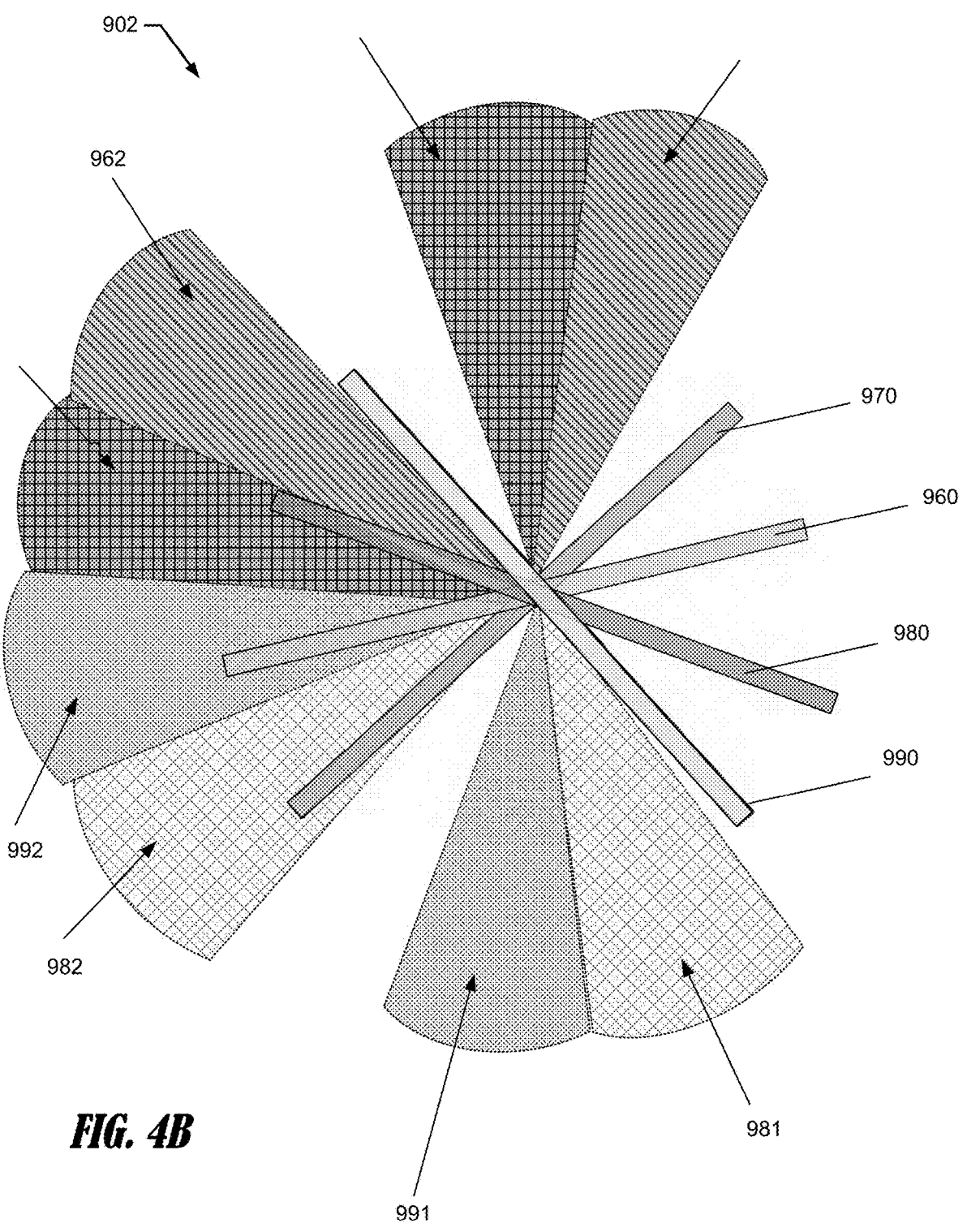
Figure 5:
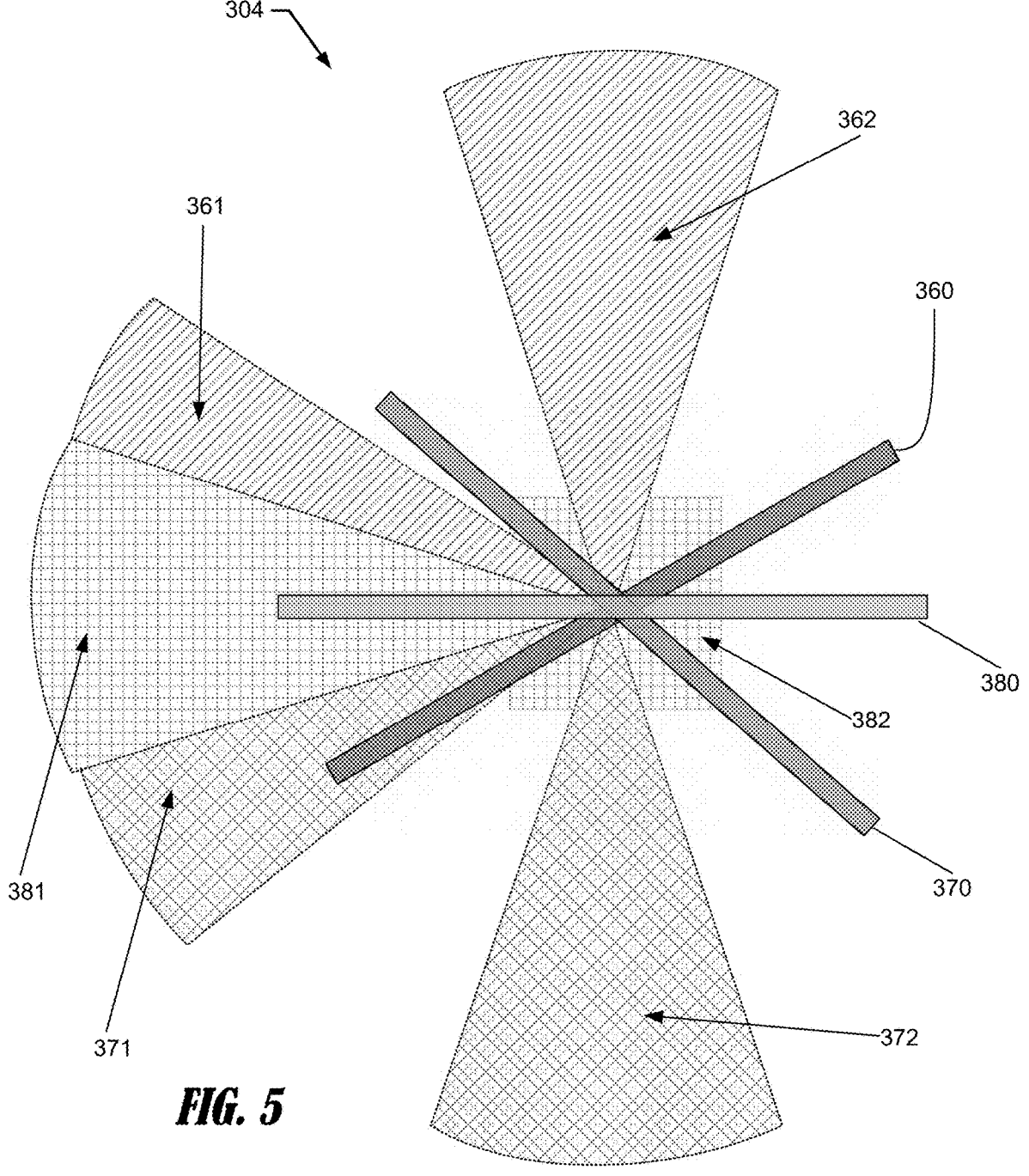
Figure 6:
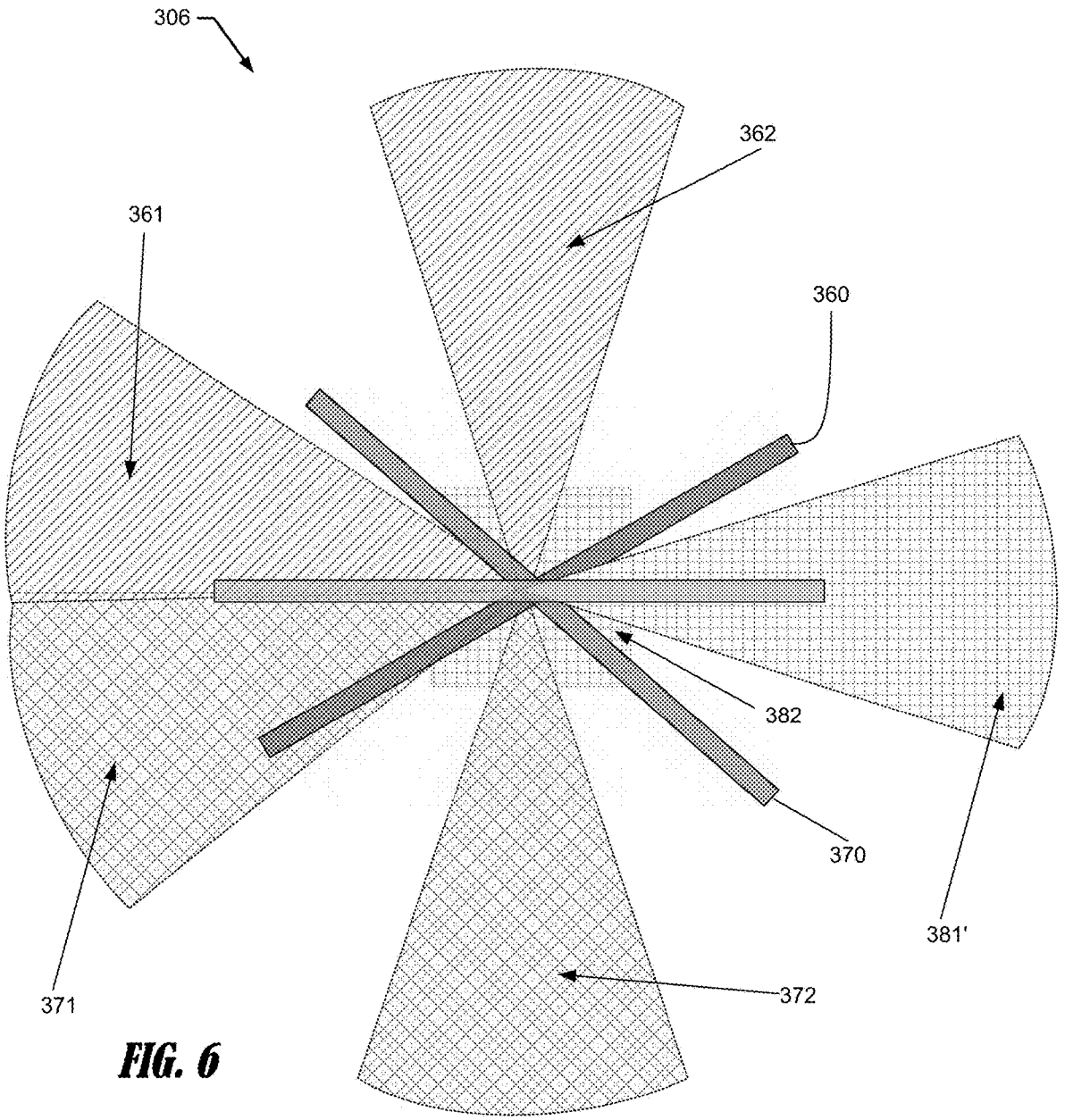
Figure 7A:
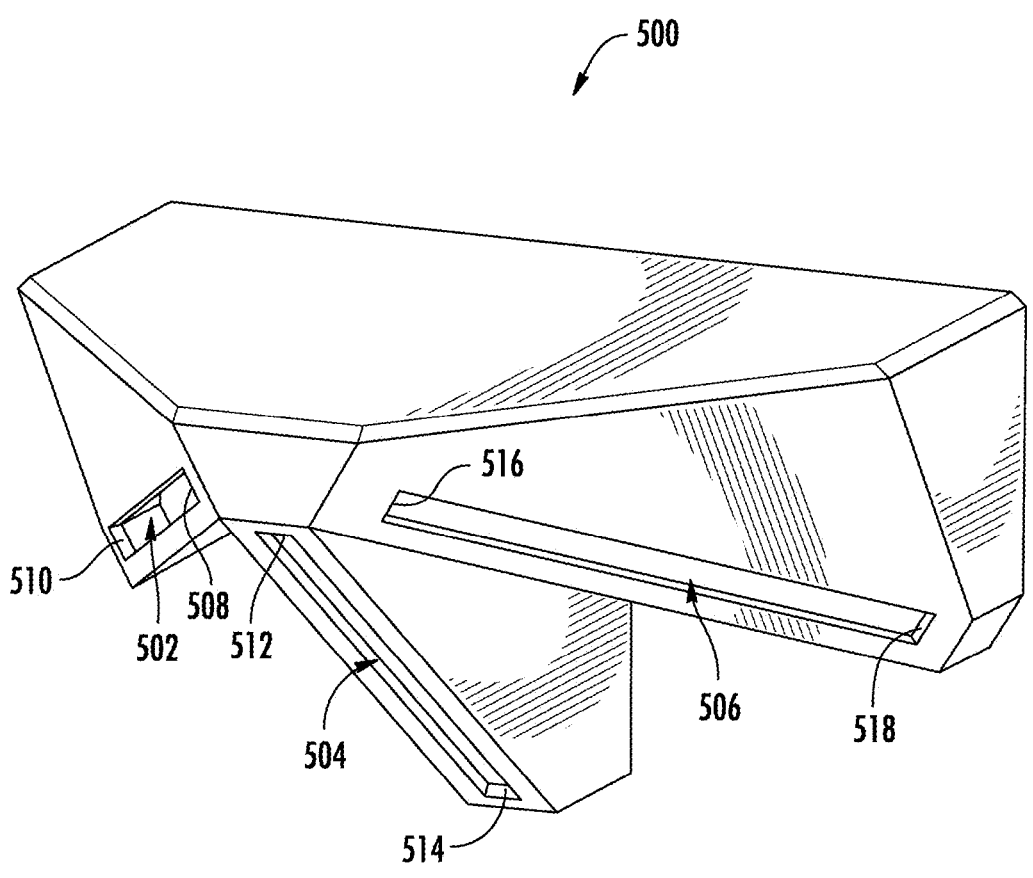
Figure 7B:
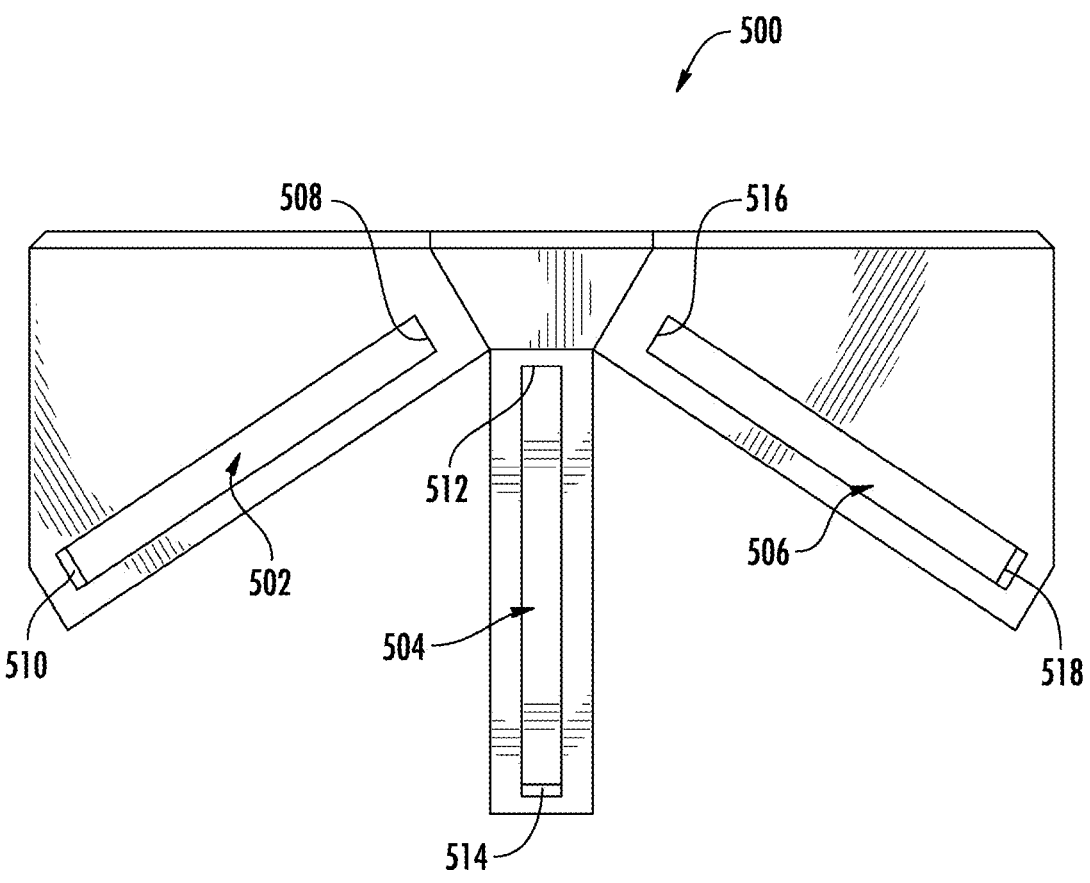
Figure 8:
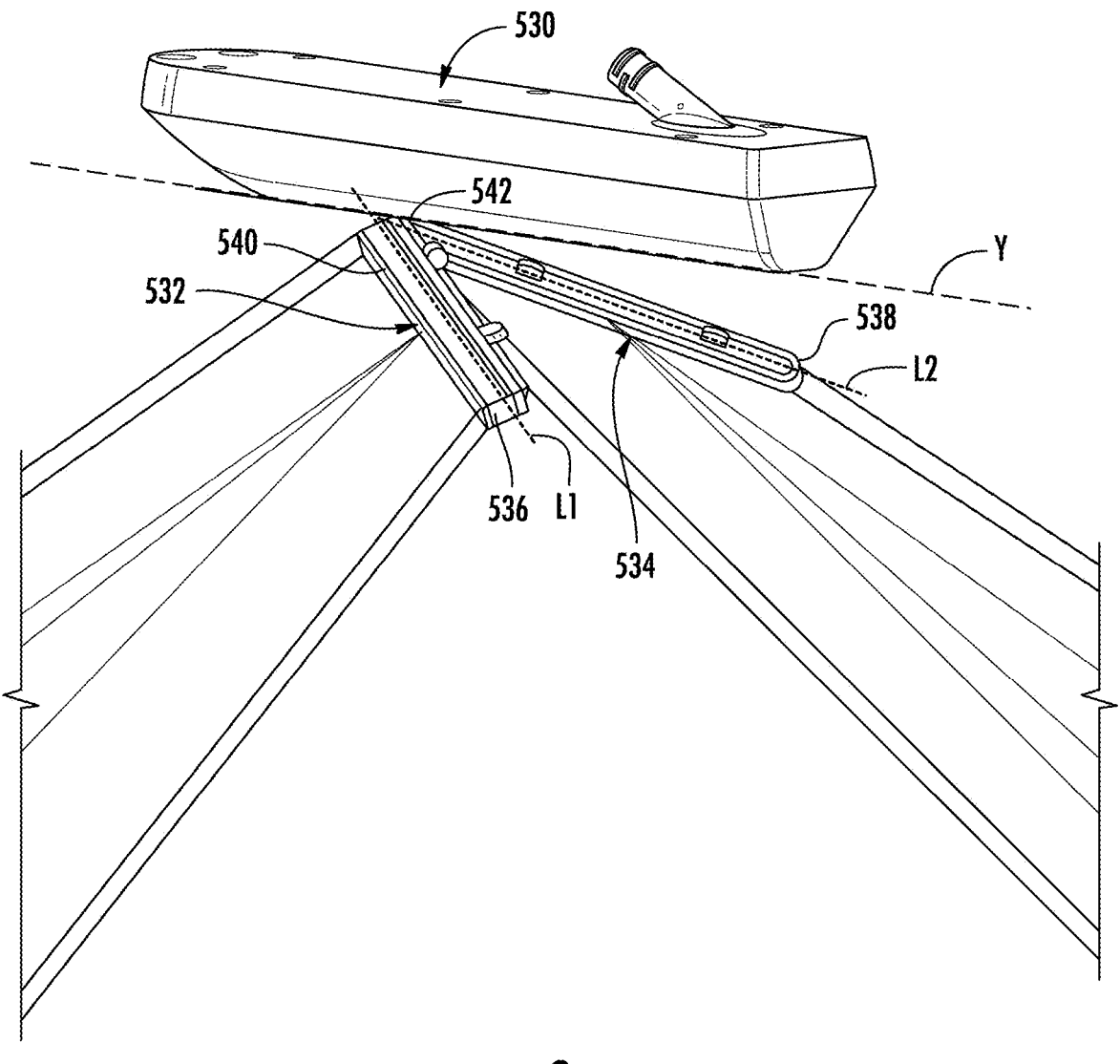
Figure 9:
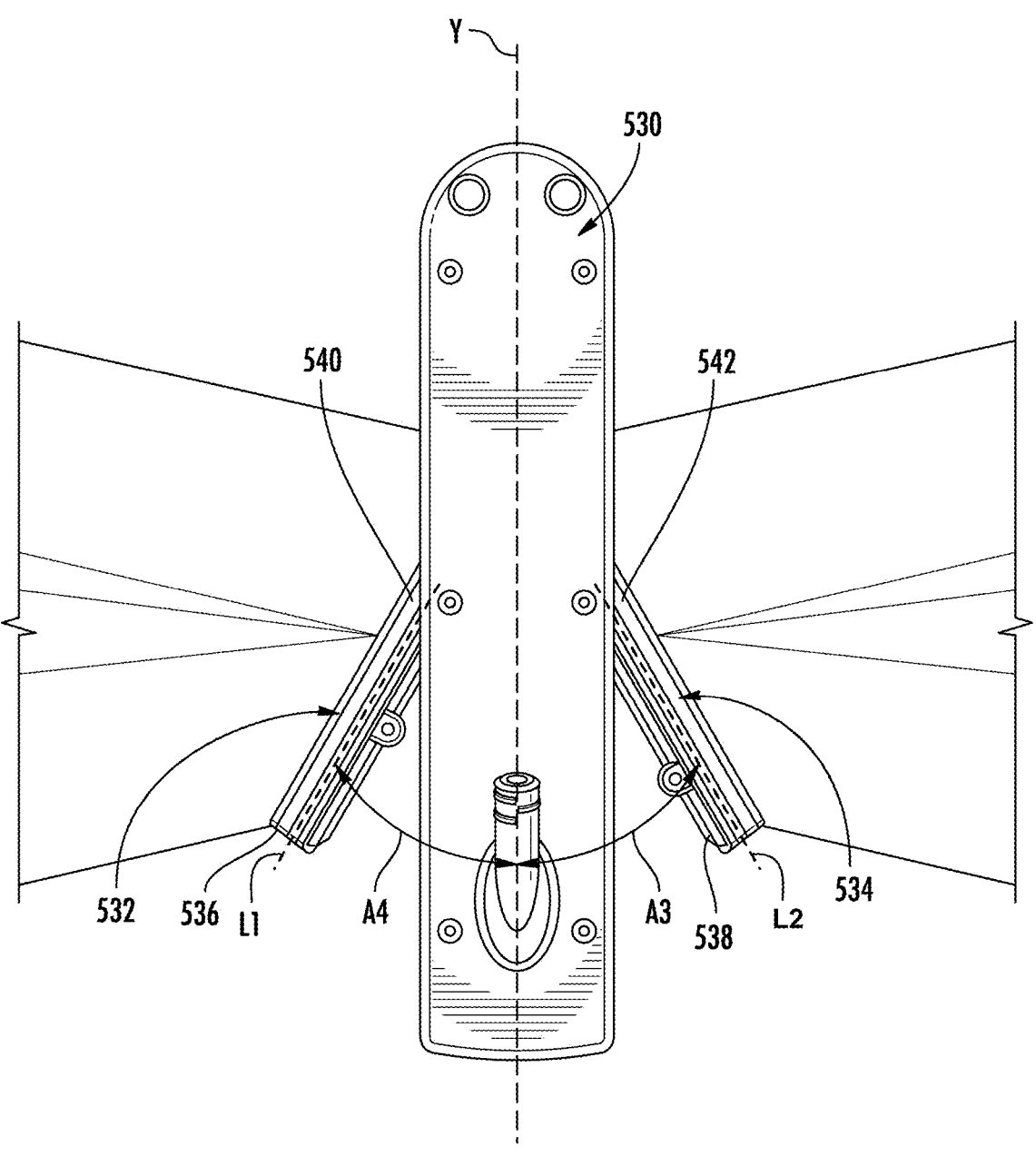
Figure 10:
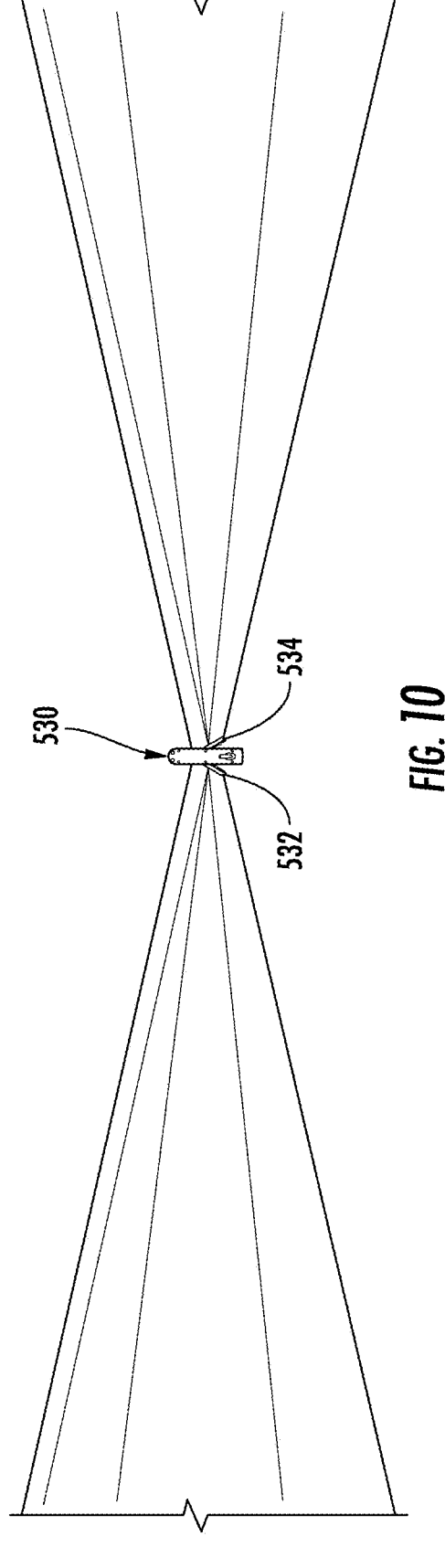
Figure 11:
Figure 12:
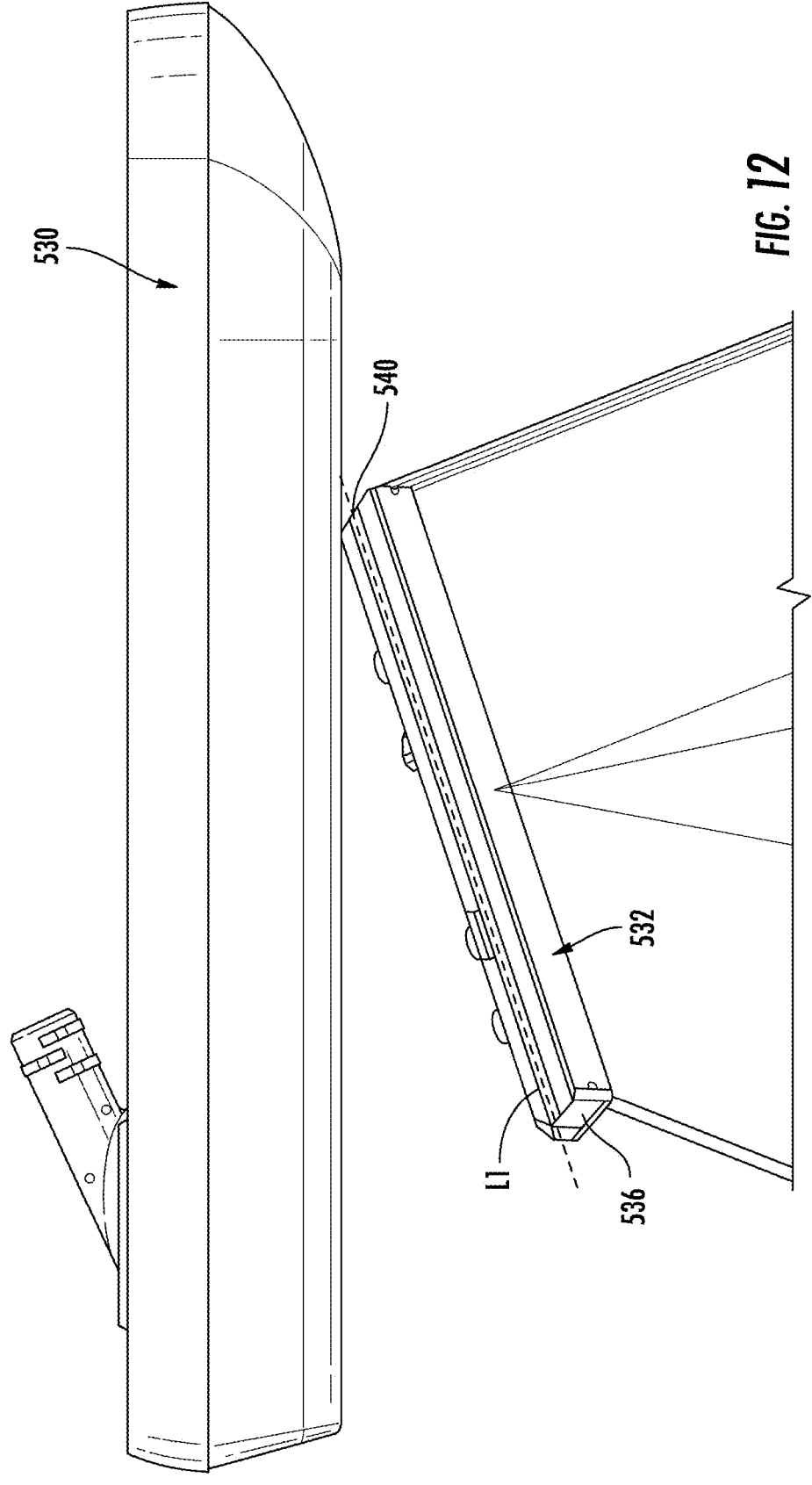
Figure 14A:
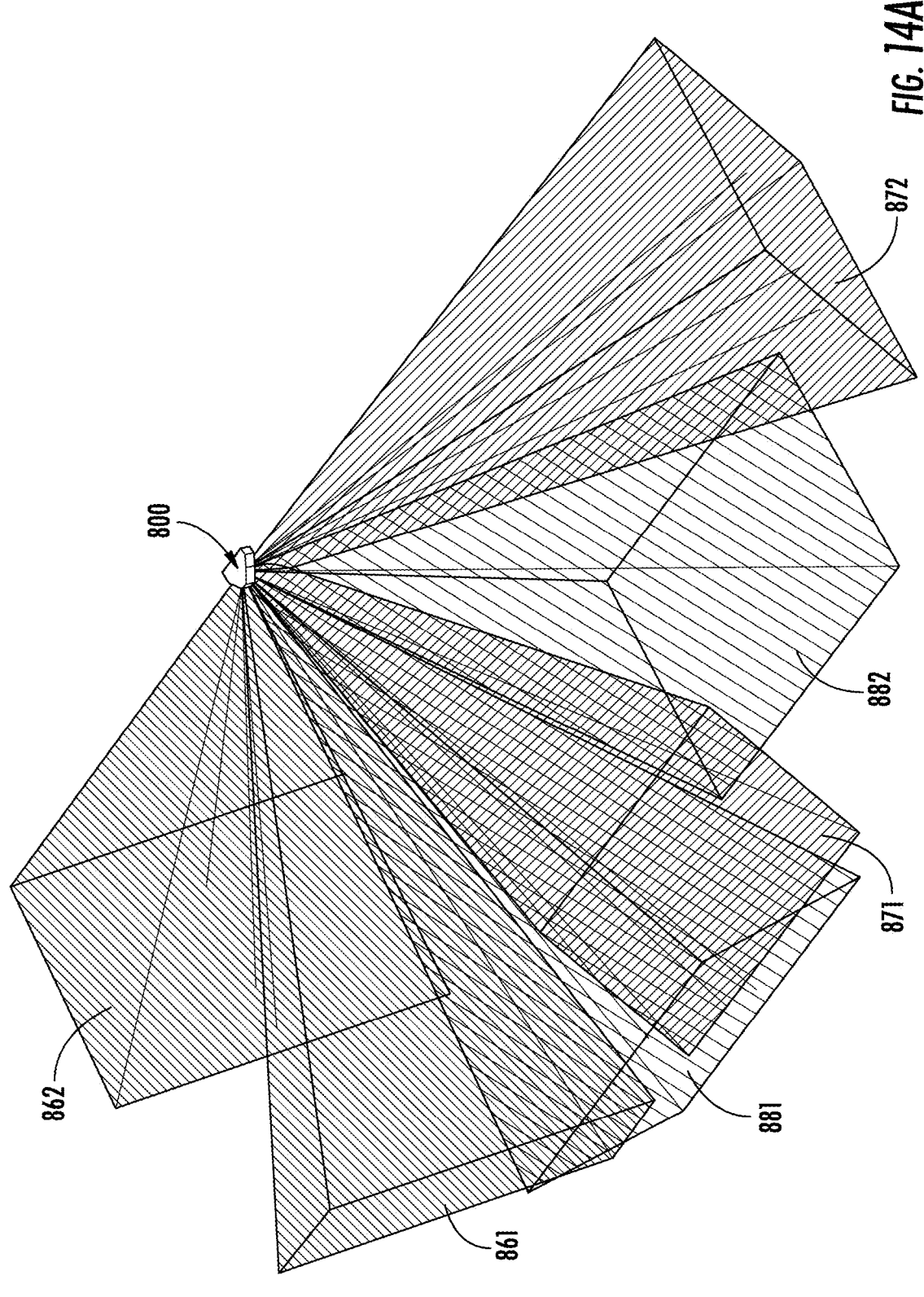
Figure 14B:
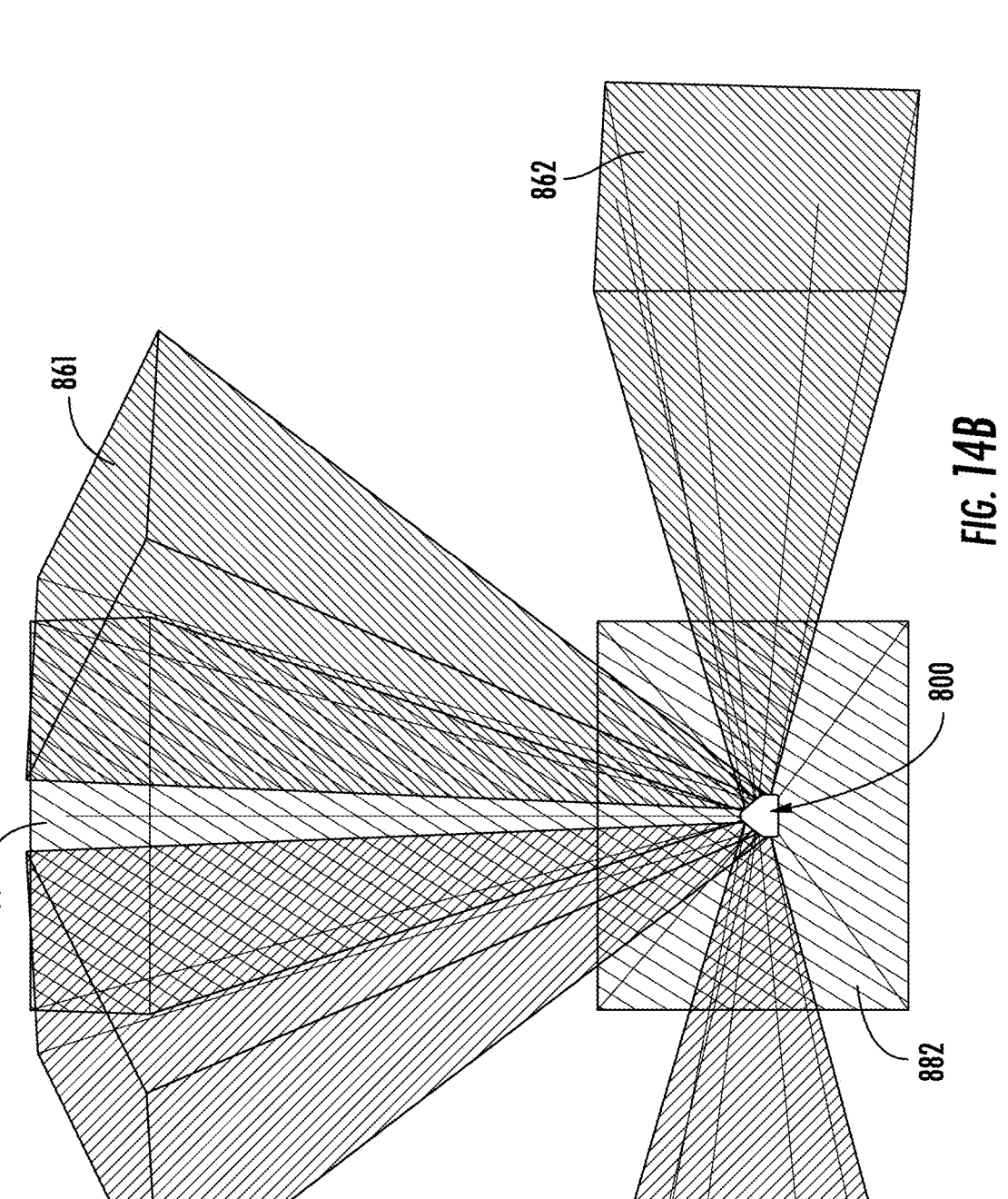
Figure 15:
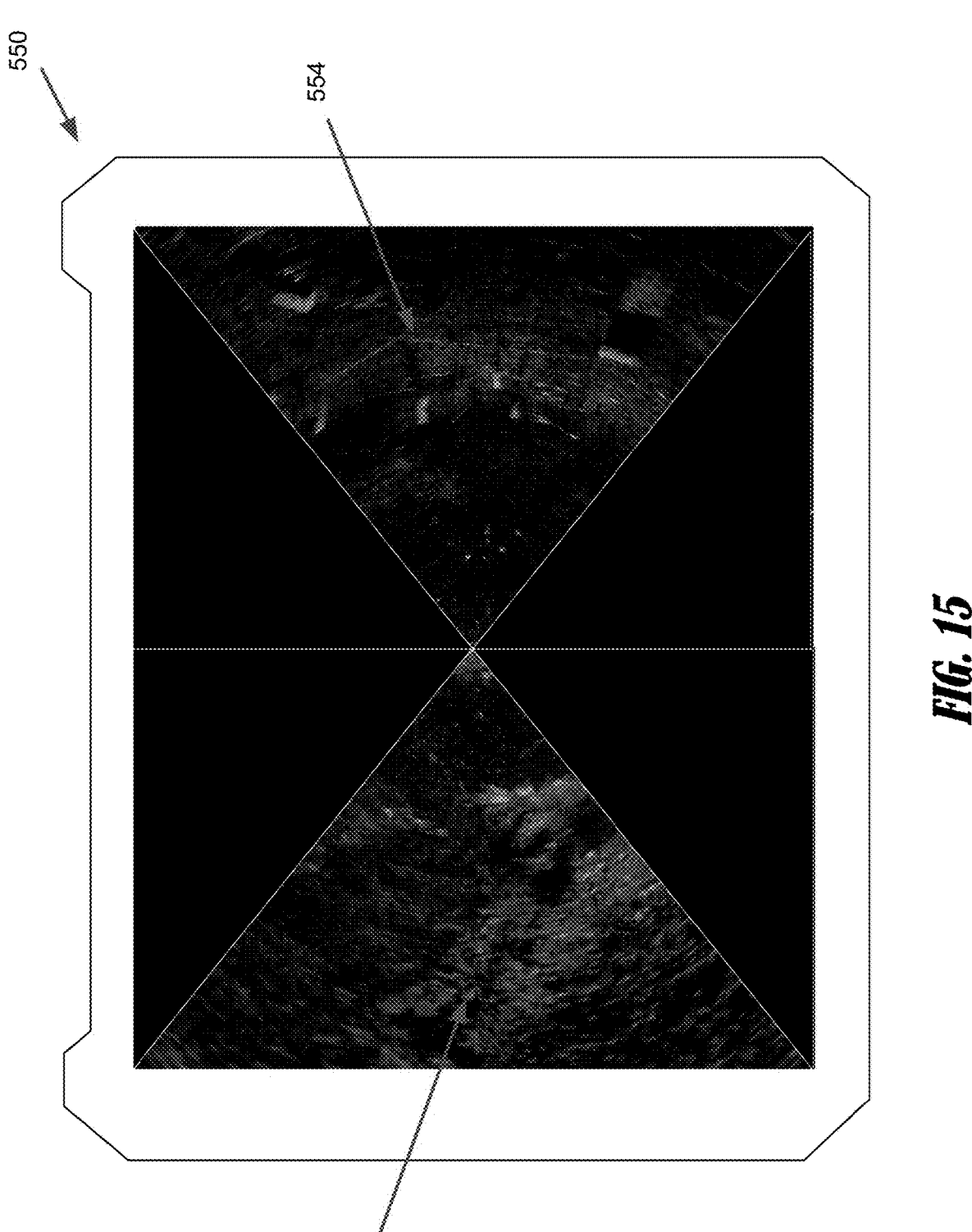
Figure 16:
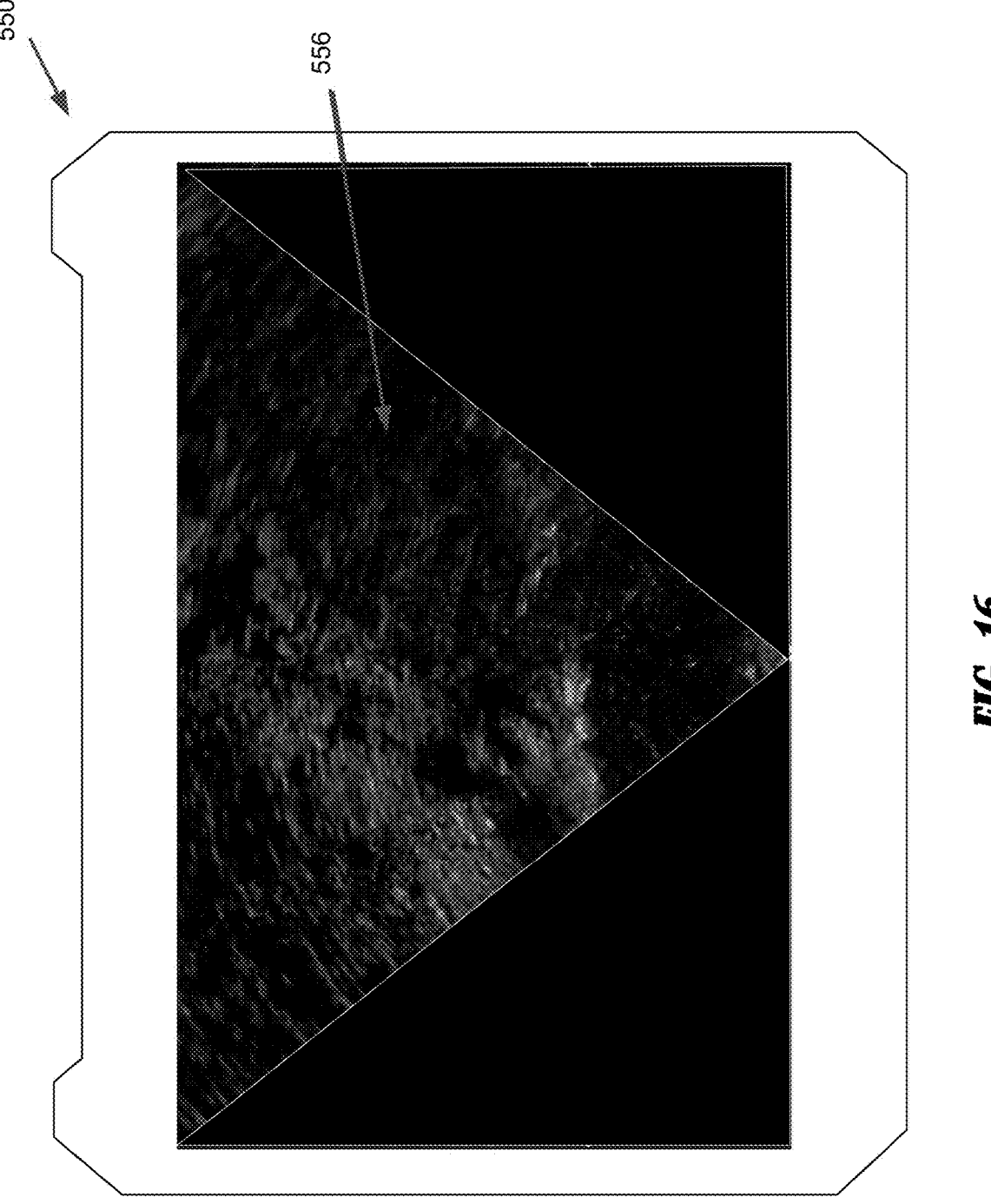
Figure 17:
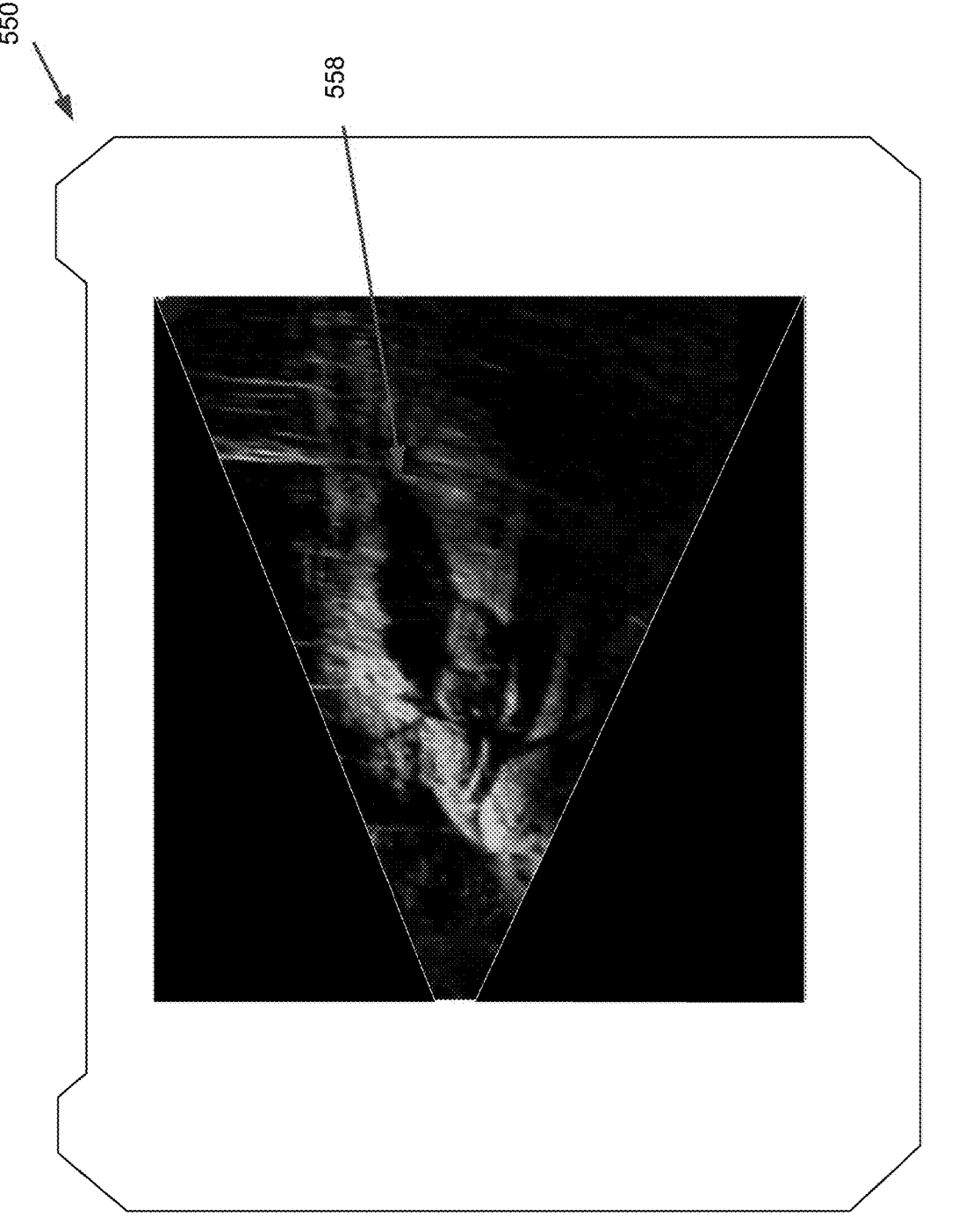
Figure 18:
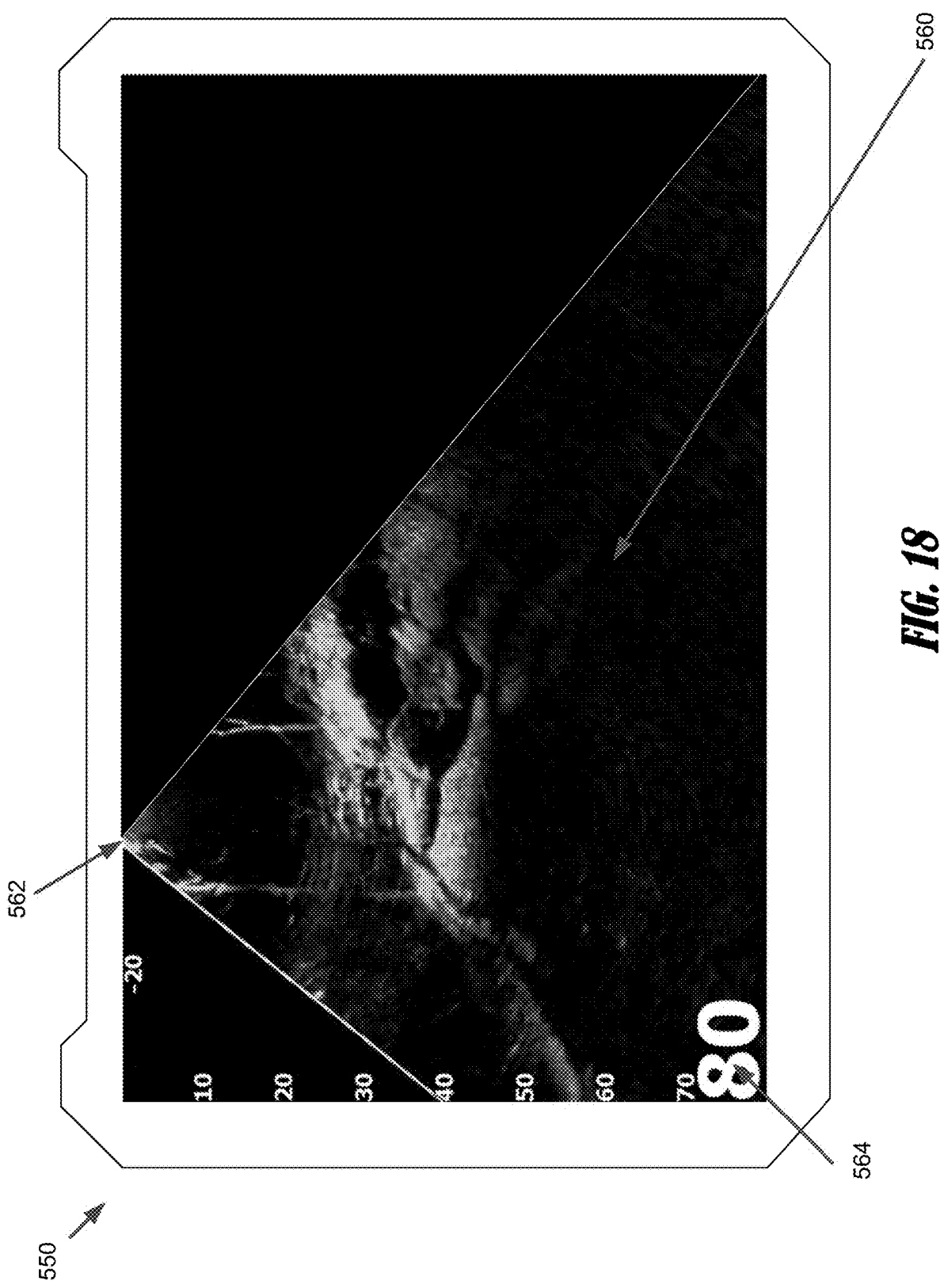
Figure 19A:
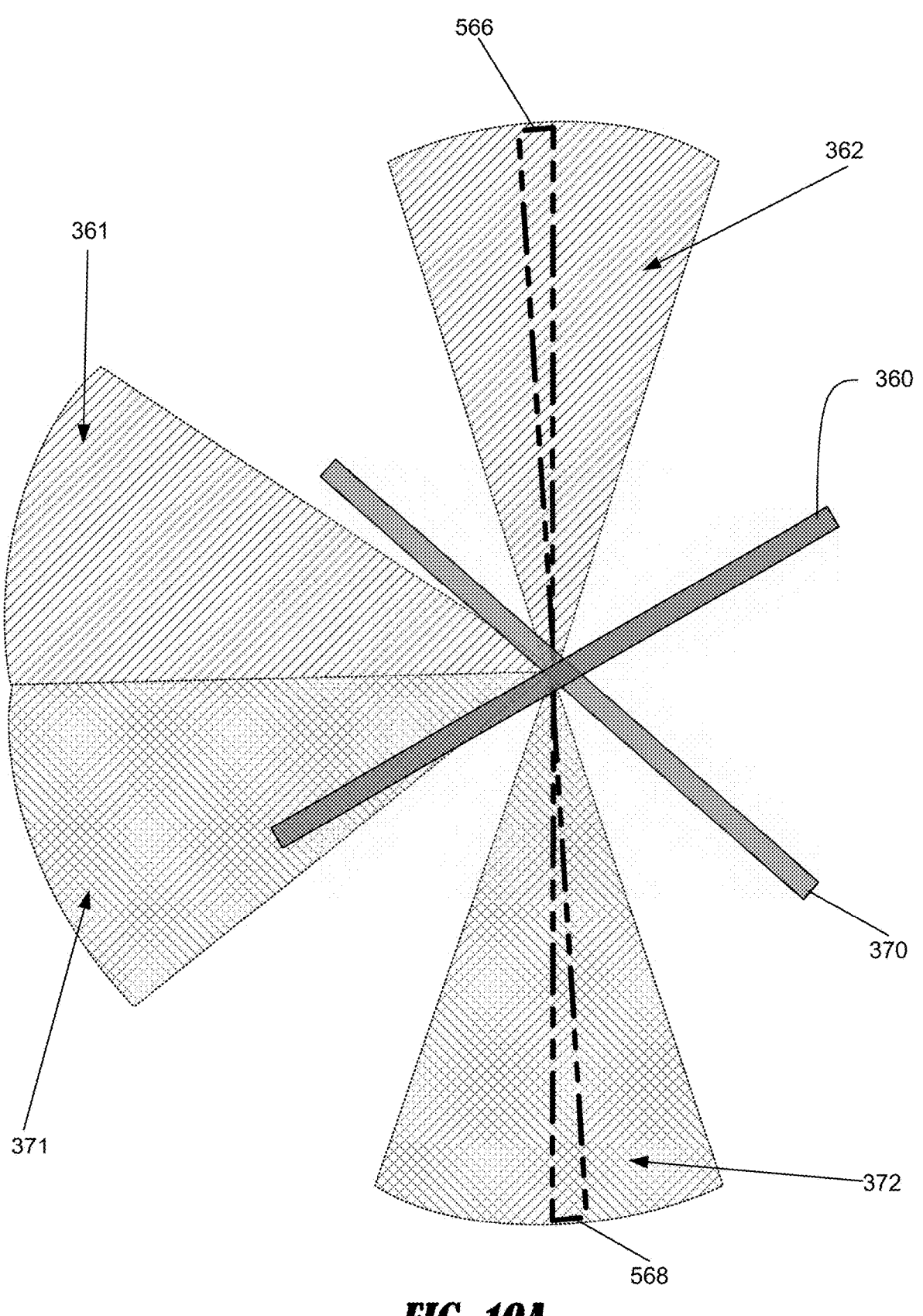
Figure 19B:
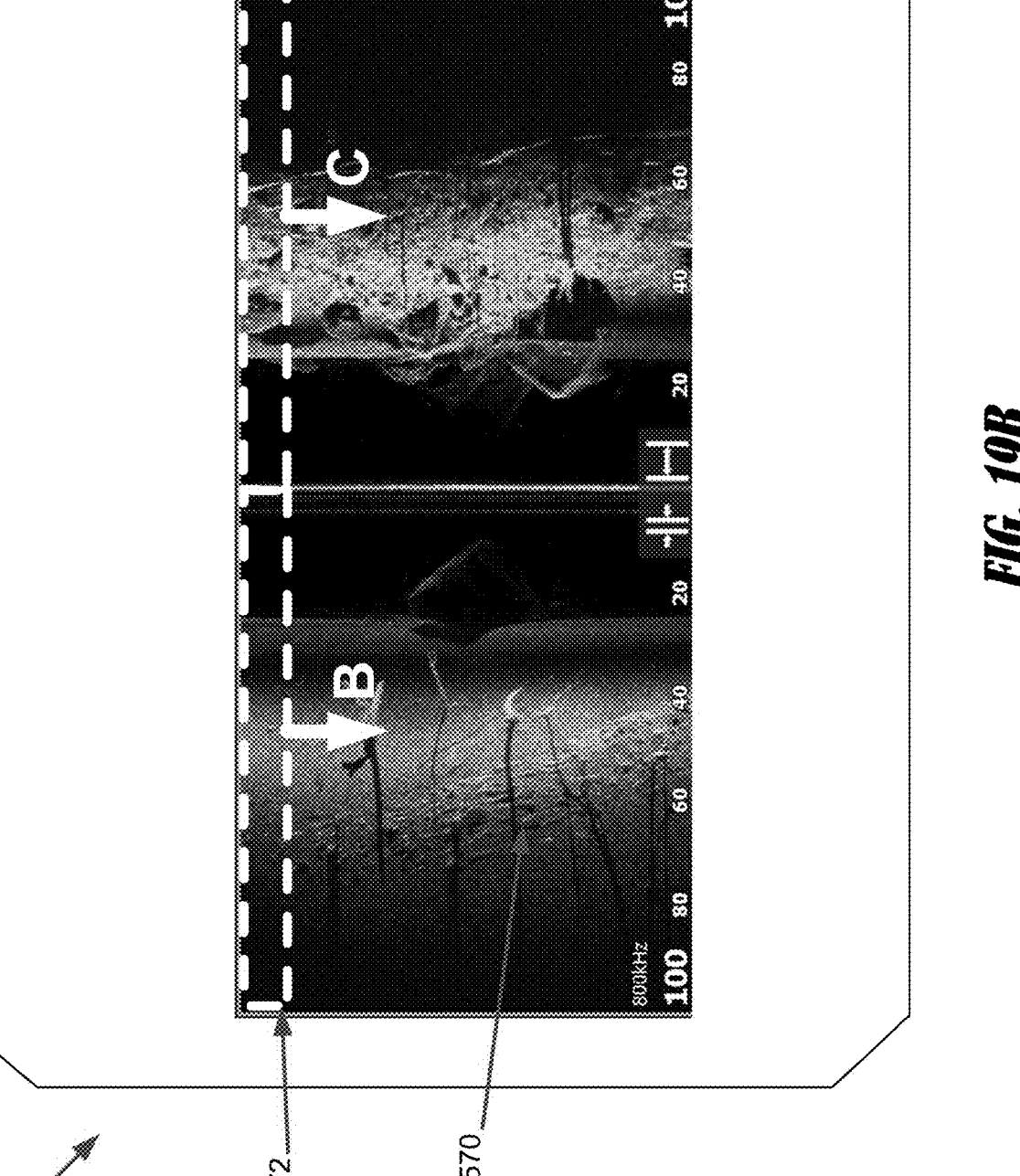
Figure 20:
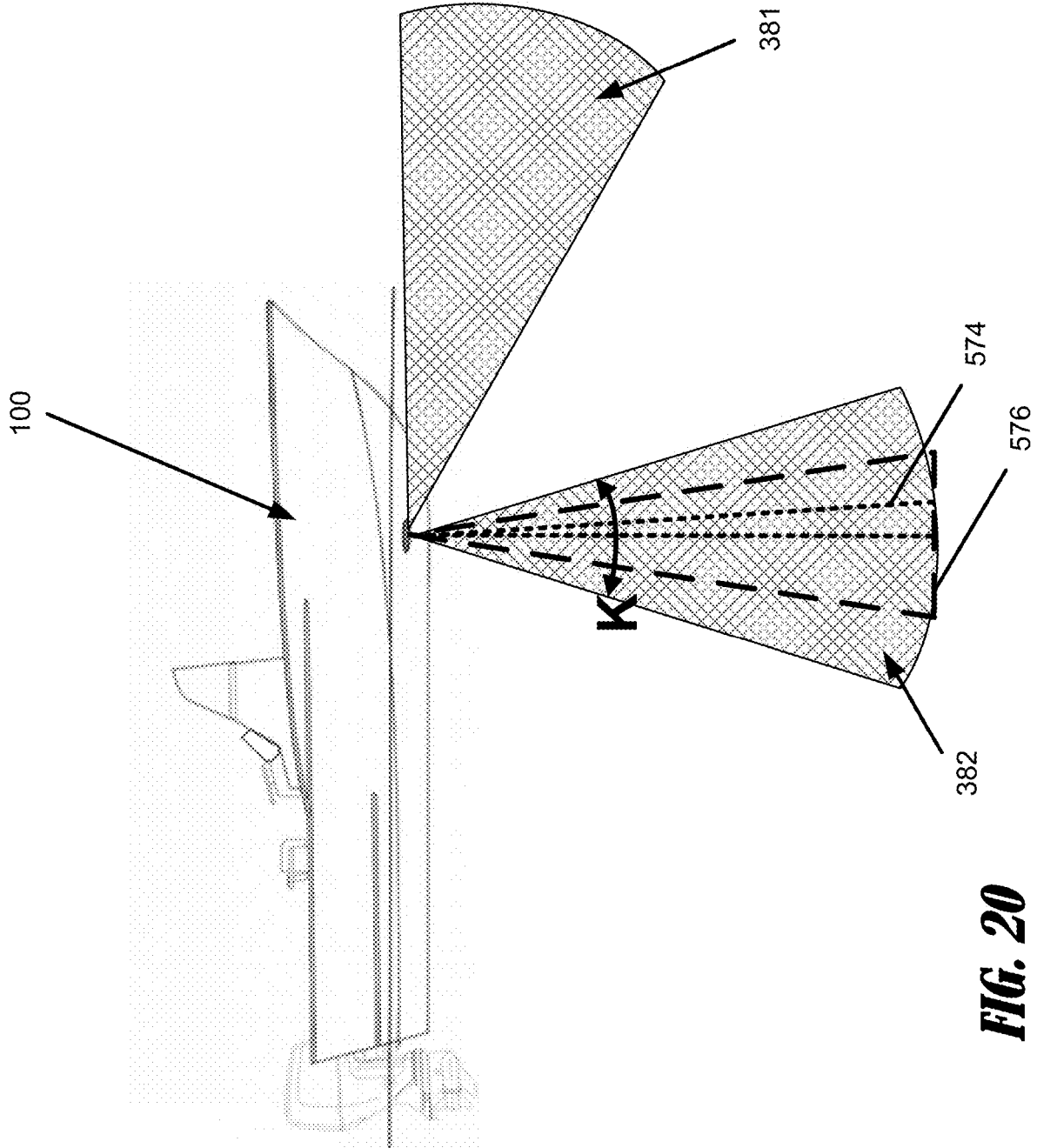
Figure 21:
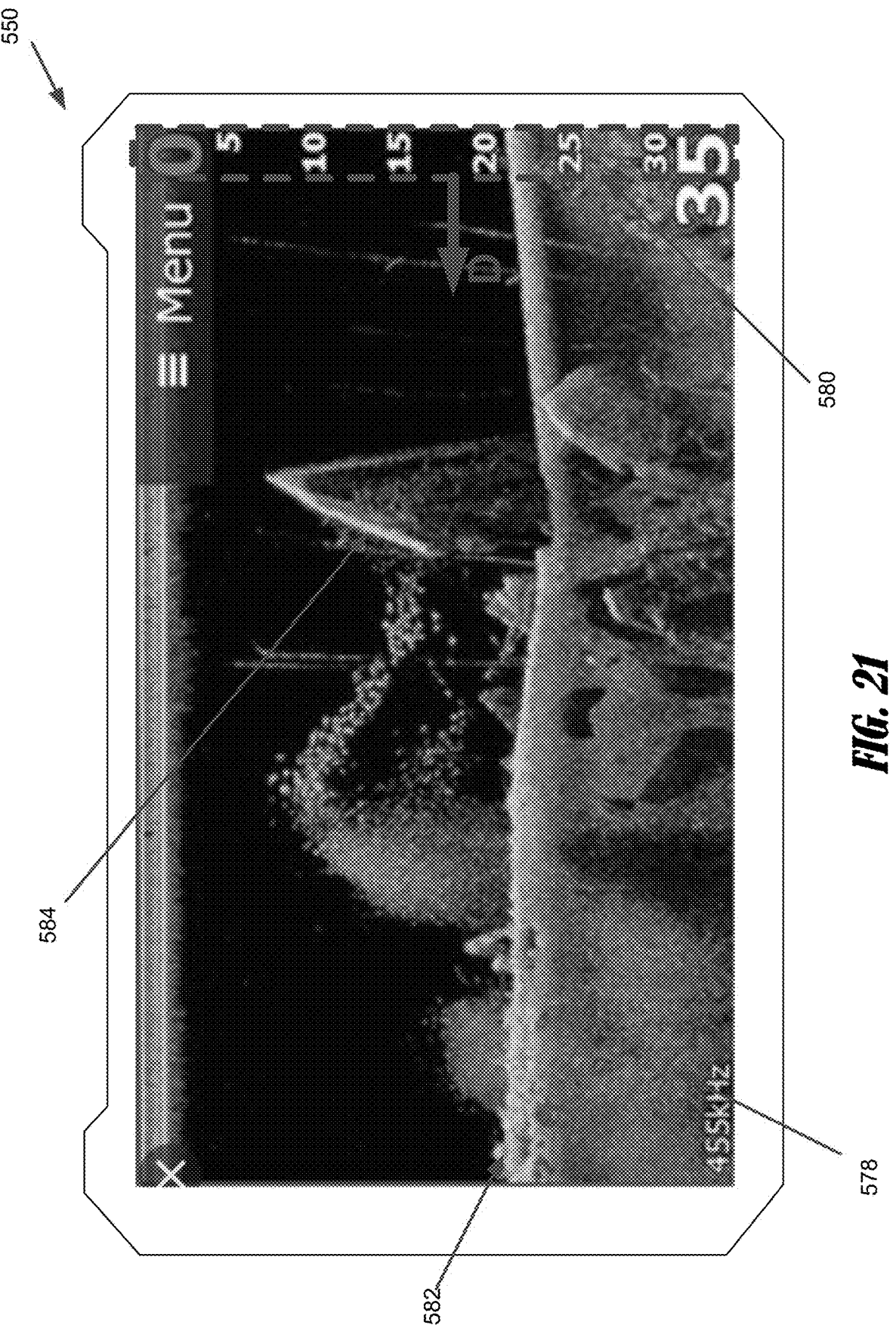
Figure 22:
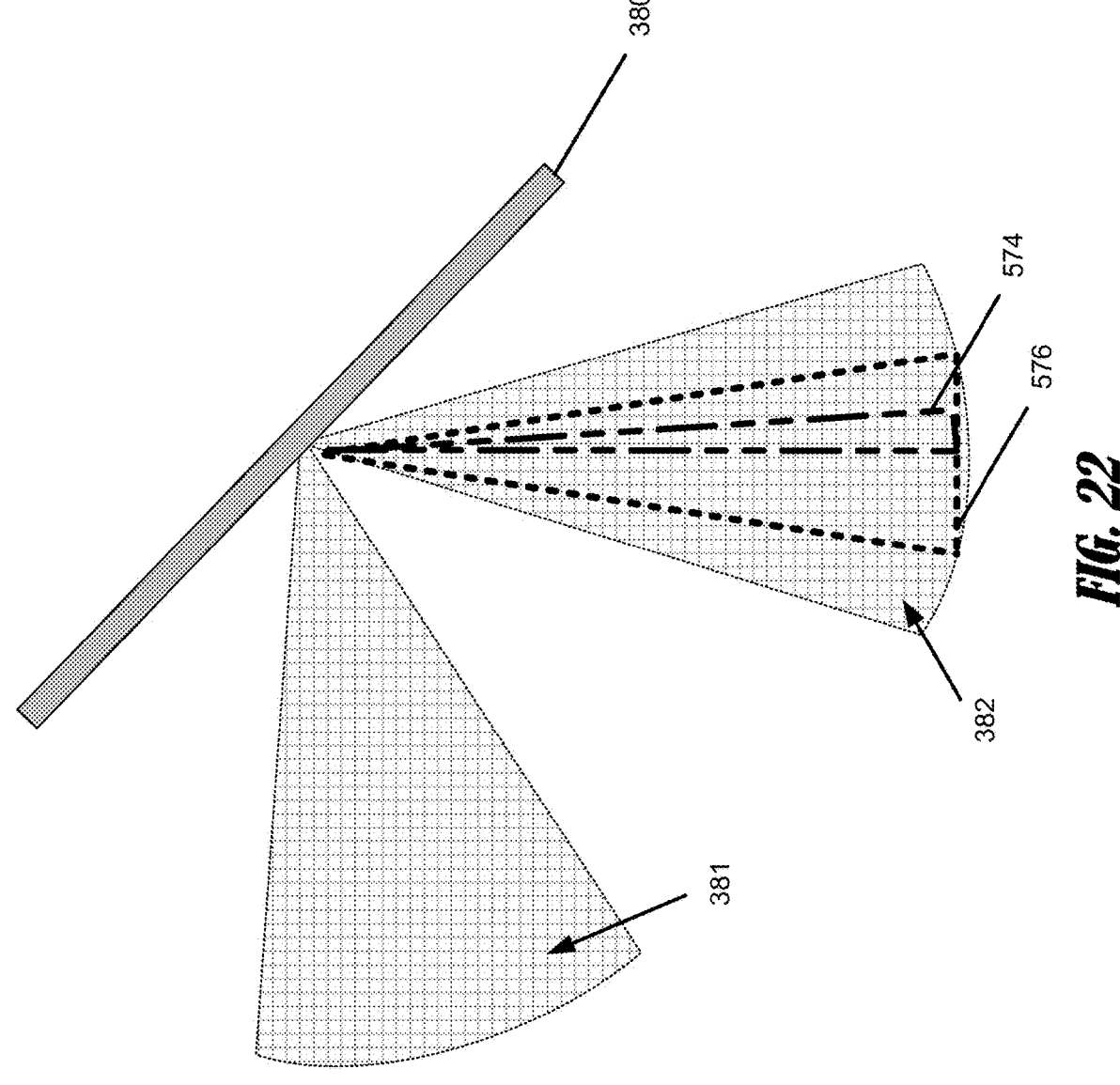
Figure 23A:
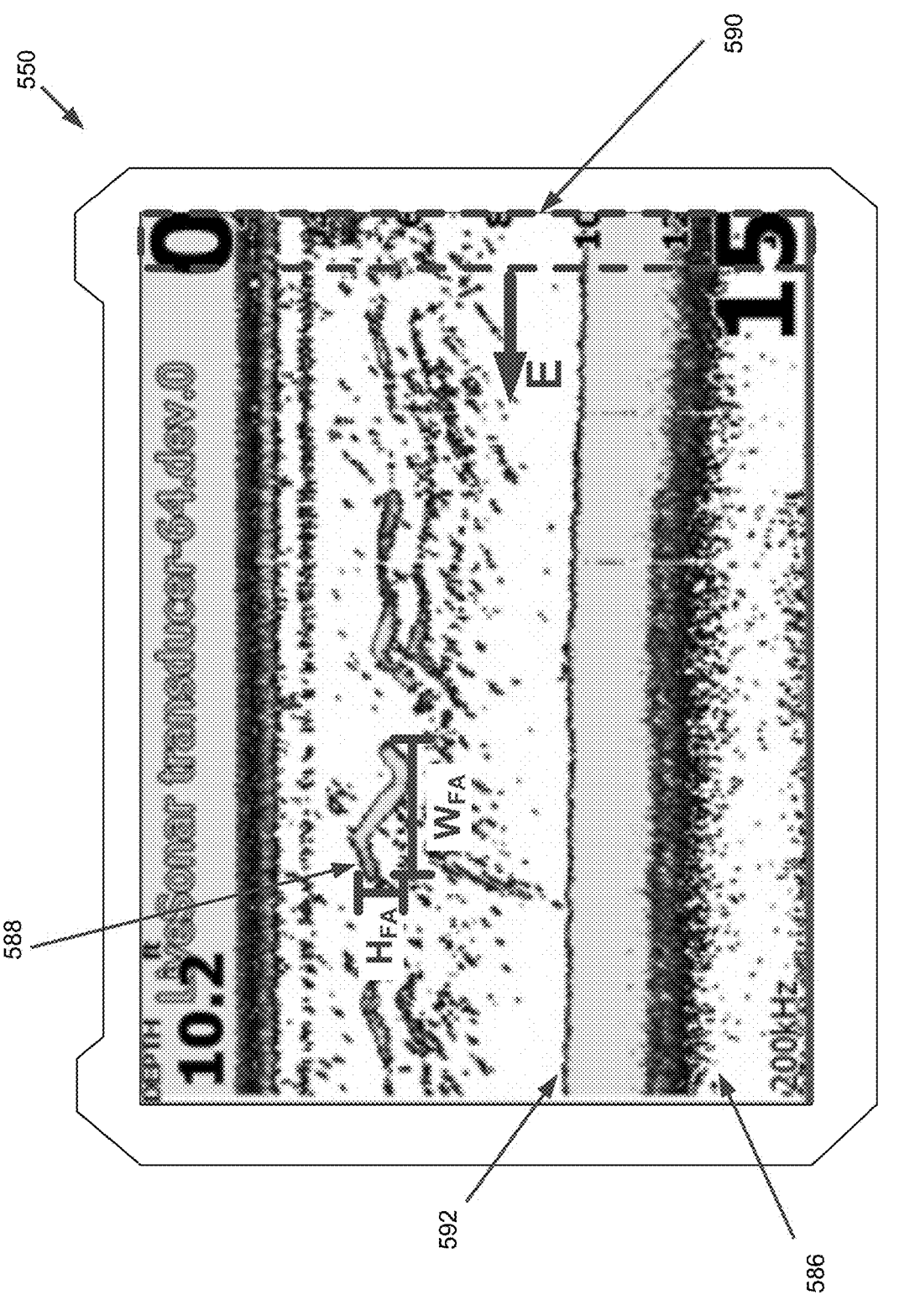
Figure 23B:
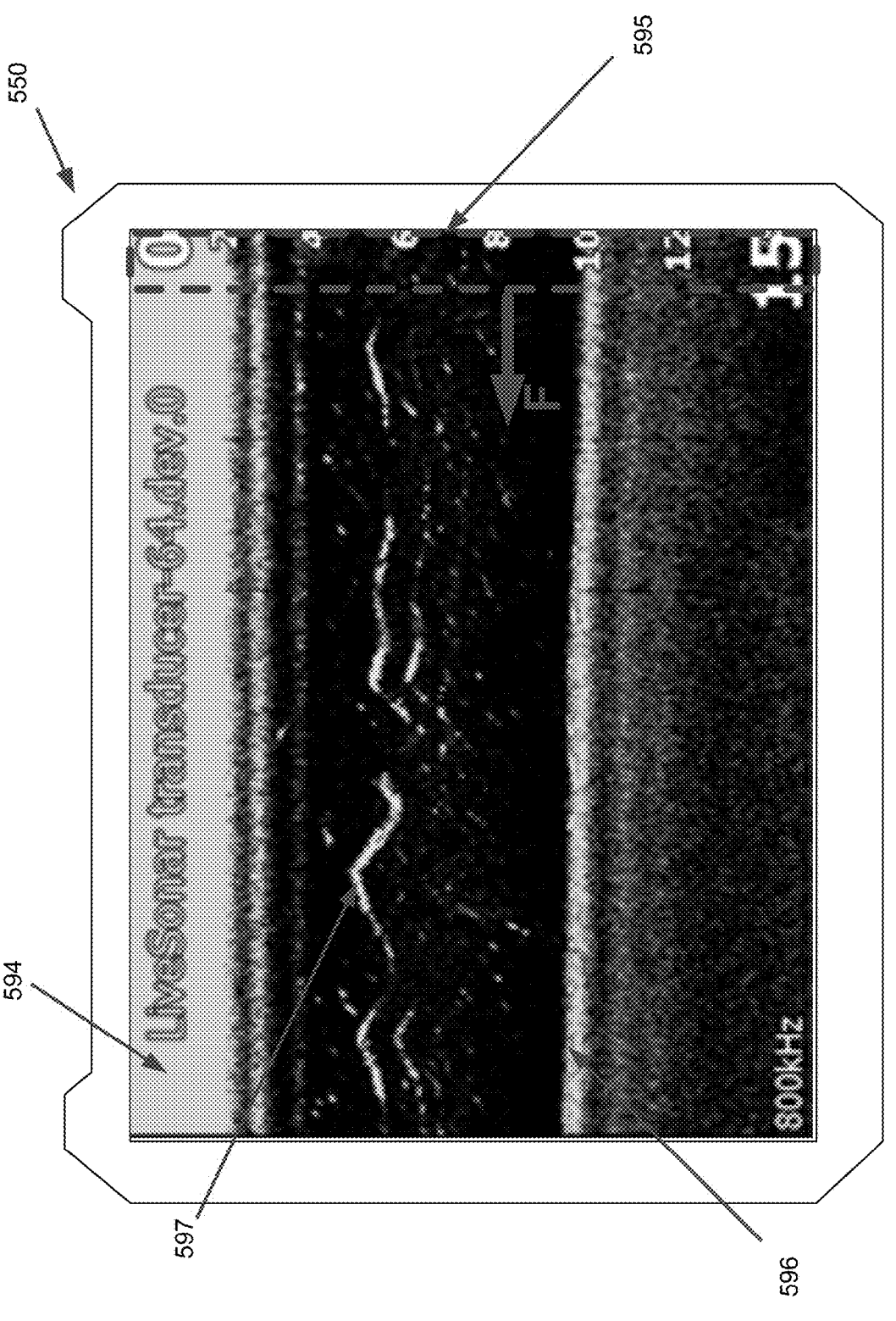
Figure 24A:
Figure 24B:
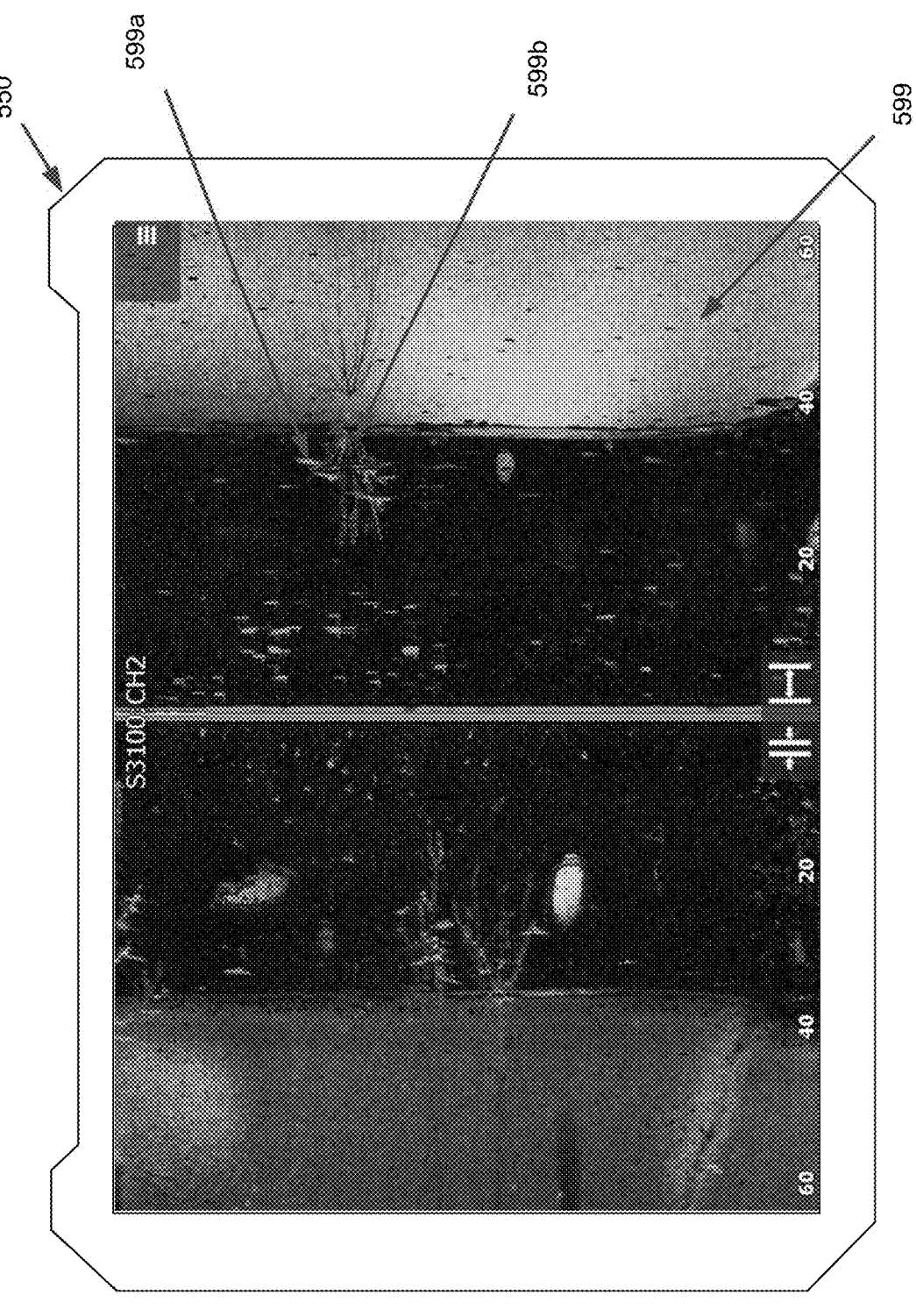
Figure 25:
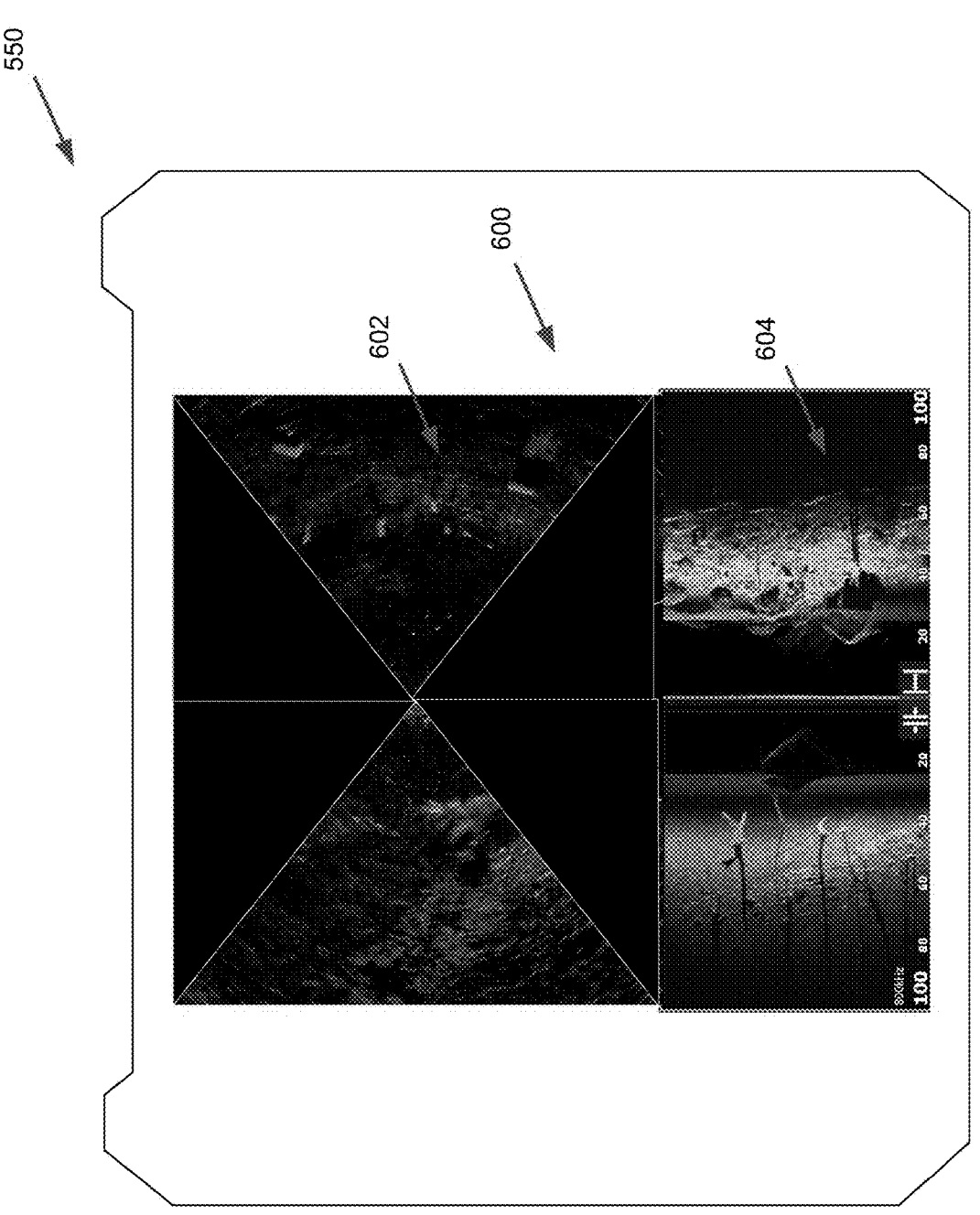
Figure 26:
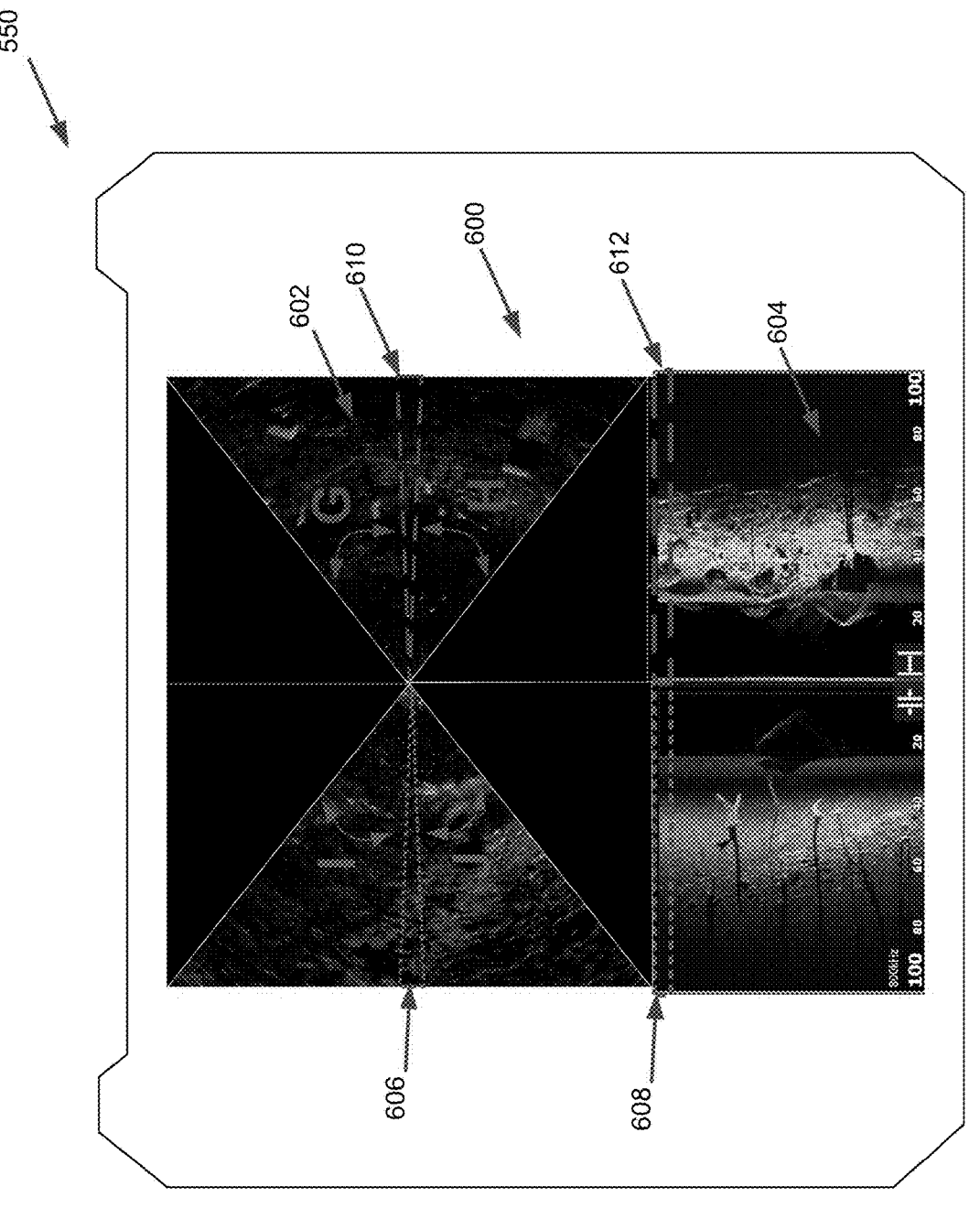
Figure 27:
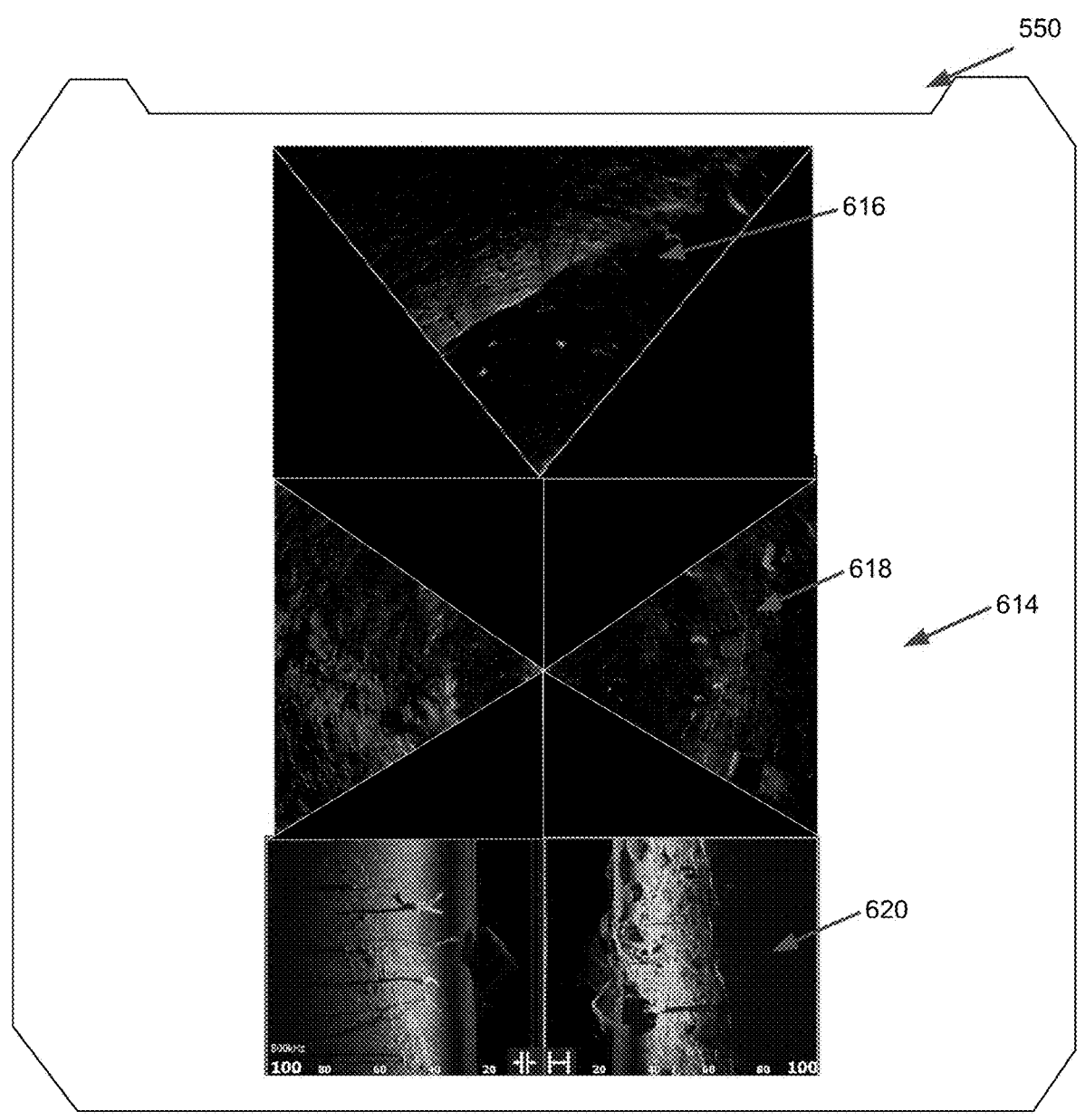
Figure 28:
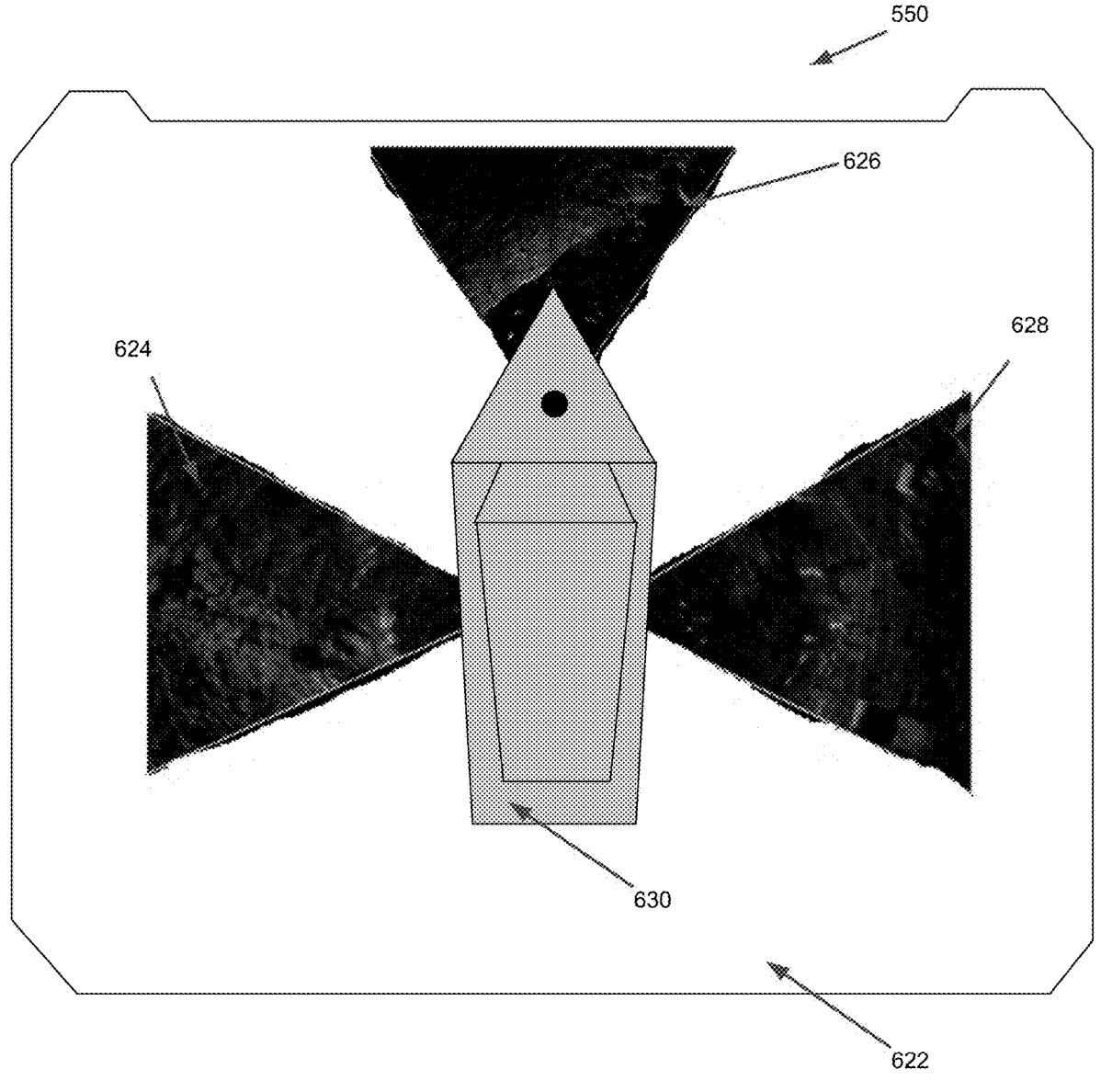
Figure 29:
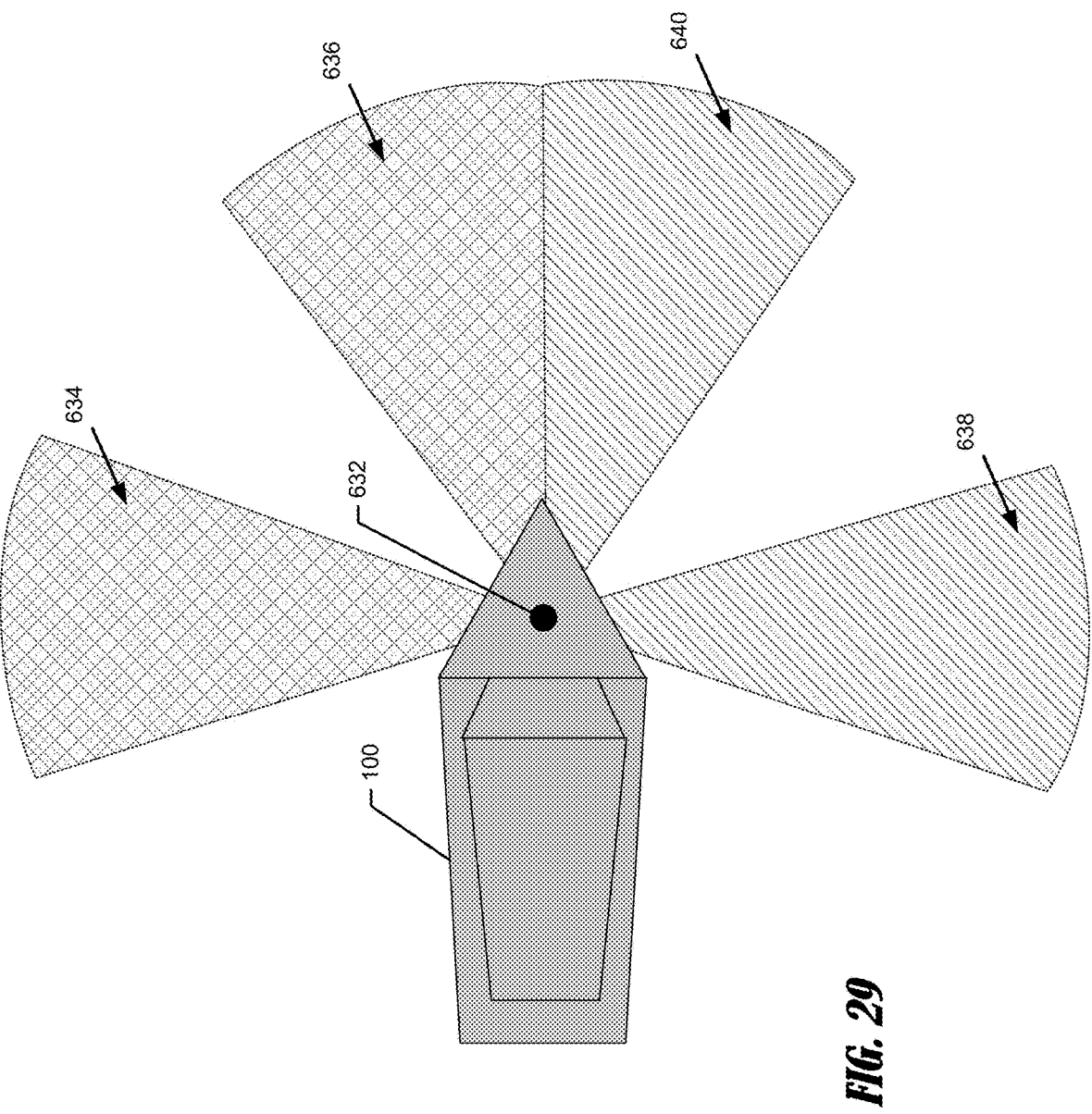
Figure 30:
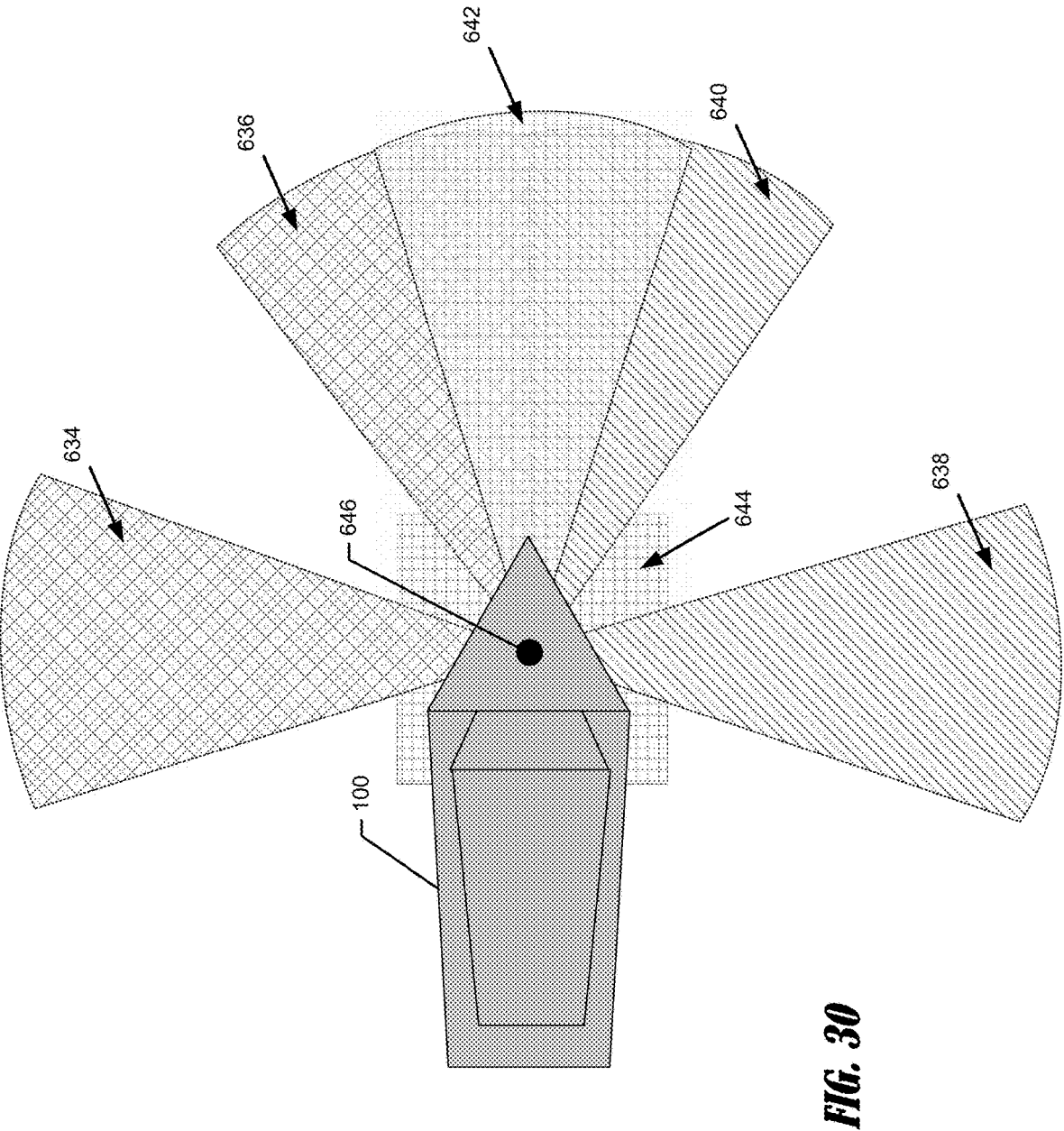
Figure 31:
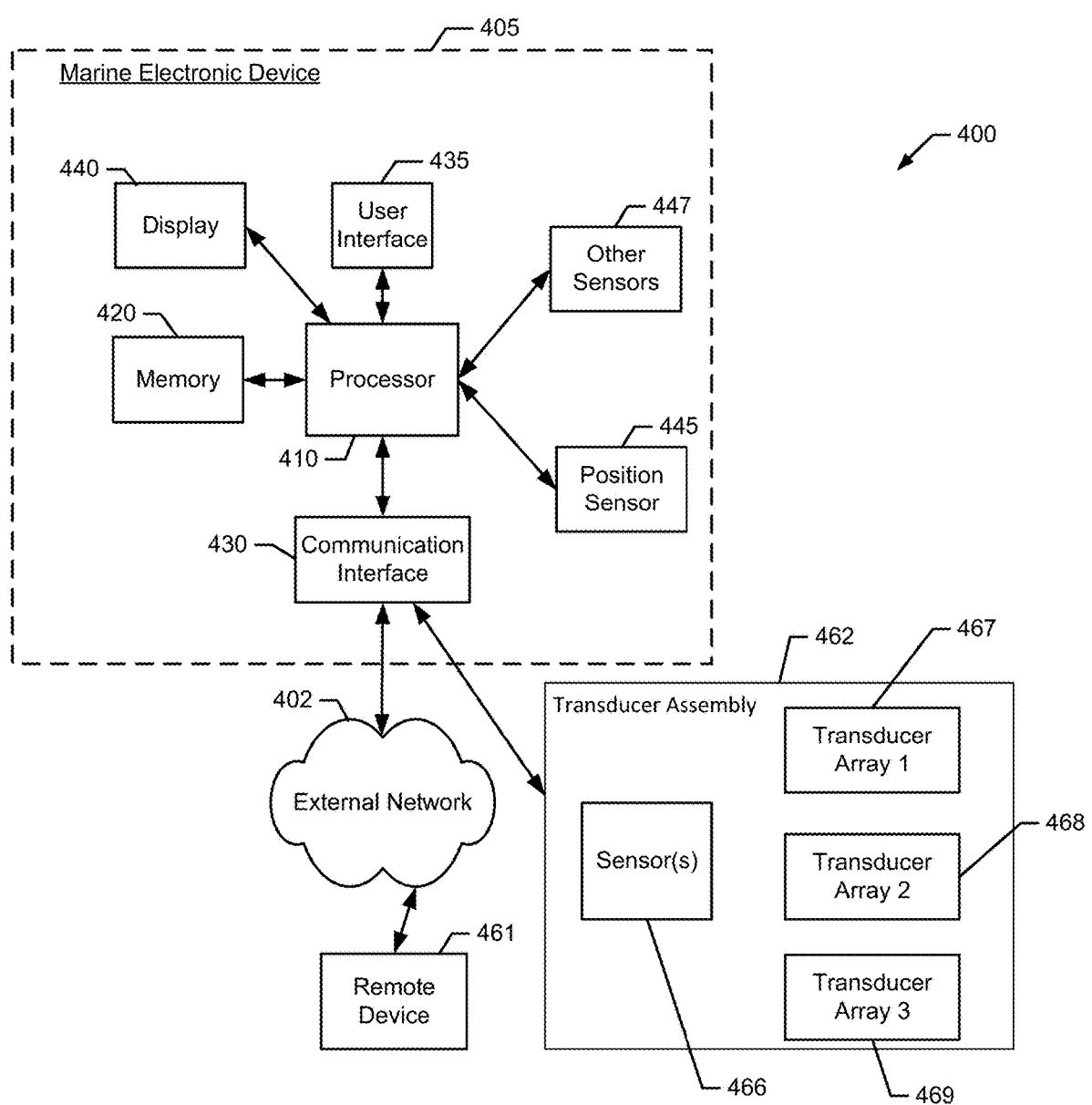
Figure 32:
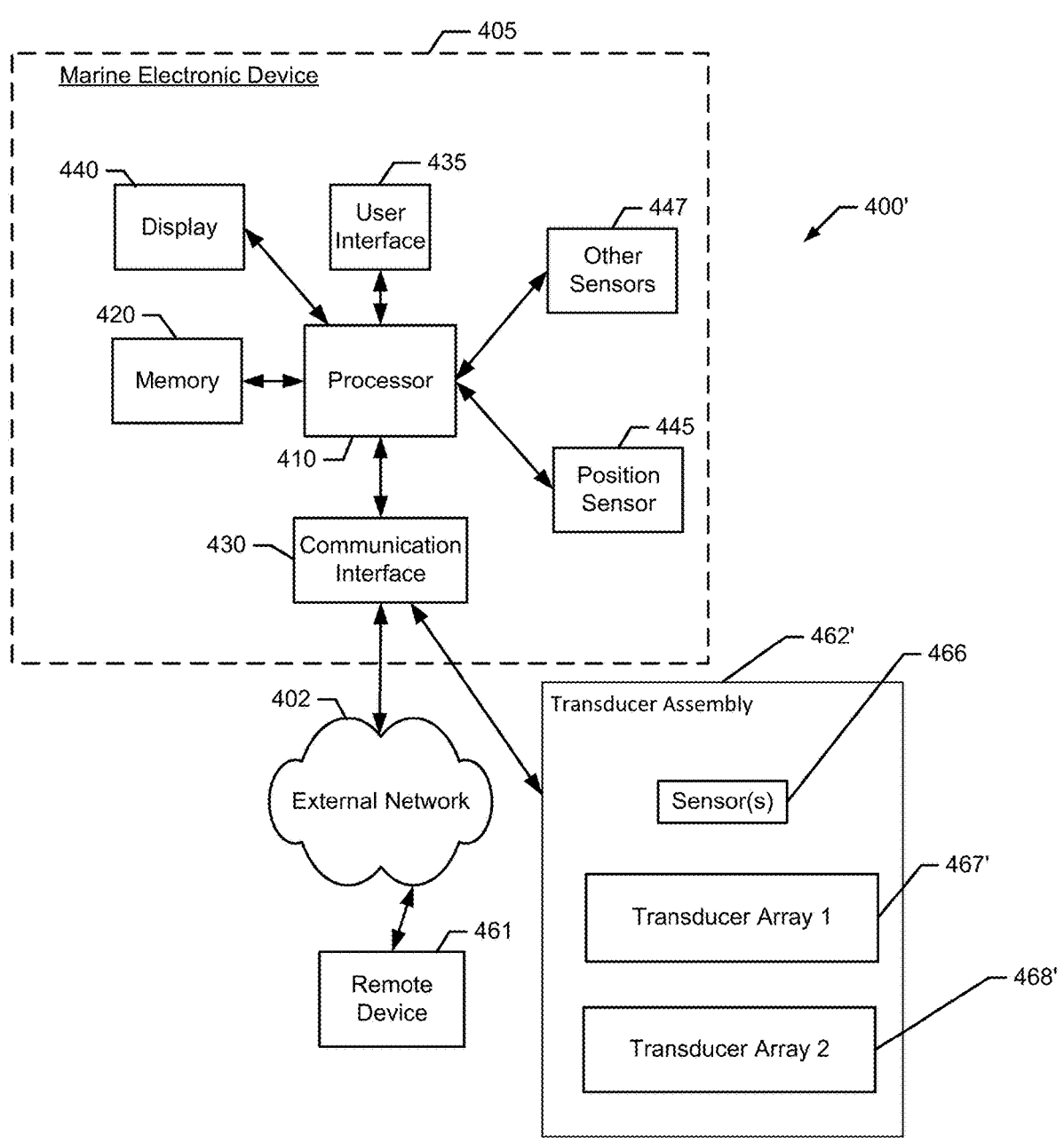
Figure 33:
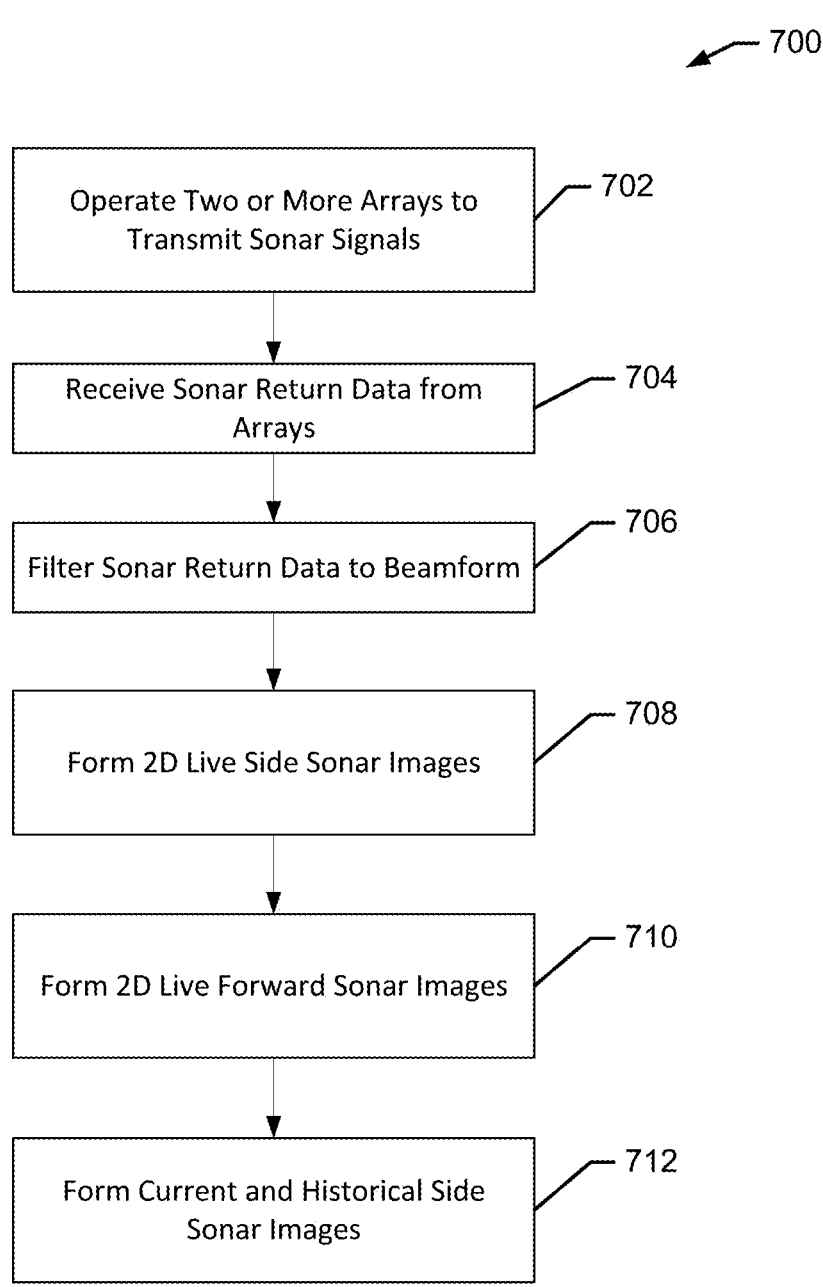
Figure 34:
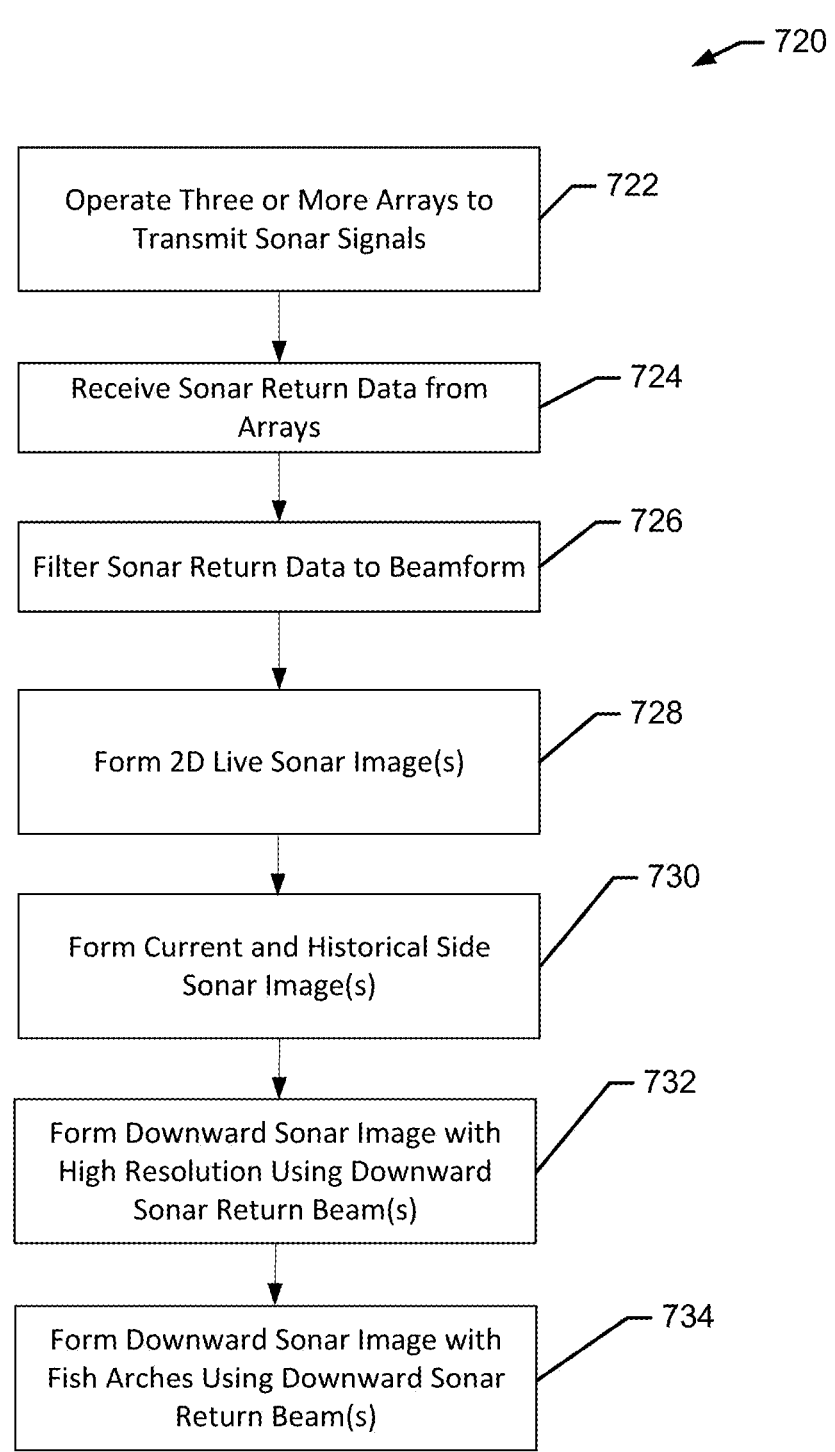

Having thus described the invention in general terms, reference will now be made to the accompanying drawings, which are not necessarily drawn to scale, and wherein:

FIG. 1 illustrates an example watercraft including various sonar transducer assemblies, in accordance with some embodiments discussed herein;

FIG. 2A illustrates an example array of transducer elements, in accordance with some embodiments discussed herein;

FIG. 2B illustrates a side view of the array of transducer elements shown in FIG. 2A, wherein an example first range of angles and an example second range of angles for beamformed sonar return beams are illustrated, in accordance with some embodiments discussed herein;

FIG. 2C illustrates an end view of the array of transducer elements shown in FIG. 2B along with illustrated ranges of angles of beamformed sonar return beams, in accordance with some embodiments discussed herein;

FIG. 3 illustrates two example arrays arranged to provide side and forward sonar coverage utilizing beamformed sonar return beams, in accordance with some embodiments discussed herein;

FIG. 3A illustrates a first array shown in FIG. 3 along with its corresponding ranges of angles of beamformed sonar return beams, in accordance with some embodiments discussed herein;

FIG. 3B illustrates a second array shown in FIG. 3 along with its corresponding ranges of angles of beamformed sonar return beams, in accordance with some embodiments discussed herein;

FIG. 4A illustrates another example arrangement of two example arrays arranged to provide at least side sonar coverage utilizing beamformed sonar return beams, in accordance with some embodiments discussed herein;

FIG. 4B illustrates another example arrangement of four example arrays to produce increased coverage volume for live side sonar images and for a live forward-wide sonar image, in accordance with some embodiments discussed herein;

FIG. 5 illustrates an example arrangement of three example arrays arranged to provide forward, side, and downward sonar coverage utilizing beamformed sonar return beams, in accordance with some embodiments discussed herein;

FIG. 6 illustrates another example embodiment of three example arrays arranged to provide at least forward, side, downward, and backward sonar coverage utilizing beamformed sonar return beams, in accordance with some embodiments discussed herein;

FIG. 7A shows a perspective view of an example transducer assembly that includes three arrays, in accordance with some embodiments discussed herein;

FIG. 7B shows a front view of an example transducer assembly that includes three arrays, in accordance with some embodiments discussed herein;

FIG. 8 shows a perspective view of a watercraft with two example transducer arrays, in accordance with some embodiments discussed herein;

FIG. 9 shows a top view of a watercraft with two example transducer arrays, in accordance with some embodiments discussed herein;

FIG. 10 shows a top view of a watercraft with two example transducer arrays, in accordance with some embodiments discussed herein;

FIG. 11 shows a front view of a watercraft with two example transducer arrays, in accordance with some embodiments discussed herein;

FIG. 12 shows a side view of a watercraft with two example transducer arrays, in accordance with some embodiments discussed herein;

FIG. 13 shows a side view of a watercraft with two example transducer arrays, in accordance with some embodiments discussed herein;

FIG. 14A illustrates a perspective view of a housing with three example transducer arrays and corresponding range of angles beam patterns, in accordance with some embodiments discussed herein;

FIG. 14B illustrates a top view of a housing with three example transducer arrays of FIG. 14A, in accordance with some embodiments discussed herein;

FIG. 15 shows an example marine electronic device presenting a right and left two-dimensional (2D) live side sonar image, in accordance with some embodiments discussed herein;

FIG. 16 shows an example marine electronic device presenting a two-dimensional (2D) live forward-wide sonar image, in accordance with some embodiments discussed herein;

FIG. 17 shows an example marine electronic device presenting a two-dimensional (2D) live forward sonar image, in accordance with some embodiments discussed herein;

FIG. 18 shows an example marine electronic device presenting a two-dimensional (2D) live downward sonar image, in accordance with some embodiments discussed herein;

FIG. 19A illustrates the arrangement of two example arrays shown in FIG. 3, wherein a side sonar return beam on each side is indicated, in accordance with some embodiments discussed herein;

FIG. 19B shows an example marine electronic device presenting a current and historical side sonar image, wherein the sonar image is formed from sonar return data from the sonar return beams indicated in FIG. 19A, in accordance with some embodiments discussed herein;

FIG. 20 illustrates a watercraft with an example transducer assembly utilizing a single array to provide a first downward sonar coverage, and utilizing multiple sonar return beams to provide a second downward sonar coverage, in accordance with some embodiments discussed herein;

FIG. 21 shows an example marine electronic device presenting a downward sonar image with high resolution, wherein the sonar image is formed from sonar return data from the downward sonar return beam indicated in FIG. 20, in accordance with some embodiments discussed herein;

FIG. 22 illustrates the arrangement of the single example array shown in FIG. 20, in accordance with some embodiments discussed herein;

FIG. 23A shows an example marine electronic device presenting a downward conical sonar image with fish arches, wherein the sonar image is formed from, for example, sonar return data from the multiple sonar return beams indicated in FIG. 20 or 22, in accordance with some embodiments discussed herein;

FIG. 23B shows an example marine electronic device presenting a downward sonar image with high resolution surface features and fish arches, wherein the sonar image is formed from sonar return data from, for example, both the one downward sonar return beam indicated in FIG. 20 or 22 and the multiple sonar return beams indicated in FIG. 20 or 22, in accordance with some embodiments discussed herein;

FIG. 24A illustrates the arrangement of two example arrays shown in FIG. 3, wherein multiple side sonar return beams on each side are indicated, in accordance with some embodiments discussed herein;

FIG. 24B shows an example marine electronic device presenting a sidescan sonar image with high resolution surface features and fish arches, in accordance with some embodiments discussed herein;

FIG. 25 shows an example marine electronic device presenting a live side sonar image and a current and historical sidescan sonar image, in accordance with some embodiments discussed herein;

FIG. 26 shows an example marine electronic device presenting a live side sonar image and a current and historical sidescan sonar image, with emphasis features, in accordance with some embodiments discussed herein;

FIG. 27 shows an example marine electronic device presenting a live forward sonar image, a live side sonar image, and a current and historical sidescan sonar image, in accordance with some embodiments discussed herein;

FIG. 28 shows an example marine electronic device presenting a live forward sonar image and live side sonar images overtop a representation of a watercraft, in accordance with some embodiments discussed herein;

FIG. 29 illustrates a schematic top plan view of the watercraft and sonar coverage shown in FIG. 3, in accordance with some embodiments discussed herein;

FIG. 30 illustrates a schematic top plan view of the watercraft and sonar coverage shown in FIG. 5, in accordance with some embodiments discussed herein;

FIG. 31 is a block diagram of an example sonar system, in accordance with some embodiments discussed herein;

FIG. 32 is a block diagram of an example sonar system, in accordance with some embodiments discussed herein;

FIG. 33 illustrates a flowchart of an example method of operating a sonar system according to some embodiments discussed herein; and FIG. 34 illustrates a flowchart of an example method of operating a sonar system according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

As depicted in FIG. 1, a watercraft 100 (e.g., a vessel) configured to traverse a marine environment, e.g., body of water 101, may use one or more sonar transducer assemblies 102a, 102b, and 102c disposed on and/or proximate to the watercraft. The watercraft 100 may be a surface watercraft, a submersible watercraft, or any other implementation known to those skilled in the art. The transducer assemblies 102a, 102b, and 102c may each include one or more transducer elements (such as in the form of the arrays described herein) configured to transmit sound waves into a body of water, receive sonar returns from the body of water, and convert the sonar returns into sonar return data.

Depending on the configuration, the watercraft 100 may include a main propulsion motor 105, such as an outboard or inboard motor. Additionally, the watercraft 100 may include trolling motor 108 configured to propel the watercraft 100 or maintain a position. The one or more transducer assemblies (e.g., 102*a*, 102*b*, and/or 102*c*) may be mounted in various positions and to various portions of the watercraft 100 and/or equipment associated with the watercraft 100. For example, the transducer assembly may be mounted to the transom 106 of the watercraft 100, such as depicted by transducer assembly 102*a*. The transducer assembly may be mounted to the bottom or side of the hull 104 of the watercraft 100, such as depicted by transducer assembly 102*b*. The transducer assembly may be mounted to the trolling motor 108, such as depicted by transducer assembly 102*c*.

The watercraft 100 may also include one or more marine electronic devices 160, such as may be utilized by a user to interact with, view, or otherwise control various aspects of the various sonar systems described herein. In the illustrated embodiment, the marine electronic device 160 is positioned proximate the helm (e.g., steering wheel) of the watercraft 100—although other places on the watercraft 100 are contemplated. Likewise, additionally or alternatively, a user's mobile device may include functionality of a marine electronic device.

FIGS. 2A-C illustrate an example array 220 of transducer elements 208 that may be utilized with various embodiments of the present invention, such as within an example transducer assembly described herein. In some embodiments, the transducer array 220 may include a plurality of transducer elements 208 arranged in a line and electrically connected relative to each other. For example, the transducer elements 208 may be individually positioned on a printed circuit board (PCB). The PCB may mechanically support and electrically connect the electronic components, including the transducer elements using conductive tracks (e.g. traces), pads, and other features. The conductive tracks may comprise sets of traces; for example, each transducer elements may be mounted to the PCB such that the transducer element is in electrical communication with a set of traces. Each transducer element, sub-array, and/or the array of transducer elements may be configured to transmit one or more sonar pulses and/or receive one or more sonar return signals. Unless otherwise stated, although FIGS. 2A-C illustrate a linear array with transducer elements of a certain shape, different types of arrays (or sub-arrays), transducer elements, spacing, shapes, etc. may be utilized with various embodiments of the present invention.

In the illustrated embodiment shown in FIG. 2A, the transducer array 220 includes an emitting face 221 with a length $L_A$ and a width $W_A$, where the length is greater than the width. Within the array 220, each transducer element 208 defines an emitting face 209 with a length $L_T$ and a width $W_T$, where the length is greater than the width. The length of each transducer element 208 is perpendicular to the length of the emitting face 221. Each transducer element 208 is spaced at a predetermined distance from an adjacent transducer element, which may be designed based on desired operating characteristics of the array 220, such as described herein.

In some embodiments, the array 220 of transducer elements 208 is configured to operate to transmit one or more sonar beams into the underwater environment. Depending on the configuration and desired operation, different transmission types of sonar beams can occur. For example, in some embodiments, the array 220 may transmit sonar beams according to a frequency sweep (e.g., chirp sonar) so as to provide sonar beams into the underwater environment. In some embodiments, the array 220 may be operated to frequency steer transmitted sonar beams into various volumes of the underwater environment. In some embodiments, the array 220 may be operated to cause a broadband transmit sonar beam to be sent into the underwater environment. Depending on the frequency used and phase shift applied between transducer elements, different volumes of the underwater environment may be targeted.

In some embodiments, the array 220 may be configured to receive sonar return signals. The way the sonar return signals are received and/or processed may vary depending on the desired sonar system configuration. FIGS. 2B-2C illustrate the array 220 with example possible sonar return beam coverage according to various example embodiments. In this regard, in some embodiments, each of the plurality of transducer elements are configured to operate at a fixed phase shift (e.g., at one of 0°, π/2 radian, π/4 radian, or π/8 radian) and vary in frequency (e.g., between 500 kHz-1200 kHz). This processing approach beamforms multiple sonar return beams (e.g., beam 280) between a first range of angles ($\theta_1$) 281 and between a second range of angles ($\theta_2$) 282. To explain, the sonar returns may be received by the array 220 and filtered into frequency bins based on the frequency of the signal. From that, sonar return beams 280 can be determined that provide sonar returns within a small angle window (e.g., 0.25° to 2°, although greater or lesser angle windows are contemplated). Since the mounting orientation with respect to the watercraft can be known, and the frequency is known, then the relative angle with respect to the waterline (or other reference) can be determined and used to form sonar imagery, as described herein.

With further reference to FIG. 2B, the sonar return beams (e.g., 280) can be "steered" (e.g., along arrow R) within the first range of angles 281 based on varying the frequency (e.g., between 291*a* and 291*b*). Likewise, the sonar return beams can be "steered" within the second range of angles 282 based on varying the frequency (e.g., between 292*a* and 292*b*). By operating the transducer elements at a fixed phase shift, the two range of angles 281, 282 can be covered with sonar beams, but there is also a gap (e.g., indicated by the range of angles β) that is not able to be covered by the frequency steered sonar return beams.

Without being bound by theory, a perhaps simplified explanation of this can be based on considering a single beam shape that is formed by a receipt event of the array. The beam shape is formed of a rather wide main beam lobe, along with at least one relatively small defined side lobe (e.g., the beam 280) that extends outwardly therefrom. By operating at a fixed phase shift and ignoring the main beam lobe, the sonar return signals received within the side lobe can be determined. Further, changing the frequency causes a shifting of the direction of the side lobe among the range of angles (281 or 282). Since the side lobe is symmetrical about the main lobe, there are two ranges of angles that are symmetrical about the facing direction $D_{FD}$ of the emitting face 221 of the array 220.

Further information regarding beamforming, including frequency steered beamforming, can be found, for example, in the following: U.S. Pat. No. RE45,379, entitled "Frequency Division Beamforming for Sonar Arrays"; U.S. Pat. No. 10,114,119, entitled "Sonar Systems using Interferometry and/or Beamforming for 3D Imaging"; U.S. Pat. No. 9,739,884, entitled "Systems and Associated Methods for Producing a 3D Sonar Image"; and U.S. patent application Ser. No. 16/382,639, published as U.S. Publication No. 2019/0265354, and entitled "Sonar Transducer Having Geometric Elements"; the contents of each hereby being incorporated by reference in their entireties.

Depending on various factors, different beam shapes can be achieved, and different ranges of angles can be achieved. The following describes some example factors that can be varied to affect the beam shapes and different ranges of angles: the number of transducer elements, the size/shape of the transducer elements, the size/shape of the array, the fixed phase shift, the frequency range, among other things. An example embodiment produces a first range of angles spanning somewhere between ~20° and ~45°, such as ~30°, and a second range of angles spanning somewhere between ~20° and ~45°, such as ~30°, with a gap of range of angles therebetween of somewhere between ~25° and ~65°, such as ~45°. Additionally, sonar return beams of ~0.25° to 2° are formed. Further, with reference to FIG. 2C, a transverse beamwidth $\theta_3$ of somewhere between ~10° and ~45°, such as ~20°, is formed. Some example embodiments that may achieve such example beam shapes include an array length of between ~100-150 mm; an array width of between ~3-10 mm; an array thickness of between ~1-3 mm; a number of transducer elements of between 50-200; a width of the transducer element of between ~0.4-1 mm; and a length of the transducer element of between ~2-10 mm (although outside of these ranges is also contemplated).

In some embodiments, the system may be configured to utilize more than one array, where the arrays are oriented relative to each other to provide desired coverage volume of certain portion of the underwater environment. For example, in some embodiments, a second (or more) array(s) can be added and tilted relative to the first array such that one of the ranges of angles of the first array points outward from one side of a watercraft, and such that one of the ranges of angles of the second array points outward from the other side of the watercraft. FIG. 3 illustrates an example transducer assembly 300 that is designed to provide side-facing sonar coverage utilizing beamformed sonar return beams. The transducer assembly 300 includes a first array 320 and a second array 330. The first array 320 (shown by itself in FIG. 3A) is oriented with a facing direction at an angle (e.g., 300 relative to the horizontal axis H) so as to produce a first range of angles 321 and a second range of angles 322 (with a gap in between). The second array 330 (shown by itself in FIG. 3B), is oriented with a facing direction at an angle (e.g., −30° relative to the horizontal axis H) so as to produce a first range of angles 331 and a second range of angles 332 (with a gap in between). As so arranged, the second range of angles 322 of the first array 320 and the second range of angles 332 of the second array 330 are substantially perpendicular to the horizontal axis H (thereby enabling sonar coverage off to each side of the watercraft). Further, the first array 320 and the second array 330 are arranged such that the first range of angles 321 of the first array 320 and the first range of angles 331 of the second array 330 are either nearly adjacent, adjacent, or overlapping and generally directed forward (if the forward direction of the watercraft is facing to the left of the page) or backward (if the forward direction of the watercraft is facing to the right of the page). In this regard, in some embodiments, multiple arrays can be relatively positioned to stack coverage volume to provide for overall increased coverage volume of the underwater environment (e.g., the sonar return data from the first range of angles 321 of the first array 320 and the first range of angles 331 of the second array 330 can be added together (e.g., positioned on the display) to show an increased coverage volume).

FIG. 4A illustrates another example transducer assembly 302 that includes an arrangement of two arrays arranged to provide side sonar coverage utilizing beamformed sonar return beams. In this arrangement, the first range of angles 352 of the second array 350 and the second range of angles 342 of the first array 340 may be positioned such that they may provide side sonar coverage. The first array 340 and the second array 350 are positioned adjacent and substantially parallel to one another such that the first array 340 and the second array 350 can fit within a housing that is smaller than a housing which would enclose the embodiment of FIG. 3. For example, the housing may be sized around the arrays 350, 352 (e.g., housing 399) and, in some cases, designed to be mounted at the shown offset angle with respect to the watercraft. A smaller housing may be preferred in certain situations, for example, to reduce costs or to reduce overall weight and/or hydrodynamic affect. In some such example embodiments, the first range of angles 341 of the first array 340 and the second range of angles 351 of the second array 350 may not be utilized. In other embodiments, the first range of angles 341 of the first array 340 and the second range of angles 351 of the second array 350 may be utilized to provide alternative sonar coverage (e.g., sonar coverage of a section that is forward and to the side of a watercraft and/or sonar coverage of a section that is backward and to the side).

As noted herein, in some embodiments, multiple arrays may be arranged relative to each other such that ranges of angles are adjacent so as to provide increased coverage of the desired portion of the underwater environment. In such an example arrangement, the sonar beams generated within adjacent ranges of angles (from different arrays) can be positioned accordingly when forming a sonar image to form a sonar image that provides an increased overall view angle. For example, FIG. 4B illustrates an example transducer assembly 902 that includes 4 arrays 960, 970, 980, and 990 that are arranged to provide increased coverage volume for a live left side sonar image, a live right side sonar image, and a live forward-wide sonar image. Notably, a first array 960 is arranged to provide a first range of angles 961 that is aimed to a right side (if the front of the watercraft is facing to the left of the page) and abuts a first range of angles 971 of a second array 970 that is also aimed to the right side but slightly adjacent such that, together, the first range of angles 961 of the first array 960 and the first range of angles 971 of the second array 970 form an increased coverage volume off to the right side of the watercraft—providing a larger live view for the corresponding live right side sonar image (e.g., a beamwidth coverage of ~40°-~65° since the two ranges of angles are added together). Likewise, a third array 980 is arranged to provide a first range of angles 981 that is aimed to a left side (if the front of the watercraft is facing to the left of the page) and abuts a first range of angles 991 of a fourth array 990 that is also aimed to the left side but slightly adjacent such that, together, the first range of angles 981 of the third array 980 and the first range of angles 991 of the fourth array 990 form an increased coverage volume off to the left side of the watercraft—providing a larger live view for the corresponding live left side sonar image (e.g., a beamwidth coverage of ~40°-~65° since the two ranges of angles are added together). Additionally, however, the second range of angles of each of the arrays are further aimed to work together to provide an increased overall view of the live forward-wide sonar image (e.g., a beamwidth coverage of ~90°-~160° since the four ranges of angles are added together). In this regard, the second range of angles 962 of the first array 960 is aimed adjacently to the second range of angles 972 of the second array 970, which is aimed adjacently to the second range of angles 992 of the fourth array 990, which is aimed adjacently to the second range of angles 982 of the third array 980. Notably, more or less arrays that are arranged differently may be used in various embodiments to provide the desired sonar coverage within the underwater environment.

FIG. 5 illustrates another example transducer assembly 304 that includes an arrangement of three arrays arranged to provide, for example, at least forward sonar coverage, side sonar coverage, and downward sonar coverage, utilizing beamformed sonar return beams. Notably, the first array 360 and the second array 370 are positioned in the same way as shown in FIG. 3. The third array 380 is positioned such that the range of angles 382 of the third array 380 extends generally downward (i.e., into the page). Additionally, the ranges of angles 381 of the third array 380 extends forwardly. In this regard, the facing direction of the third array 380 is different from the first array 360 and second array 370 (the facing directions of the first array 360 and second array 370 each extend to the sides, and the facing direction of the third array 380 is downward and forward). Further, as shown in FIGS. 5 and 14A, the range of angles 381 of the third array 380 extends generally forward and downward. The example transducer assembly 304 of FIG. 5 can produce multiple forward views, downward views, and side views. For example, the transducer assembly 304 may be able to produce at least eight different sonar images, including: a two-dimensional live left-side sonar image, a two-dimensional live right-side sonar image, a current and historical sidescan sonar image, a two-dimensional live forward-wide sonar image (depending on skew angle of the side-facing arrays), a current and historical linear downscan sonar image, a current and historical conical downscan sonar image, a two-dimensional live downscan sonar image, and a two-dimensional live forward sonar image.

FIG. 6 illustrates another example transducer assembly 306. The transducer assembly of FIG. 6 is similar to the transducer assembly 304 of FIG. 5, except that the third array 380 is rotated 180 degrees such that the range of angles 381' of the third array 380 faces in an opposite direction. The range of angles 382 of the third array 380 still points in the same direction as in FIG. 5. The example transducer assembly 306 of FIG. 6 can produce multiple forward views, downward views, backward views, and side views. For example, the transducer assembly may be able to produce at least eight different sonar images, including: a two-dimensional live left-side sonar image, a two-dimensional live right-side sonar image, a current and historical sidescan sonar image, a two-dimensional live forward and/or forward-wide sonar image, a current and historical linear downscan sonar image, a current and historical conical downscan sonar image, a two-dimensional live downscan sonar image, and a two-dimensional live backward sonar image. Notably, whether a live forward or forward-wide sonar image can be created depends on a skew angle of the side facing arrays. For example, if there is no skew angle of the first array 360 and the second array 370 (e.g., the arrays are mounted such that their longitudinal axis aligns with the mounting plane), then the ranges of angles 361 and 371, respectively, could beamform to form a live forward-wide sonar image (such as shown in FIG. 16). However, if the first array 360 and second array 370 are mounted with their longitudinal axis skewed downwardly to the back (such as described herein), the ranges of angles 361 and 371, respectively, could beamform to form more of a live forward sonar image (such as shown in FIG. 17). In such a case, in some embodiments, a subset of the beams from one or more of the ranges of angles 361 and 371 may be used to form the live forward sonar image (e.g., some amount for the beams in, for example, the first 5-25 degrees with respect to the forward direction). If both ranges of angles 361 and 371 are used, in some such embodiments, the sonar beams may be corresponded to each other and be added together when forming the image.

FIGS. 7A-7B illustrate an example housing 500 that houses three arrays 502, 504, 506. The three arrays 502, 504, 506 are arranged within the housing 500 in a configuration that provides sonar beam coverage similar to that shown in FIG. 5. Notably, the configuration of the arrays is such that top ends 508, 512, 516 of the arrays 502, 504, 506 are closer together and bottom ends 510, 514, 518 of the arrays 502, 504, 506 are farther apart. This enables some benefits for the housing 500. For example, the housing 500 may maintain a small footprint and still provide a straight top that, for example, enables easier mounting and/or enables a user to more easily comprehend the positions of the arrays (and, thus, determine and orient the housing 500 properly with respect to the watercraft for the desired coverage).

FIGS. 8-13 illustrate an example embodiment where a first array 532 and a second array 534 of a transducer assembly are angled or skewed downwardly with respect to a mounting plane (e.g., the plane formed by line Y in FIG. 8 and line X in FIG. 11). In this regard, such example first and second arrays 532, 534 may be used for example with transducer assembly 300 (FIG. 3), transducer assembly 302 (FIG. 4A), transducer assembly 304 (FIG. 5), transducer assembly 306 (FIG. 6), or the transducer assembly in the housing 500 (FIGS. 7A-7B). Notably, while the first array 532 and the second array 534 do not cross (as in FIGS. 3, 4A, 4B, 5, and 6), the corresponding side coverage and much of the corresponding forward coverage are equivalent.

With reference to FIG. 8, the first array 532 and the second array 538 are shown below an example structure 530 that represents a watercraft (although the watercraft would be much bigger). As noted above, the mounting plane may include axes X and Y and be perpendicular to axis Z. The first and second arrays 532 and 534 may each have longitudinal axes L1 and L2, respectively. The longitudinal axes L1 and L2 may extend from the mounting plane at angles A1, A2, as shown in FIG. 11. In some embodiments, the angles A1, A2 are acute angles (e.g., an angle between 10° and 40° from the mounting plane), and a front end 540, 542 of each of the longitudinal axes L1, L2 of the first and second arrays 532, 534 is positioned higher than a corresponding back end 536, 538 of each of the longitudinal axes L1, L2, of the first and second arrays 532, 534. In other embodiments, the longitudinal axes L1, L2 of the first and second arrays 532, 534 may extend at any other angle from the mounting plane and may be positioned in any other configuration. Notably, the angles A1, A2 help define the corresponding side and forward sonar coverage of the corresponding range of angles, such as described herein. However, notably, by so orienting the first and second arrays at angle with respect to the mounting plane, corresponding sonar signal processing for the "live" sonar image is easier to implement. Indeed, the angle of reflection of the bottom surface and the frequency steering required to form the image results in difficulties in signal processing for an array that does not extend at an angle with respect to the mounting plane (e.g., when the array is flat against the mounting plane as would be typical).

Further, the watercraft may define a vertical centerline plane that is perpendicular to the surface of the body of water. The vertical centerline plane may include axes Y and Z, and the vertical centerline plane may be perpendicular to axis X. The longitudinal axes L1, L2 of the first and second arrays 532, 534 may extend from the vertical centerline plane at angles A3, A4, as shown in FIG. 9. In some embodiments, the angles A3, A4 are acute angles (e.g., an angle between 10° and 40° from the mounting plane), and each of the front ends 540, 542 of the longitudinal axes L1, L2 of the first and second arrays 532, 534 is positioned inward from a corresponding back end 536, 538 of each of the longitudinal axes L1, L2 of the first and second arrays 532, 534. In other embodiments, the longitudinal axes L1, L2 of the first and second arrays 532, 534 may extend at any other angle from the vertical centerline plane and may be positioned in any other configuration. Notably, the angles A3, A4 help define the corresponding side and forward sonar coverage of the corresponding range of angles, such as described herein. By so orienting the first and second arrays relative to the vertical centerline plane, the desired portions of the underwater environment can be covered.

FIGS. 14A and 14B show a three-dimensional illustration of an example transducer assembly with a housing 800 that houses the three arrays, such as the three arrays 360, 370, 380 depicted in FIG. 5. As illustrated, the first array 360 includes a first beam pattern 861 corresponding to its first range of angles 361 and a second beam pattern 862 corresponding to its second range of angles 362. As shown, the first beam pattern 861 of the first array 360 is ~30° by ~30° (although other beam widths are contemplated, as noted herein). Similarly, the second array 370 includes a first beam pattern 871 corresponding to its first range of angles 371 and a second beam pattern 872 corresponding to its second range of angles 372. As shown, the first beam pattern 871 of the second array 370 is ~30° by ~30° (although other beam widths are contemplated, as noted herein). Similarly, the third array 380 includes a first beam pattern 881 corresponding to its first range of angles 381 and a second beam pattern 882 corresponding to its second range of angles 382. As shown, the first beam pattern 881 of the third array 380 is ~30° by ~30° (although other beam widths are contemplated, as noted herein). It should be appreciated that, in some embodiments, the arrays 360 and 370 may be configured in the same way as arrays 532 and 534 in FIGS. 8-13.

In some embodiments, the arrays can be used to form side live (or substantially real-time) two-dimensional (2D) sonar images (e.g., time/distance from the transducer assembly and angle). For example, FIG. 15 illustrates 2D live side sonar images 552, 554 presented on a display of a marine electronics device 550. Each of the 2D live side sonar images 552, 554 is formed as slices of sonar return data corresponding to each sonar return beam extending within a sonar beam coverage. For example, each of the 2D live side sonar images 552, 554 may be formed as slices of sonar return data corresponding to each sonar return beam extending within the sonar beam coverages defined by the ranges of angles 362 and 372 in FIG. 5. In this regard, the 2D live side sonar images 552, 554 can be updated in substantially real-time all at once as they were all received at substantially the same time (e.g., by selecting different frequencies to form all the different sonar return beams that are used to present sonar return data into the image at the proper angle).

Additionally, the arrays can be used to form forward-wide live (or substantially real-time) two-dimensional (2D) sonar images. For example, referring to FIG. 16, a 2D live forward-wide sonar image 556 can be formed as slices of sonar return data corresponding to each sonar return beam extending within a sonar beam coverage. In some embodiments, the 2D live forward-wide sonar image 556 may be formed as slices of sonar return data corresponding to each sonar return beam extending within the sonar beam coverages defined by the ranges of angles 361 and 371 in FIG. 5. In this regard, the 2D live forward-wide sonar image 556 can be updated in substantially real-time all at once as they were all received at substantially the same time (e.g., by selecting different frequencies to form all the different sonar return beams that are used to present sonar return data into the image at the proper angle).

Additionally, the arrays can be used to form forward live (or substantially real-time) two-dimensional (2D) sonar images. For example, referring to FIG. 17, a 2D live forward sonar image 558 can be formed as slices of sonar return data corresponding to each sonar return beam extending within a sonar beam coverage. In some embodiments, the 2D live forward sonar image 558 may be formed as slices of sonar return data corresponding to each sonar return beam extending within the sonar beam coverage defined by the range of angles 381 in FIG. 5. In this regard, the 2D live forward sonar image 558 can be updated in substantially real-time all at once as they were all received at substantially the same time (e.g., by selecting different frequencies to form all the different sonar return beams that are used to present sonar return data into the image at the proper angle).

The arrays may also be used to form backward live two-dimensional (2D) sonar images. For example, in embodiments with an arrangement of arrays similar to that shown in FIG. 6, a 2D live backward sonar image can be formed as slices of sonar return data corresponding to each sonar return beam extending within the sonar beam coverage defined by the range of angles 381'. In this regard, the 2D live backward sonar image, which would appear similar to the 2D live forward sonar image 558 shown in FIG. 17, can be updated in substantially real-time all at once as they were all received at substantially the same time (e.g., by selecting different frequencies to form all the different sonar return beams that are used to present sonar return data into the image at the proper angle).

The arrays can also be used to form downward live (or substantially real-time) two-dimensional (2D) sonar images. For example, referring to FIG. 18, a 2D live downscan sonar image 560 can be formed as slices of sonar return data corresponding to each sonar return beam extending within a sonar beam coverage. In some embodiments, the 2D live downscan sonar image 560 may be formed as slices of sonar return data corresponding to each sonar return beam extending within the sonar beam coverage defined by the range of angles 382 in FIG. 5. In this regard, the 2D live downscan sonar image 560 can be updated in substantially real-time all at once as they were all received at substantially the same time (e.g., by selecting different frequencies to form all the different sonar return beams that are used to present sonar return data into the image at the proper angle). The reference distance from the transducer assembly 562 (e.g., which correlates to depth in the substantially straight down direction) is shown at 564.

In some embodiments, the arrays can be used to form additional different-type sonar images, such as sonar images that anglers are used to seeing. For example, while the arrays provide complex transducer element arrangements that can be used to create the live 2D sonar image, some embodiments contemplate using the same transducer assembly to provide "waterfall" based (or one-dimensional (1D)) sonar images that build-up over time. Notably, the sonar system may select one or more of the sonar return beams to form the sonar images—all without other additional transducer elements.

In some embodiments, the sonar system may be configured to form high definition 1D sonar images (e.g., current and historical sonar images) that build-up over time (e.g., across different sonar return receipts). As noted herein, each sonar return beam corresponds to an angle window (e.g., ~0.25°-2°—although other angle windows are contemplated). By utilizing the sonar return beam (or a few sonar return beams) that corresponds to a desired frequency, the system can form a current and historical 1D sonar image with high definition.

In this regard, for a current and historical sidescan sonar image (e.g., a 1D side-facing sonar image with high definition), one (or a few, e.g., up to 10 for example) beams 566, 568 within each of the ranges of angles 362 and 372 are selected. This is shown, for example, in FIG. 19A. The resulting beam shape (e.g., a fan shape) for one (or a few) sonar beam(s) being selected would be relatively narrow in the fore-to-aft direction (e.g., within 0.25°-3°, preferably within 0.5°-1°) and relatively wide in the opposite direction (e.g., within ~10°-27°). Notably, additional sonar return beams being selected would increase the beamwidth in the opposite direction (e.g., making a 2° by 20° beam shape, etc.). In this regard, in some embodiments, more than one sonar return beam could be selected and still produce the desired current and historical sidescan sonar image with less high-definition the more beams that are selected.

As explained above, the various beams within the range of angles of 362 and 372 correspond to different frequencies. Thus, the beam (or beams) selected for the current and historical sidescan image (e.g., beams 566, 568) may be selected according to a desired frequency so as to choose a desired relative coverage volume and/or a desired frequency. In this regard, a different relative angle with respect to a center facing direction of the array may be selected by its corresponding frequency(s) to produce the current and historical sidescan image based on that selected beam(s). Additionally or alternatively, a user may desire for a specific frequency such as based on resolution and/or relative distance to the bottom of the underwater environment. In this regard, different frequencies correspond to different sonar image resolutions, and different scenarios may require different frequencies to obtain a best sonar view. For example, a higher frequency may be more desirable in shallow water conditions, whereas a lower frequency may be more desirable in deep water conditions.

FIG. 19A illustrates the ranges of angles 361, 362, 371, 372 from the example first array 360 and the example second array 370. In the illustrated example, the sonar return beams 566, 568 are shown, which are the sonar return beams that correspond to beam(s) within the ranges of angles 362, 372 of the first and second arrays 360, 370—where the beam(s) correspond to desired frequencies. In some embodiments, the selected sonar return beams 566, 568 may be pre-determined and utilized whenever a user wants to see the current and historical sidescan sonar image, or they may be determined based on the orientation of the housing 500 (e.g., using an orientation sensor and determining the orientation of the transducer assembly with respect to a reference, such as the top surface of the body of water—e.g., waterline). Further, as noted above, though individual sonar return beams 566, 568 are shown, more than one could be selected (e.g., three sonar return beams, such as one on each side of the shown sonar return beams 566, 568). For example, in some embodiments, between one and ten sonar return beams may be selected. Further, in some embodiments, the width of each of the selected sonar return beam(s) 566, 568 may be less than five degrees.

Once determined (whether pre-determined or determined otherwise), the sonar system may be configured to generate a corresponding sonar image that utilizes sonar return data from the one or more sonar return beam. For example, FIG. 19B shows an example marine electronic device 550 presenting a high definition 1D (e.g., time/distance) sidescan sonar image, which is the current and historical sidescan sonar image 570. Notably, the current and historical sidescan sonar image 570 builds up from top to bottom in a "waterfall" format (e.g., along arrows B and C) with each subsequent slice of sonar image portions 572 filling on the top of the sonar image 570 and pushing the older slices to the bottom (e.g., from sonar return data taken at different, older times).

The sonar system may also be configured to produce a current and historical linear downscan sonar image using sonar return data from the range of angles 382 from the third array 380. The resulting beam shape (e.g., a fan shape) for one (or a few) sonar beam(s) being selected would be relatively narrow in the fore-to-aft direction (e.g., within 0.25°-3°, preferably within 0.25°-2°) and relatively wide in the port-to-starboard direction (e.g., within ~10°-27°). Notably, additional sonar return beams being selected would increase the beamwidth in the port-to-starboard direction (e.g., making, for example, a 4° (or more) by 20° beam shape, etc.). In this regard, in some embodiments, more than one sonar return beam could be selected and still produce the current and historical linear downscan sonar image.

Such a beam shape would produce high definition downscan sonar imagery that would show high detail structure, such as the bottom surface, trees, etc. In this regard, the resulting sonar image is equivalent to that produced by a linear downscan transducer—which is a sonar image that anglers have gotten used to using. Notably, however, the angler would not have to purchase a separate transducer assembly with the linear transducer. An example linear downscan transducer is further described in U.S. Pat. No. 8,300,499, entitled "Linear and Circular Downscan Imaging Sonar", which is incorporated by reference herein in its entirety.

FIG. 20 illustrates the ranges of angles 381, 382 from an example third array 380. In the illustrated example, the sonar return beam 574 is shown, which is the sonar return beam that corresponds to an angle within the range of angles 382 of the third array 380—where the angle is substantially straight downward from the watercraft. In some embodiments, the selected sonar return beam 574 may be predetermined and utilized whenever a user wants to see the current and historical linear downscan sonar image, or it may be determined based on the orientation of the housing 500 (e.g., using an orientation sensor and determining the orientation of the transducer assembly with respect to a reference, such as the top surface of the body of water—e.g., waterline). Further, as noted above, though one sonar return beam 574 is shown, more than one could be selected (e.g., three sonar return beams, such as one on each side of the shown sonar return beam 574).

Once determined (whether pre-determined or determined otherwise), the sonar system may be configured to generate a corresponding sonar image that utilizes sonar return data from the one or more sonar return beam. For example, FIG. 21 shows an example marine electronic device 550 presenting a high-definition 1D (e.g., time/distance) downward sonar image, which is the current and historical linear downscan sonar image 578. Notably, the sonar image 578 builds up from right to left in a "waterfall" format (e.g., along arrow D) with each subsequent slice of sonar image portions 580 filling on the right side of the current and historical linear downscan sonar image 578 and pushing the older slices to the left (e.g., from sonar return data taken at different, older times). Notably, detailed bottom surface 582 and underwater structure 584 (e.g., seaweed or underwater trees) are visible in the current and historical linear downscan sonar image 578. This is, in some embodiments, due to the small beam width used for each slice in the fore-to-aft direction.

In some embodiments, the sonar system may be configured to form current and historical conical downscan sonar images, which are 1D sonar images with desirable fish finding features (e.g., fish arches). Such an example sonar image would build-up over time (e.g., across different sonar return receipts). As noted herein, each sonar return beam corresponds to an angle window (e.g., ~0.25°-2°—although other angle windows are contemplated). By utilizing a plurality of sonar return beams (e.g., a range of angles), where at least one corresponds to substantially straight down, the system can form a downward 1D sonar image with fish arches. In this regard, the resulting beam shape for a plurality of sonar beams being selecting may be relatively wide (e.g., above 10°) in both the fore-to-aft direction (e.g., within the range of ~10°-45°, (preferably ~20°-40°)) and the port-to-starboard direction (e.g., within the range of ~10°-27°).

Such a beam shape would produce fish arch images within the downscan sonar imagery that would be desirable for anglers. In this regard, the resulting sonar image is equivalent to that produced by a conical (or circular) downscan transducer—which is a sonar image that anglers have gotten used to using. Notably, however, the angler would not have to purchase a separate transducer assembly with the conical transducer. An example conical downscan transducer is further described in U.S. Pat. No. 8,300,499, entitled "Linear and Circular Downscan Imaging Sonar", which is incorporated by reference herein in its entirety.

FIGS. 20 and 22 illustrate the arrangement of the example plurality of sonar return beams 576 used for the current and historical conical downscan sonar image 586. In the illustrated example, the plurality of sonar return beams 576 is shown selected (with a single one of the sonar return beams 574 also illustrated). In the illustrated embodiment, at least one of the selected sonar return beams within the plurality of sonar return beams 576 includes an angle within the range of angles 382 of the third array 380—where the angle is substantially straight downward from the watercraft. In some embodiments, the selected plurality of sonar return beams 576 may be pre-determined and utilized whenever a user wants to see the current and historical conical downscan sonar image with fish arches, or it may be determined based on the orientation of the housing 500 (e.g., using an orientation sensor and determining the orientation of the transducer assembly with respect to a reference, such as the top surface of the body of water—e.g., waterline).

In some embodiments, the selected plurality of sonar return beams (e.g., range of angles) may extend to both sides of the sonar return beam that corresponds to substantially straight down (e.g., 10° in the clockwise direction and 5° in the counter-clockwise direction, 10° in both directions, etc.). In some embodiments, the selected plurality of sonar return beams may be determined to include the sonar return beam with the angle corresponding to substantially straight down in the center.

Once determined (whether pre-determined or determined otherwise), the sonar system may be configured to generate a corresponding sonar image that utilizes sonar return data from the plurality of sonar return beams. For example, FIG. 23A shows an example marine electronic device 550 presenting a 1D (e.g., time/distance) downward sonar image with fish arches, which is the current and historical conical downscan sonar image 586. Notably, the sonar image 586 builds up from right to left in a "waterfall" format (e.g., along arrow E) with each subsequent slice of sonar image portions 590 filling on the right side of the sonar image 586 and pushing the older slices to the left (e.g., from sonar return data taken at different, older times). Notably, less-detailed bottom surface 592 along with the fish arches 588 are visible in the sonar image 586. This is, in some embodiments, due to the wide beam width used for each slice in the fore-to-aft direction.

In some embodiments, the sonar system may be configured to form a desirable combination downward sonar image that includes both high-definition underwater structure (e.g., bottom surface and other structure) as well as desirable fish finding features (e.g., fish arches). Due to differing beam widths required to produce each sonar image feature, such a sonar image is not possible using just one beam width. In this regard, some embodiments of the present invention contemplate forming such a sonar image using example transducer assemblies that include one or more arrays, without the need for other transducer elements (e.g., a linear transducer element or a conical transducer element).

In this regard, in some embodiments, like the 1D sonar images described herein, such an example sonar image would also build-up over time (e.g., across different sonar return receipts). Further, however, both sets of determined sonar return beams would be utilized to gather sonar return data that is inputted together into the sonar image. For example, returning to FIGS. 20 and 22, the sonar return beam 574 (or equivalent as described herein) would be selected for the high-definition features and the plurality of sonar return beams 576 (or equivalent as described herein) would be selected for the fish arch features. As with the prior described sonar images, such sonar return beams could be pre-determined or determined otherwise (e.g., via an orientation sensor). Likewise, as described with respect to each of the example sonar return beam 574 and the plurality of sonar return beams 576, more or less (or different) sonar return beams could be selected to achieve the desired sonar return data.

In some embodiments, the system could be configured to form the sonar image from both the one of the multiple sonar return beams (e.g., the sonar return beam 574) and the plurality of the multiple sonar beams (e.g., the sonar return beams 576). For example, the sonar system may form the sonar image from sonar image portions corresponding to each sonar return beam set, where the sonar image portions are then combined to form the sonar image. As an example, the system may determine one or more fish arches based on sonar return data from the plurality of sonar return beams (e.g., sonar return beams 576), form the sonar image portions of the fish arches, and then position them in appropriate positions (e.g., at the depth and time associated with the sonar return data of the fish arches) within the sonar image portions corresponding to the sonar return beam 574. While this example describes fish arches, additional or other features (or depth portions) within the sonar return data from the plurality of sonar return beams could be used.

In some embodiments, the sonar system is configured to determine the fish arch from within sonar return data corresponding to the plurality of multiple sonar return beams that have been received across at least two or more time receipts. Such a determination could be performed using various filters or algorithms to distinguish between sonar return data that applies to fish (or fish-like objects)—e.g., using the strength of the sonar return, depth, relative position with respect to similar strength sonar returns, etc. In some embodiments, the image could be formed, and image recognition technology could be applied to identify the fish arch. In some embodiments, the fish arch may need to be of a certain size or shape threshold in order to qualify for use. For example, FIG. 23A illustrates an example fish arch 588 that has a height $H_{FA}$ and a width $W_{FA}$ that can be determined to qualify. In some embodiments, the degree of arch may also be a factor for determining a qualifying fish arch.

With the fish arches identified, the sonar image may be formed by combining the sonar image portions corresponding to the fish arches with the sonar image portions corresponding to the sonar return data received by the sonar return beam 574. For example, in some embodiments, the system is configured to generate the sonar image portion corresponding to the fish arch by removing or nullifying sonar image data (e.g., sonar return data formed into image compatible data) within the sonar return data that is not the determined fish arch.

Alternatively, the system may form the sonar image portion of the fish arch only.

Once the fish arch image portion is formed, the system may position the fish arch appropriately within the remaining sonar image portion (from the plurality of sonar return beams). For example, the system may determine the depth and time associated with the sonar return data corresponding to the fish arch; and position the generated sonar image portion of the fish arch at the position within the sonar image portions corresponding to the plurality of sonar return beams (e.g., sonar return beams 576) at the determined depth and time. In some embodiments, the fish arch sonar image portions may be overlaid onto the remaining sonar image portions (from the plurality of sonar return beams). Additionally or alternatively, the fish arch sonar image portions may replace corresponding portions of the remaining sonar image portions (from the plurality of sonar return beams).

In some embodiments, the resulting combined sonar image could be generated a number of different ways using sonar return data corresponding to both the sonar return beam 574 and the plurality of sonar return beams 576. For example, the sonar image could be formed by blending the sonar return data, including, in some embodiments, applying a greater weight to one set of the sonar return data. In some embodiments, a depth range of each sonar return data could be used. For example, the water column (from the watercraft to the bottom surface) could be used for the plurality of sonar return beams 576 (e.g., to show fish arches), while the bottom surface and below could be used for the sonar return beam 574 (e.g., to show the detail of the bottom surface). Slight variations in depth (e.g., the bottom surface plus 5 feet) could be used instead.

FIG. 23B shows an example marine electronic device 550 presenting a combined sonar image 594. Notably, the combined sonar image 594 builds up from right to left in a "waterfall" format (e.g., along arrow F) with each subsequent slice of sonar image portions 595 filling on the right side of the sonar image 594 and pushing the older slices to the left (e.g., from sonar return data taken at different, older times). Notably, the combined sonar image 594 includes detailed bottom surface 596 and other underwater structure (e.g., from the single or a few sonar return beams, such as sonar return beam 574) as well as the fish arches 597 (e.g., from the plurality of sonar return beams, such as sonar return beams 576). Such an image provides the desirable high-definition structure along with desirable fish arches that anglers are used to—all in one sonar image.

In some embodiments, one or more current and historical sidescan sonar images may be formed that include similar combined sonar data so as to show sonar imagery from a first beamwidth resolution with sonar imagery from a second beamwidth resolution. For example, side facing sonar imagery that mimics the traditional conical downscan sonar imagery may be combined with the traditional linear sidescan sonar imagery when forming a combined current and historical sidescan sonar image. With reference to FIG. 24A, in addition to the sonar return beams 566, 568 (such as discussed herein with respect to FIG. 19A and used to form high-definition sidescan sonar imagery), multiple sonar return beams can be selected within each of the first range of angles 362 of the first array 360 (e.g., the set of sonar beams 567) and the first range of angles 372 of the second array 370 (e.g., the set of sonar beams 569). Like multiple sonar beams 576 illustrated and described with respect to FIGS. 20 and 22, the sets of sonar beams 567 and 569 can be used to generate lower definition sonar imagery equivalent to conical sonar imagery—thereby producing, for example, fish arches off to each side of the watercraft. As similar to described above, that sonar imagery can be generated into a traditional conical sidescan sonar image (similar to the sidescan sonar image shown in FIG. 19B, but with less definition). Further, however, in some embodiments, also like described above, a combined sidescan sonar image can be formed, such as where the fish arches generated by the sets of sonar beams 567, 569 are added into the current and historical sidescan sonar imagery formed by the one or more sonar beams 566, 568.

An example combined current and historical sidescan sonar image 599 is shown in FIG. 24B. As illustrated, the combined current and historical sidescan sonar image 599 includes fish arches 599a (e.g., formed from multiple first sonar return beams, such as 567 in FIG. 24A) and high-definition structure 599b, such as trees (e.g., formed from one or more first sonar return beams, such as 566 in FIG. 24A). In this regard, the combined current and historical sidescan sonar image 599 includes sonar imagery based on a first subset of the multiple first sonar return beams (e.g., 566), a second subset of the multiple first sonar return beams (e.g., 567), a second subset of the multiple second sonar return beams (e.g., 568), and a second subset of the multiple second sonar return beams (e.g., 569). In this regard, the right side of the combined current and historical sidescan sonar image includes sonar imagery from the first subset of the multiple first sonar return beams and the second subset of the multiple first sonar return beams, and the left side of the combined current and historical sidescan sonar image includes sonar imagery from the second subset of the multiple second sonar return beams and the second subset of the multiple second sonar return beams. As noted herein, the first subset of the multiple first sonar return beams (e.g., 566) includes less sonar return beams than the second subset of the multiple first sonar return beams (e.g., 567), and the first subset of the multiple second sonar return beams (e.g., 568) includes less sonar return beams than the second subset of the multiple second sonar return beams (e.g., 569).

In some embodiments, the system may be configured to present one or more of the multiple different sonar images described herein—all based on utilizing the same transducer assembly (with two or more arrays). In this regard, the user can simply select one or more of the sonar images to have presented, and they are swappable as the system may be generating the sonar images simultaneously in the background. In some embodiments, the sonar system may provide the following sonar image possibilities: 2D live side sonar images such as shown and described in FIG. 15, a 2D live forward-wide sonar image such as shown and described in FIG. 16, a 2D live forward sonar image such as shown and described in FIG. 17, a 2D live downward sonar image such as shown and described in FIG. 18, a current and historical sidescan sonar image such as shown and described in FIG. 19B, a current and historical linear downscan sonar image such as shown and described in FIG. 21, a current and historical conical downscan sonar image such as shown and described in FIG. 23A, and a combined sonar image with high resolution surface features and fish arches such as shown and described in FIG. 23B (although in some embodiments the current and historical linear downscan sonar image with high resolution features shown and described in FIG. 21 may be toggled between with the combined sonar image with high resolution surface features and fish arches shown and described in FIG. 23B).

In some embodiments, the system may be configured to present two or more such sonar images in split screen (or multiple screen) mode. For example, FIG. 25 shows an example marine electronic device 550 presenting a combination image 600 which is a split screen of a two-dimensional (2D) live sidescan sonar image 602 and a current and historical sidescan sonar image 604. The combination image 600 may additionally include emphasis features 606, 608, 610, 612, as shown in FIG. 26. The emphasis features 606, 610 indicate the sonar beams being used to populate the current portions of the current and historical sidescan sonar image 604, as explained above in reference to FIG. 19B. More specifically, the 2D live sidescan sonar image 602 includes emphasis feature 606, which overlays and indicates a subset of the sonar return beams that corresponds to the current image slice of sonar image data 608 for the current and historical sidescan sonar image 604. Further, the 2D live sidescan sonar image 602 includes emphasis feature 610, which overlays and indicates a subset of the sonar return beams that corresponds to the current image slice of sonar image data 612 for the current and historical sidescan sonar image 604. In some embodiments, the emphasis features 606 and 610 may be movable on a display of the marine electronic device 550. For example, emphasis feature 606 may be movable along arrows I and J, and emphasis feature 610 may be movable along arrows G and H. When emphasis features 606 and 610 are moved overtop the 2D live sidescan sonar image 602, the current image slices of sonar image data, indicated by emphasis features 608, 612, change according to the placement of the emphasis features 606, 610 (which correspond to certain of the sonar beams—e.g.,. through frequency steering as described herein).

FIG. 27 shows an example marine electronic device 550 presenting another combination image 614 which is a split screen of a two-dimensional (2D) live forward sonar image 616, a two-dimensional (2D) live side sonar image 618, and a current and historical sidescan sonar image 620.

FIG. 28 shows an example marine electronic device 550 presenting another combination image 622 which is a split screen of a two-dimensional (2D) live forward sonar image 626 and two-dimensional (2D) live side sonar images 624, 628. A representation of a watercraft 630 is presented on the marine electronic device 550, and the 2D live side sonar images 628 and 624 are presented to the right and the left sides of the representation of the watercraft 630, respectively, corresponding to the right and left sides of a watercraft. Further, the 2D live forward sonar image 626 is presented to a top of the representation of the watercraft 630 corresponding to the front of the watercraft.

In some embodiments, the housing 500 may be mounted to the hull of a watercraft. In other embodiments, the housing 500 may be mounted to different portions of a watercraft or its corresponding devices (e.g., a trolling motor, pole, etc.). For example, the housing 500 may be mounted to a pole which may be attached to the watercraft and/or corresponding devices (e.g., a trolling motor, etc.). The housing 500 may alternatively be mounted to a trolling motor housing via, e.g., a strap and clamp. In some embodiments, the housing 500 may be oriented as desired.

As detailed herein, in some embodiments, the system may be configured to provide similar functionality utilizing only two arrays of transducer elements. In this regard, the system may be more cost effective for anglers and still provide desirable functionality. For example, FIG. 29 illustrates a watercraft 100 with a transducer assembly 632 that includes a pair of arrays that produce beam coverage as indicated by the first range of angles 634 and the second range of angles 636 (of a first array), and the first range of angles 638 and the second range of angles 640 (of a second array). In this regard, the pair of arrays is mounted and oriented such that the ranges of angles 634, 638 face in outward directions from the sides of the watercraft 100, and such that ranges of angles 636, 640 point in a generally forward direction from the watercraft 100. In some embodiments, the arrays are configured such that the ranges of angles 636, 640 are either adjacent to one another or overlap one another. For example, the pair of arrays may be oriented and mounted similar to the configuration shown in FIGS. 8-13. The sonar return beams 634, 636, 638, 640 (when taken alone or in a plurality) can be used to form the various sonar images described herein. For example, the following sonar images may be produced: a two-dimensional live left-side sonar image, a two-dimensional live right-side sonar image, a current and historical sidescan sonar image, and a two-dimensional live forward or forward-wide sonar image.

FIG. 30 illustrates a watercraft 100 with a transducer assembly 646 that includes three arrays that produce beam coverage as indicated by the first range of angles 634 and the second range of angles 636 (of a first array), the first range of angles 638 and the second range of angles 640 (of a second array), and the first range of angles 642 and the second range of angles 644 (of a third array). In this regard, the three arrays are mounted and oriented such that ranges of angles 634, 638 face in outward directions from the sides of the watercraft 100, ranges of angles 636, 640 point in a generally forward direction from the watercraft 100, the range of angles 642 point in a generally forward and downward direction from the watercraft 100, and the range of angles 644 points in a generally downward direction from the watercraft 100. In some embodiments, the arrays are configured such that the ranges of angles 636, 640 are either adjacent to one another or overlap one another. The sonar return beams 634, 636, 638, 640, 642, 644 (when taken alone or in a plurality) can be used to form the various sonar images described herein. For example, the following sonar images may be produced: a two-dimensional live left-side sonar image, a two-dimensional live right-side sonar image, a current and historical sidescan sonar image, a two-dimensional live forward-wide sonar image, a current and historical linear downscan sonar image, a current and historical conical downscan sonar image, a two-dimensional live downward sonar image, and a two-dimensional live forward sonar image.

In some embodiments, the transducer assembly can be configured to be oriented differently to provide different sonar image options. For example, the transducer assembly may be configured such that the arrays are oriented similar to that which is depicted in FIG. 6. In such a configuration, the following sonar images may be produced: a two-dimensional live left-side sonar image, a two-dimensional live right-side sonar image, a current and historical sidescan sonar image (this could include a linear sidescan image, a conical sidescan image, and/or a combined sidescan image—as described herein), a two-dimensional live forward or forward-wide sonar image, a current and historical linear downscan sonar image, a current and historical conical downscan sonar image, a two-dimensional live downward sonar image, and a two-dimensional live backward sonar image. Alternatively, the transducer assembly may be configured such that the arrays are oriented similar to that which is depicted in FIG. 4A. In such a configuration, at least the following sonar images may be produced: a two-dimensional live left-side sonar image, a two-dimensional live right-side sonar image, and a current and historical sidescan sonar image (this could include a linear sidescan image, a conical sidescan image, and/or a combined sidescan image—as described herein). In some further embodiments, additional sonar images may be produced, such as a live sonar image that is generally forward and to the side of the watercraft, a live sonar image that is generally backward and to the side of the watercraft, a current and historical sonar image that is generally forward and to the side of the watercraft, and a current and historical sonar image that is generally backward and to the side of the watercraft.

In the various embodiments described herein, the arrays may be arranged such that a maximum amount of sonar images may be produced using a minimum number of arrays. For example, an embodiment with two arrays may be able to produce at least four different sonar images, and an embodiment with three arrays may be able to produce at least eight different sonar images. The embodiments may further be able to produce even more combination images, as described above with reference to FIGS. 24-28.

Example System Architecture

FIG. 31 shows a block diagram of an example sonar system 400 of various embodiments of the present invention described herein. The illustrated sonar system 400 includes a marine electronic device 405 and a transducer assembly 462, although other systems and devices may be included in various example systems described herein. In this regard, the system 400 may include any number of different systems, modules, or components; each of which may comprise any device or means embodied in either hardware, software, or a combination of hardware and software configured to perform one or more corresponding functions described herein.

The marine electronic device 405 may include a processor 410, a memory 420, a user interface 435, a display 440, one or more sensors (e.g. position sensor 445, other sensors 447, etc.), and a communication interface 430. One or more of the components of the marine electronic device 405 may be located within a housing or could be separated into multiple different housings (e.g., be remotely located).

The processor 410 may be any means configured to execute various programmed operations or instructions stored in a memory device (e.g., memory 420) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide or receive sonar data, sensor data, location data, and/or additional environmental data. For example, the processor 410 may be configured to receive sonar return data, generate sonar image data, and generate one or more sonar images based on the sonar image data.

In some embodiments, the processor 410 may be further configured to implement sonar signal processing, such as in the form of a sonar signal processor (although in some embodiments, portions of the processor 410 or the sonar signal processor could be located within the transducer assembly 462). In some embodiments, the processor 410 may be configured to perform enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. watercraft, etc.

In an example embodiment, the memory 420 may include one or more non-transitory storage or memory devices such as, for example, volatile and/or non-volatile memory that may be either fixed or removable. The memory 420 may be configured to store instructions, computer program code, marine data, such as sonar data, chart data, location/position data, and other data associated with the navigation system in a non-transitory computer readable medium for use, such as by the processor for enabling the marine electronic device 405 to carry out various functions in accordance with example embodiments of the present invention. For example, the memory 420 could be configured to buffer input data for processing by the processor 410. Additionally or alternatively, the memory 420 could be configured to store instructions for execution by the processor 410.

The communication interface 430 may be configured to enable connection to external systems (e.g. an external network 402). In this manner, the marine electronic device 405 may retrieve stored data from a remote device 461 via the external network 402 in addition to or as an alternative to the onboard memory 420. Additionally or alternatively, the marine electronic device may transmit or receive data, such as sonar signals, sonar returns, sonar image data or the like to or from a transducer assembly 462. In some embodiments, the marine electronic device 405 may also be configured to communicate with other devices or systems (such as through the external network 102 or through other communication networks, such as described herein). For example, the marine electronic device 405 may communicate with a propulsion system of the watercraft 100 (e.g., for autopilot control); a remote device (e.g., a user's mobile device, a handheld remote, etc.); or other system.

The marine electronic device 405 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. In this regard, numerous other peripheral devices (including other marine electronic devices or transducer assemblies) may be included in the system 400.

The position sensor 445 may be configured to determine the current position and/or location of the marine electronic device 405 (and/or the watercraft 100). For example, the position sensor 445 may comprise a global positioning system (GPS), bottom contour, inertial navigation system, such as machined electromagnetic sensor (MEMS), a ring laser gyroscope, or other location detection system.

The display 440, e.g. one or more screens, may be configured to present images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In some embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 31 is shown as being directly connected to the processor 410 and within the marine electronic device 405, the display 440 could alternatively be remote from the processor 410 and/or marine electronic device 405. Likewise, in some embodiments, the position sensor 445 and/or user interface 435 could be remote from the marine electronic device 405.

The marine electronic device 405 may include one or more other sensors 447 configured to measure or sense various other conditions. The other sensors 447 may include, for example, an air temperature sensor, a water temperature sensor, a current sensor, a light sensor, a wind sensor, a speed sensor, or the like.

The transducer assembly 462 illustrated in FIG. 31 includes three transducer arrays 467, 468, and 469. In some embodiments, more or less transducer arrays could be included or other transducer elements could be included. As indicated herein, the transducer assembly 462 may also include a sonar signal processor or other processor (although not shown) configured to perform various sonar processing. In some embodiments, the processor (e.g., processor 410 in the marine electronic device 405, a processor (or processor portion) in the transducer assembly 462, or a remote processor—or combinations thereof) may be configured to filter sonar return data and/or selectively control transducer elements of the transducer arrays. For example, various processing devices (e.g., a multiplexer, a spectrum analyzer, A-to-D converter, etc.) may be utilized in controlling or filtering sonar return data and/or transmission of sonar signals from the arrays 467, 468, 469.

The transducer assembly 462 may also include one or more other systems, such as various sensor(s) 466. For example, the transducer assembly 462 may include an orientation sensor, such as gyroscope or other orientation sensor (e.g., accelerometer, MEMS, etc.) that can be configured to determine the relative orientation of the transducer assembly 462 and/or the various arrays 467, 468, 469—such as with respect to a waterline, the top surface of the body of water, or other reference. In some embodiments, additionally or alternatively, other types of sensor(s) are contemplated, such as, for example, a water temperature sensor, a current sensor, a light sensor, a wind sensor, a speed sensor, or the like.

FIG. 32 shows a block diagram of another example sonar system 400' of various embodiments of the present invention described herein. The illustrated sonar system 400' includes the same various components and devices as the system 400 shown and described with respect to FIG. 31, but instead of three transducer arrays, the system 400' includes two transducer arrays 467' and 468' in the transducer assembly 462'. Such an example transducer assembly 462' with two transducer arrays 467' and 468' may correspond to various embodiments herein, such as some example embodiments shown and described with respect to FIGS. 3 and 8-13.

Example Flowchart(s) and Operations

Embodiments of the present invention provide methods, apparatus and computer program products for operating a sonar system according to various embodiments described herein. Various examples of the operations performed in accordance with embodiments of the present invention will now be provided with reference to FIGS. 33-34.

FIG. 33 illustrates a flowchart according to example methods for operating a sonar system according to an example embodiment. The operations illustrated in and described with respect to FIG. 33 may, for example, be performed by, with the assistance of, and/or under the control of one or more of the processor 410, memory 420, communication interface 430, user interface 435, position sensor 445, other sensor 447, transducer assembly 462, 462', display 440, and/or external network 402/remote device 461. The method 700 may include operating two or more arrays to transmit sonar signals into the underwater environment at operation 702. At operation 704, the method comprises receiving sonar return data from the two or more arrays. Then, at operation 706, the sonar return data is filtered to beamform multiple sonar return beams. At operation 708, the method may include forming 2D live side sonar images. The method may further include forming 2D live forward sonar images at operation 710. Finally, at operation 712, the method may include forming current and historical side sonar images, such as described herein. In some embodiments, the method may include additional, optional operations, and/or the operations described above may be modified, removed, or augmented, such as in accordance with various example embodiments described herein.

FIG. 34 illustrates a flowchart according to example methods for operating a sonar system according to another example embodiment. The operations illustrated in and described with respect to FIG. 34 may, for example, be performed by, with the assistance of, and/or under the control of one or more of the processor 410, memory 420, communication interface 430, user interface 435, position sensor 445, other sensor 447, transducer assembly 462, 462', display 440, and/or external network 402/remote device 461. The method 720 may include operating three or more arrays to transmit sonar signals into the underwater environment at operation 722. At operation 724, the method comprises receiving sonar return data from the three or more arrays. Then, at operation 726, the sonar return data is filtered to beamform multiple sonar return beams. At operation 728, the method may include forming 2D live sonar images using the multiple sonar return beams. At operation 730, the method may further include forming current and historical side sonar images using the side sonar return beams. At operation 732, the method may further include forming a downward sonar image with high resolution using one or more downward sonar return beams, such as described herein. At operation 734, the method may further include forming a downward sonar image with fish arches using a plurality of downward sonar return beams, such as described herein. In some embodiments, the method may include additional, optional operations, and/or the operations described above may be modified, removed, or augmented, such as in accordance with various example embodiments described herein. In some embodiments, a live forward sonar image, such as shown in FIG. 17, and/or a live downward sonar image, such as shown in FIG. 18, may be formed.

FIGS. 33-34 illustrate flowcharts of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus (for example, a marine electronic device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405) to cause a series of operations to be performed on the computer or other programmable apparatus to produce a computer-implemented process such that the instructions which execute on the computer or other programmable apparatus implement the functions specified in the flowchart block(s).

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A system for generating and presenting sonar imagery of an underwater environment, the system comprising:

a sonar transducer assembly mountable to a watercraft, the sonar transducer assembly comprising:

one or more first sonar transducer arrays positioned and aimed outwardly and downwardly from a first side of the watercraft, wherein each of the one or more first sonar transducer arrays comprises a plurality of first transducer elements, wherein at least one of the one or more first sonar transducer arrays are oriented with a longitudinal axis defining a first angle within a mounting plane dimension relative to a vertical centerline plane of the watercraft, wherein the mounting plane dimension is parallel to a waterline of the underwater environment, wherein the first angle is between 10°-40° from the vertical centerline plane; and one or more second sonar transducer arrays positioned and aimed outwardly and downwardly from a second side of the watercraft, wherein each of the one or more second sonar transducer arrays comprises a plurality of second transducer elements, wherein the second side of the watercraft is opposite the first side of the watercraft, wherein at least one of the one or more second sonar transducer arrays are oriented with a longitudinal axis defining a second angle within the mounting plane dimension relative to the vertical centerline plane of the watercraft, wherein the second angle is between 10°-40° from the vertical centerline plane;

a display;

a processor; and a memory including computer executable instructions, the computer executable instructions configured to, when executed by the processor, cause the processor to:

receive first sonar return data at substantially a same time from the one or more first sonar transducer arrays;

receive second sonar return data at substantially the same time from the one or more second sonar transducer arrays;

filter the first sonar return data based on frequency to form multiple first sonar return beams corresponding to different horizontal angles within a range of angles extending from the first side of the watercraft from a fore-to-aft direction of the watercraft, wherein each of the multiple first sonar return beams is formed using frequency steered beamforming and correspond to substantially the same time;

filter the second sonar return data based on frequency to form multiple second sonar return beams corresponding to different horizontal angles within a range of angles extending from the second side of the watercraft from the fore-to-aft direction of the watercraft, wherein each of the multiple second sonar return beams is formed using frequency steered beamforming and correspond to the same time;

generate a first sonar image of the underwater environment that is off to the first side of the watercraft, wherein the first sonar image is a first two-dimensional live sonar image that is formed of the first sonar return data from the multiple first sonar return beams from the one or more first sonar transducer arrays, and wherein the first sonar return data used to form the first two-dimensional live sonar image was received at substantially the same time by the plurality of first transducer elements;

generate a second sonar image of the underwater environment that is off to the second side of the watercraft, wherein the second sonar image is a second two-dimensional live sonar image that is formed of second sonar return data from the multiple second sonar return beams from the one or more second sonar transducer arrays, and wherein the second sonar return data used to form the second two-dimensional live sonar image was received at substantially the same time by the plurality of second transducer elements;

generate a third sonar image of the underwater environment that is a current and historical view of the underwater environment off to both the first side and the second side of the watercraft, wherein the third sonar image is formed of a first current image slice of sonar image data corresponding to a first subset of the multiple first sonar return beams and a second current image slice of sonar image data corresponding to a second subset of the multiple second sonar return beams, wherein the first subset is at least one of multiple first sonar return beams and less than or equal to ten of the multiple first sonar return beams, wherein the second subset is at least one of multiple second sonar return beams and less than or equal to ten of the multiple second sonar return beams, wherein the first current image slice is positioned at a top of the third sonar image on a right side of the third sonar image, wherein the second current image slice is positioned at the top of the third sonar image on a left side of the third sonar image, and wherein the remainder of the third sonar image is formed of historical slices of sonar image data from prior captured sonar return data from the one or more first sonar transducer arrays and the one or more second sonar transducer arrays; and cause presentation of the first sonar image and the second sonar image on the display, wherein the first sonar image is presented on the display to the right of the second sonar image from a viewer's perspective, or cause presentation of the third sonar image on the display.

2. The system of claim 1, wherein each of the first subset and the second subset covers a beam-shaped area of a horizontal plane that is less than five degrees in width.

3. The system of claim 1, wherein the third sonar image is presented on the display below the first sonar image and the second sonar image.

4. The system of claim 3, wherein the first sonar image includes a first emphasis feature overlaying and indicating the first subset of the multiple first sonar return beams that corresponds to the first current image slice of sonar image data for the third sonar image, and wherein the second sonar image includes a second emphasis feature overlaying and indicating the second subset of the multiple second sonar return beams that corresponds to the second current image slice of sonar image data for the third sonar image.

5. The system of claim 4, wherein the first emphasis feature is movable on the display, wherein the second emphasis feature is movable on the display, wherein the first current image slice of sonar image data for the third sonar image changes according to the placement of the first emphasis feature on the first subset of the multiple first sonar return beams, and wherein the second current image slice of sonar image data for the third sonar image changes according to the placement of the second emphasis feature on the second subset of the multiple second sonar return beams.

6. The system of claim 4, wherein the third sonar image includes a third emphasis feature overlaying and indicating the first current image slice that is positioned at the top of the third sonar image on the right side of the third sonar image, and wherein the third sonar image includes a fourth emphasis feature overlaying and indicating the second current image slice that is positioned at the top of the third sonar image on the left side of the third sonar image.

7. The system of claim 1, wherein the system further comprises one or more third sonar transducer arrays positioned and aimed forwardly and downwardly from a front of the watercraft, wherein each of the one or more third sonar transducer arrays comprises a plurality of third transducer elements, wherein the front of the watercraft is generally perpendicular to the first side and the second side, and wherein the processor is further configured to:

receive third sonar return data from the one or more third sonar transducer arrays;

filter the third sonar return data based on frequency to form multiple third sonar return beams corresponding to the front of the watercraft; and generate a fourth sonar image of the underwater environment that is either off of the front the watercraft or below the watercraft, wherein the fourth sonar image is a third two-dimensional live sonar image that is formed of at least third sonar return data from at least some of the multiple third sonar return beams from the one or more third sonar transducer arrays, and wherein the third sonar return data used to form the two-dimensional live sonar image was received at substantially a same time by the plurality of third transducer elements.

8. The system of claim 7, wherein the third sonar image is presented on the display below the first sonar image and the second sonar image, and wherein the fourth sonar image is presented on the display above the first sonar image and the second sonar image.

9. The system of claim 7, wherein a representation of the watercraft is presented on the display, wherein the first sonar image is presented on the display to a right side of the representation corresponding to the first side of the watercraft, wherein the second sonar image is presented on the display to a left side of the representation corresponding to the second side of the watercraft, and wherein the fourth sonar image is presented on the display to a top of the representation corresponding to the front of the watercraft.

10. The system of claim 1, wherein the processor is further configured to generate the third sonar image of the underwater environment as a combined sidescan sonar image that includes sonar imagery based on the first subset of the multiple first sonar return beams, a second subset of the multiple first sonar return beams, the second subset of the multiple second sonar return beams, and a second subset of the multiple second sonar return beams, wherein the right side of the third sonar image includes sonar imagery from the first subset of the multiple first sonar return beams and the second subset of the multiple first sonar return beams, wherein the left side of the third sonar image includes sonar imagery from the second subset of the multiple second sonar return beams and the second subset of the multiple second sonar return beams, wherein the first subset of the multiple first sonar return beams includes less sonar return beams than the second subset of the multiple first sonar return beams, and wherein the first subset of the multiple second sonar return beams includes less sonar return beams than the second subset of the multiple second sonar return beams.

11. The system of claim 1, wherein the one or more first sonar transducer arrays are configured to operate at a fixed phase shift and vary in frequency so as to beamform the multiple first sonar return beams between a first range of angles and a second range of angles relative to a first emitting face, wherein a gap of a third range of angles separates the first range of angles and the second range of angles, wherein the one or more second sonar transducer arrays are configured to operate at a fixed phase shift and vary in frequency so as to beamform the multiple second sonar return beams between a fourth range of angles and a fifth range of angles relative to a second emitting face, wherein a gap of a sixth range of angles separates the fourth range of angles and the fifth range of angles, wherein the first sonar image is formed of first sonar return data from the first range of angles of the multiple first sonar return beams from the one or more first sonar transducer arrays, and wherein the second sonar image is formed of second sonar return data from the fourth range of angles of the multiple second sonar return beams from the one or more second sonar transducer arrays.

12. The system of claim 11, wherein a third sonar image is formed by combining:

first sonar return data from the second range of angles of the multiple first sonar return beams from the one or more first sonar transducer arrays; and second sonar return data from the fifth range of angles of the multiple second sonar return beams from the one or more second sonar transducer arrays.

13. The system of claim 11, wherein each of the first, second, fourth, and fifth ranges of angles covers a volume of water in a horizontal plane outside of the watercraft that is between 20 and 40 degrees in width.

14. The system of claim 11, wherein the second range of angles and the fifth range of angles are either nearly adjacent, adjacent, or overlapping and generally directed in a forward or backward direction.

15. The system of claim 12, wherein the third sonar image is a forward scan image.

16. The system of claim 1, wherein the one or more first sonar transducer array is a single first sonar transducer array, and wherein the one or more second sonar transducer array is a single second sonar transducer array.

17. The system of claim 1, wherein the first angle and the second angle are each approximately 30 degrees.

18. A marine electronic device for generating and presenting sonar imagery of an underwater environment relative to a watercraft, the marine electronic device comprising:

a display;

a processor; and a memory including computer executable instructions, the computer executable instructions configured to, when executed by the processor, cause the processor to:

receive first sonar return data at substantially a same time from one or more first sonar transducer arrays, wherein the one or more first sonar transducer arrays are positioned and aimed outwardly and downwardly from a first side of the watercraft, and wherein each of the one or more first sonar transducer arrays comprises a plurality of first transducer elements, wherein at least one of the one or more first sonar transducer arrays are oriented with a longitudinal axis defining a first angle within a mounting plane dimension relative to a vertical centerline plane of the watercraft, wherein the mounting plane dimension is parallel to a waterline of the underwater environment, wherein the first angle is between 10°-40° from the vertical centerline plane;

receive second sonar return data at substantially the same time from one or more second sonar transducer arrays, wherein the one or more second sonar transducer arrays are positioned and aimed outwardly and downwardly from a second side of the watercraft, wherein each of the one or more second sonar transducer arrays comprises a plurality of second transducer elements, and wherein the second side of the watercraft is opposite the first side of the watercraft, wherein at least one of the one or more second sonar transducer arrays are oriented with a longitudinal axis defining a second angle within the mounting plane dimension relative to the vertical centerline plane of the watercraft, wherein the second angle is between 10°-40° from the vertical centerline plane;

filter the first sonar return data based on frequency to form multiple first sonar return beams corresponding to different horizontal angles within a range of angles extending from the first side of the watercraft from a fore-to-aft direction of the watercraft, wherein each of the multiple first sonar return beams is formed using frequency steered beamforming and correspond to substantially the same time;

filter the second sonar return data based on frequency to form multiple second sonar return beams corresponding to different horizontal angles within a range of angles extending from the second side of the watercraft from the fore-to-aft direction of the watercraft, wherein each of the multiple second sonar return beams is formed using frequency steered beamforming and correspond to substantially the same time;

generate a first sonar image of the underwater environment that is off to the first side of the watercraft, wherein the first sonar image is a two-dimensional live sonar image that is formed of the first sonar return data from the multiple first sonar return beams from the one or more first sonar transducer arrays, and wherein the first sonar return data used to form the two-dimensional live sonar image was received at substantially the same time by the plurality of first transducer elements;

generate a second sonar image of the underwater environment that is off to the second side of the watercraft, wherein the second sonar image is a two-dimensional live sonar image that is formed of second sonar return data from the multiple second sonar return beams from the one or more second sonar transducer arrays, and wherein the second sonar return data used to form the two-dimensional live sonar image was received at substantially the same time by the plurality of second transducer elements;

generate a third sonar image of the underwater environment that is a current and historical view of the underwater environment off to both the first side and the second side of the watercraft, wherein the third sonar image is formed of a first current image slice of sonar image data corresponding to a first subset of the multiple first sonar return beams and a second current image slice of sonar image data corresponding to a second subset of the multiple second sonar return beams, wherein the first subset is at least one of multiple first sonar return beams and less than or equal to ten of the multiple first sonar return beams, wherein the second subset is at least one of multiple second sonar return beams and less than or equal to ten of the multiple second sonar return beams, wherein the first current image slice is positioned at a top of the third sonar image on a right side of the third sonar image, wherein the second current image slice is positioned at the top of the third sonar image on a left side of the third sonar image, and wherein the remainder of the third sonar image is formed of historical slices of sonar image data from prior captured sonar return data from the one or more first sonar transducer arrays and the one or more second sonar transducer arrays; and cause presentation of the first sonar image and the second sonar image on the display, wherein the first sonar image is presented on the display to the right of the second sonar image from a viewer's perspective, or cause presentation of the third sonar image on the display.

19. The marine electronic device of claim 18, wherein the processor is further configured to:

receive third sonar return data from one or more third sonar transducer arrays, wherein the one or more third sonar transducer arrays are positioned and aimed forwardly and downwardly from a front of the watercraft, wherein each of the one or more third sonar transducer arrays comprises a plurality of third transducer elements, and wherein the front of the watercraft is generally perpendicular to the first side and the second side;

filter the third sonar return data based on frequency to form multiple third sonar return beams corresponding to the front of the watercraft; and generate a fourth sonar image of the underwater environment that is either off of the front the watercraft or below the watercraft, wherein the fourth sonar image is a two-dimensional live sonar image that is formed of at least third sonar return data from at least some of the multiple third sonar return beams from the one or more third sonar transducer arrays, and wherein the third sonar return data used to form the two-dimensional live sonar image was received at substantially a same time by the plurality of third transducer elements.

20. The marine electronic device of claim 18, wherein the one or more first sonar transducer arrays are configured to operate at a fixed phase shift and vary in frequency so as to beamform the multiple first sonar return beams between a first range of angles and a second range of angles relative to a first emitting face, wherein a gap of a third range of angles separates the first range of angles and the second range of angles, wherein the one or more second sonar transducer arrays are configured to operate at a fixed phase shift and vary in frequency so as to beamform the multiple second sonar return beams between a fourth range of angles and a fifth range of angles relative to a second emitting face, wherein a gap of a sixth range of angles separates the fourth range of angles and the fifth range of angles, wherein the first sonar image is formed of first sonar return data from the first range of angles of the multiple first sonar return beams from the one or more first sonar transducer arrays, and wherein the second sonar image is formed of second sonar return data from the fourth range of angles of the multiple second sonar return beams from the one or more second sonar transducer arrays.

21. The marine electronic device of claim 20, wherein a third sonar image is formed by combining:

first sonar return data from the second range of angles of the multiple first sonar return beams from the one or more first sonar transducer arrays; and second sonar return data from the fifth range of angles of the multiple second sonar return beams from the one or more second sonar transducer arrays.

22. A method for generating and presenting sonar imagery of an underwater environment relative to a watercraft, the method comprising:

receiving first sonar return data at substantially a same time from one or more first sonar transducer arrays, wherein the one or more first sonar transducer arrays are positioned and aimed outwardly and downwardly from a first side of a watercraft, and wherein each of the one or more first sonar transducer arrays comprises a plurality of first transducer elements, wherein at least one of the one or more first sonar transducer arrays are oriented with a longitudinal axis defining a first angle within a mounting plane dimension relative to a vertical centerline plane of the watercraft, wherein the mounting plane dimension is parallel to a waterline of the underwater environment, wherein the first angle is between 10°-40° from the vertical centerline plane;

receiving second sonar return data at substantially the same time from one or more second sonar transducer arrays, wherein the one or more second sonar transducer arrays are positioned and aimed outwardly and downwardly from a second side of the watercraft, wherein each of the one or more second sonar transducer arrays comprises a plurality of second transducer elements, and wherein the second side of the watercraft is opposite the first side of the watercraft, wherein at least one of the one or more second sonar transducer arrays are oriented with a longitudinal axis defining a second angle within the mounting plane dimension relative to the vertical centerline plane of the watercraft, wherein the second angle is between 10°-40° from the vertical centerline plane;

filtering the first sonar return data based on frequency to form multiple first sonar return beams corresponding to different horizontal angles within a range of angles extending from the first side of the watercraft from a fore-to-aft direction of the watercraft, wherein each of the multiple first sonar return beams is formed using frequency steered beamforming and correspond to substantially the same time;

filtering the second sonar return data based on frequency to form multiple second sonar return beams corresponding to different horizontal angles within a range of angles extending from the second side of the watercraft from the fore-to-aft direction of the watercraft, wherein each of the multiple second sonar return beams is formed using frequency steered beamforming and correspond to substantially the same time;

generating a first sonar image of the underwater environment that is off to the first side of the watercraft, wherein the first sonar image is a two-dimensional live sonar image that is formed of the first sonar return data from the multiple first sonar return beams from the one or more first sonar transducer arrays, and wherein the first sonar return data used to form the two-dimensional live sonar image was received at substantially the same time by the plurality of first transducer elements;

generating a second sonar image of the underwater environment that is off to the second side of the watercraft, wherein the second sonar image is a two-dimensional live sonar image that is formed of second sonar return data from the multiple second sonar return beams from the one or more second sonar transducer arrays, and wherein the second sonar return data used to form the two-dimensional live sonar image was received at substantially the same time by the plurality of second transducer elements;

generate a third sonar image of the underwater environment that is a current and historical view of the underwater environment off to both the first side and the second side of the watercraft, wherein the third sonar image is formed of a first current image slice of sonar image data corresponding to a first subset of the multiple first sonar return beams and a second current image slice of sonar image data corresponding to a second subset of the multiple second sonar return beams, wherein the first subset is at least one of multiple first sonar return beams and less than or equal to ten of the multiple first sonar return beams, wherein the second subset is at least one of multiple second sonar return beams and less than or equal to ten of the multiple second sonar return beams, wherein the first current image slice is positioned at a top of the third sonar image on a right side of the third sonar image, wherein the second current image slice is positioned at the top of the third sonar image on a left side of the third sonar image, and wherein the remainder of the third sonar image is formed of historical slices of sonar image data from prior captured sonar return data from the one or more first sonar transducer arrays and the one or more second sonar transducer arrays; and causing presentation of the first sonar image and the second sonar image on a display, wherein the first sonar image is presented on the display to the right of the second sonar image from a viewer's perspective, or causing presentation of the third sonar image on the display.

23. A system for generating and presenting sonar imagery of an underwater environment, the system comprising:

a sonar transducer assembly mountable to a watercraft, the sonar transducer assembly comprising:

one or more first sonar transducer arrays positioned and aimed outwardly and downwardly from a first side of the watercraft, wherein each of the one or more first sonar transducer arrays comprises a plurality of first transducer elements; and one or more second sonar transducer arrays positioned and aimed outwardly and downwardly from a second side of the watercraft, wherein each of the one or more second sonar transducer arrays comprises a plurality of second transducer elements, wherein the second side of the watercraft is opposite the first side of the watercraft;

a display;

a processor; and a memory including computer executable instructions, the computer executable instructions configured to, when executed by the processor, cause the processor to:

receive first sonar return data from the one or more first sonar transducer arrays;

receive second sonar return data from the one or more second sonar transducer arrays;

filter the first sonar return data based on frequency to form multiple first sonar return beams corresponding to the first side of the watercraft;

filter the second sonar return data based on frequency to form multiple second sonar return beams corresponding to the second side of the watercraft;

generate a first sonar image of the underwater environment that is off to the first side of the watercraft, wherein the first sonar image is a first two-dimensional live sonar image that is formed of the first sonar return data from the multiple first sonar return beams from the one or more first sonar transducer arrays, and wherein the first sonar return data used to form the first two-dimensional live sonar image was received at substantially a same time by the plurality of first transducer elements;

generate a second sonar image of the underwater environment that is off to the second side of the watercraft, wherein the second sonar image is a second two-dimensional live sonar image that is formed of second sonar return data from the multiple second sonar return beams from the one or more second sonar transducer arrays, and wherein the second sonar return data used to form the second two-dimensional live sonar image was received at substantially a same time by the plurality of second transducer elements;

generate a third sonar image of the underwater environment that is a current and historical view of the underwater environment off to both the first side and the second side of the watercraft, wherein the third sonar image is formed of a first current image slice of sonar image data corresponding to a first subset of the multiple first sonar return beams and a second current image slice of sonar image data corresponding to a second subset of the multiple second sonar return beams, wherein the first subset is at least one of multiple first sonar return beams and less than or equal to ten of the multiple first sonar return beams, wherein the second subset is at least one of multiple second sonar return beams and less than or equal to ten of the multiple second sonar return beams, wherein the first current image slice is positioned at a top of the third sonar image on a right side of the third sonar image, wherein the second current image slice is positioned at the top of the third sonar image on a left side of the third sonar image, and wherein the remainder of the third sonar image is formed of historical slices of sonar image data from prior captured sonar return data from the one or more first sonar transducer arrays and the one or more second sonar transducer arrays; and cause presentation of the first sonar image, the second sonar image, and the third sonar image on the display, wherein the first sonar image is presented on the display to the right of the second sonar image from a viewer's perspective.

* * * * *